(12) United States Patent
Sahin et al.

(10) Patent No.: US 11,652,679 B2
(45) Date of Patent: May 16, 2023

(54) SYSTEMS AND METHODS FOR RELIABLE CHIRP TRANSMISSIONS AND MULTIPLEXING

(71) Applicant: University of South Carolina, Columbia, SC (US)

(72) Inventors: Alphan Sahin, Columbia, SC (US); David Matolak, Chapin, SC (US); Nozhan Hosseini, Columbia, SC (US)

(73) Assignee: UNIVERSITY OF SOUTH CAROLINA, Columbia, SC (US)

( * ) Notice: Subject to any disclaimer, the term of this patent is extended or adjusted under 35 U.S.C. 154(b) by 0 days.

(21) Appl. No.: 17/064,899

(22) Filed: Oct. 7, 2020

(65) Prior Publication Data

US 2021/0111938 A1    Apr. 15, 2021

Related U.S. Application Data

(60) Provisional application No. 62/913,829, filed on Oct. 11, 2019.

(51) Int. Cl.
*H04L 27/26* (2006.01)
*H04B 1/707* (2011.01)
*H04B 1/69* (2011.01)

(52) U.S. Cl.
CPC ......... *H04L 27/2614* (2013.01); *H04B 1/707* (2013.01); *H04L 27/2626* (2013.01); *H04L 27/2636* (2013.01); *H04B 2001/6912* (2013.01)

(58) Field of Classification Search
CPC .. H04B 2001/6912; H04B 1/69; H04B 1/707; H04L 27/2614; H04L 27/2626; H04L 27/2634; H04L 27/2636
See application file for complete search history.

(56) References Cited

U.S. PATENT DOCUMENTS

| | | | | |
|---|---|---|---|---|
| 9,112,592 | B2* | 8/2015 | McCorkle | H04B 1/69 |
| 9,960,942 | B2* | 5/2018 | Huan | H04L 27/2614 |
| 2006/0239370 | A1* | 10/2006 | Mody | H04L 27/2663 |
| | | | | 375/260 |
| 2019/0317187 | A1* | 10/2019 | Meissner | G01S 7/354 |

OTHER PUBLICATIONS

X. Ouyang and J. Zhao, "Orthogonal Chirp Division Multiplexing," in IEEE Transactions on Communications, vol. 64, No. 9, pp. 3946-3957, Sep. 2016, doi: 10.1109/TCOMM.2016.2594792.*
Golay Complementary Sequences, Matthew G. Parker, Kenneth G. Paterson and Chintha Tellambura, Jan. 19, 2004.
A Generic Complementary Sequence Encoder, Alphan Sahin, Member, IEEE, and Rui Yang, Member, IEEE, Jul. 27, 2019.
Nonlinear Quasi-Synchronous Multi User Chirp Spread Spectrum Signaling, Nozhan Hosseini, Member, IEEE, and David W. Matolak, Fellow, IEEE, accessed on May 25, 2021.

* cited by examiner

*Primary Examiner* — Betsy Deppe
(74) *Attorney, Agent, or Firm* — Burr & Forman LLP

(57) ABSTRACT

Apparatuses, systems, and methods for transmitting and multiplexing chirp signals for communications are provided. An example apparatus includes an antenna, a radio, and processing circuitry. The radio may be configured to transmit and receive wireless communications via the antenna, and the processing circuitry configured to establish a wireless communications link with a receiving communications device. The signaling transmitted by the antenna via the radio as controlled by the processing circuitry may include a plurality of sequenced chirp signals within an orthogonal frequency division multiplexing (OFDM) framework.

21 Claims, 29 Drawing Sheets

SYSTEMS AND METHODS FOR RELIABLE CHIRP TRANSMISSIONS AND MULTIPLEXING

TECHNICAL FIELD

Example embodiments generally relate to communications technologies and, more particularly, relate to apparatuses, systems, and methods for chirp transmissions and multiplexing.

BACKGROUND

Wireless communications devices in the form of cellular phones and the like have become commonplace. The desire to have wireless connectivity and communications capabilities is now demanded in almost any setting. In the context of the Internet of Things (IoT), on some level, almost all electronic devices are candidates for implementing wireless connectivity to support communications. Even moving vehicles, including land-based and aerial vehicles, are planned to be increasingly connected to support wireless communications.

While the ability to wirelessly connect devices in these contexts is currently available, there continues to be aspects where further innovation and improvements can be made. For instance, the demand for increased throughput to communicate and establish higher data transmission rates seems to have no end. Additionally, there continues to be a need for increased reliably and security in the context of wireless connectivity and communications.

BRIEF SUMMARY OF SOME EXAMPLES

According to some example embodiments, an apparatus is provided that leverages the use of chirp signals in communications. In this regard, the apparatus may comprise an antenna, a radio, and processing circuitry. The radio may be configured to transmit and receive wireless communications via the antenna. The processing circuitry may be configured to control the radio to establish a wireless communications link with a receiving communications device. In this regard, signaling transmitted by the antenna via the radio, as controlled by the processing circuitry, may comprise a plurality of sequenced chirp signals provided within an orthogonal frequency division multiplexing (OFDM) framework.

According to some example embodiments, the processing circuitry may be configured to control the radio to transmit the plurality of sequenced chirp signals. In this regard, a chirp signal of the plurality of sequenced chirp signals may comprise an up-chirp signal within OFDM symbols. The up-chirp signal comprises a signal with an increasing frequency with respect to time.

According to some example embodiments, the processing circuitry may be configured to control the radio to transmit the plurality of sequenced chirp signals. In this regard, a chirp signal of the plurality of chirp signals comprises a down-chirp signal within OFDM symbols. The down-chirp signal may comprise a signal with a decreasing frequency with respect to time.

According to some example embodiments, the processing circuitry may be configured to control the radio to transmit the plurality of sequenced chirp signals. In this regard, a chirp signal of the plurality of sequenced chirp signals may sweep across a frequency range from a first frequency to a second frequency within OFDM symbols. The first frequency may be lower than the second frequency or the first frequency may be higher than the second frequency.

According to some example embodiments, the processing circuitry may be configured to control the radio to transmit the plurality of sequenced chirp signals. In this regard, a chirp signal of the plurality of chirp signals may comprise an up-chirp signal or a down-chirp signal. The up-chirp signal may sweep across an range of frequencies with respect to time by increasing a frequency of the up-chirp signal, and the down-chirp signal may sweep across an range of frequencies with respect to time by decreasing a frequency of the down-chirp signal.

According to some example embodiments, the processing circuitry is configured to control the radio to transmit the plurality of sequenced chirp signals including a cyclic prefix via orthogonal chirp division multiplexing. According to some example embodiments, the processing circuitry may be configured to control the radio to maintain orthogonality by transmitting complementary sequences of chirp signals.

According to some example embodiments, the processing circuitry may be configured to control the radio to transmit the plurality of sequenced chirp signals. In this regard, the sequenced chirp signals may have a uniform, non-linear trajectory in time and frequency.

According to some example embodiments, the radio may comprise a power amplifier configured to provide amplification for transmission of the plurality of sequenced chirp signals and control instantaneous power fluctuations due to transmission of chirp signals associated with different frequencies within a band.

According to some example embodiments, the processing circuitry may be configured to control the radio to transmit the plurality of sequenced chirp signals via implementation of a Discrete Fourier Transform (DFT)-spreading scheme with OFDM and a frequency-domain spectral shaping (FDSS) filter that employs Bessel functions and Fresnel integrals used to develop the plurality of sequenced chirp signals as band-limited sinusoidal and/or linear chirp transmissions.

According to some example embodiments, the processing circuitry may be configured to control the radio to transmit the plurality of sequenced chirp signals. The plurality of sequenced chirp signals may be generated via chirp division multiplexing to encode trajectories of the chirp signals in frequency and time.

Additionally, according to some example embodiments, an example method is provided. The example method may comprise controlling, via processing circuitry, a radio to establish a wireless communications link via an antenna, and controlling the radio and the antenna to transmit communications as a plurality of sequenced chirp signals within an orthogonal frequency division multiplexing (OFDM) framework.

According to some example embodiments, the example method may further comprise controlling the radio to transmit the plurality of sequenced chirp signals, wherein a chirp signal of the plurality of sequenced chirp signals comprises an up-chirp signal within OFDM symbols or a down-chirp signal within OFDM symbols, wherein the up-chirp signal comprises a signal with an increasing frequency with respect to time and the down-chirp signal comprises a signal with a decreasing frequency with respect to time.

According to some example embodiments, the example method may further comprise controlling the radio to transmit the plurality of sequenced chirp signals within OFDM symbols. In this regard, a chirp signal of the plurality of chirp signals comprises an up-chirp signal or a down-chirp signal. The up-chirp signal may sweep across a range of frequencies with respect to time by increasing a frequency of the up-chirp signal, and the down-chirp signal may sweep across a range of frequencies with respect to time by decreasing a frequency of the down-chirp signal.

According to some example embodiments, the example method may further comprise controlling the radio to transmit the plurality of sequenced chirp signals including a cyclic prefix via orthogonal chirp division multiplexing. According to some example embodiments, the example method may further comprise controlling the radio to maintain orthogonality by transmitting complementary sequences of chirp signals.

According to some example embodiments, the example method may further comprise controlling the radio to transmit the plurality of sequenced chirp signals. In this regard, the sequenced chirp signals may have a uniform, non-linear trajectory in time and frequency.

According to some example embodiments, the example method may further comprise providing amplification via a power amplifier for transmission of the plurality of sequenced chirp signals and controlling instantaneous power fluctuations due to transmission of chirp signals associated with different frequencies within a band.

According to some example embodiments, the example method may further comprise controlling the radio to transmit the plurality of sequenced chirp signals via implementation of a Discrete Fourier Transform (DFT)-spreading scheme with OFDM and frequency-domain spectral shaping (FDSS) that employs Bessel functions and Fresnel intergrals used to develop the plurality of sequenced chirp signals as band-limited sinusoidal and/or chirp transmissions.

According to some example embodiments, the example method may further comprise controlling the radio to transmit the plurality of sequenced chirp signals, the plurality of sequenced chirp signals being generated via chirp division multiplexing to encode trajectories of the chirp signals in frequency and time.

BRIEF DESCRIPTION OF THE SEVERAL VIEWS OF THE DRAWING(S)

Having thus described some example embodiments in general terms, reference will now be made to the accompanying drawings, which are not necessarily drawn to scale, and wherein:

DETAILED DESCRIPTION

Figure 1:
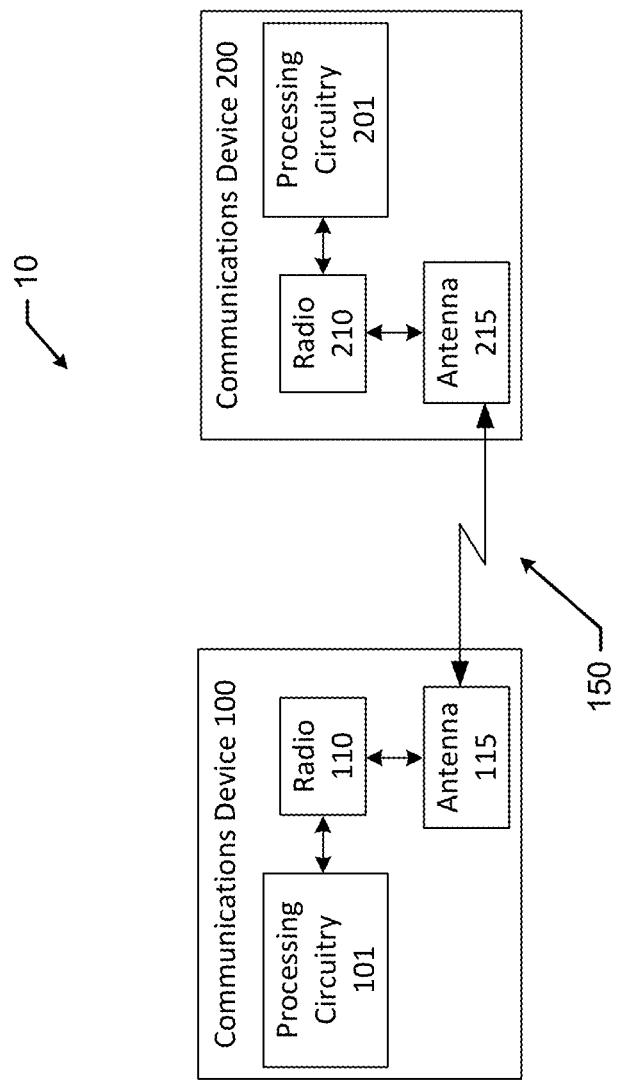
FIG. 1 illustrates an example communications system according to some example embodiments.

Some example embodiments now will be described more fully hereinafter with reference to the accompanying drawings, in which some, but not all example embodiments are shown. Indeed, the examples described and pictured herein should not be construed as being limiting as to the scope, applicability, or configuration of the present disclosure. Rather, these example embodiments are provided so that this disclosure will satisfy applicable legal requirements. Like reference numerals refer to like elements throughout.

As used herein the term "or" is used as the logical or where any one or more of the operands being true results in the statement being true. As used herein, the phrase "based on" as used in, for example, "A is based on B" indicates that B is a factor that determines A, but B is not necessarily the only factor that determines A.

According to some example embodiments described herein, apparatuses, systems, and methods are provided that are configured to conduct wireless communications via reliable chirp transmissions and multiplexing, for example, within an orthogonal frequency division multiplexing (OFDM) framework. A chirp signal or transmission may be a signal where the frequency increases (up-chirp) or decreases (down-chirp) with respect to time and is, for example, provided within an OFDM symbol. In this regard, a chirp signal may be one that sweeps across a set frequency range. According to some example embodiments, such chirp transmissions and multiplexing may be implemented in a variety of contexts to conduct wireless communications. For example, such techniques may be employed in the context of interconnected devices that support the Internet of Things (IOT). Alternatively, such techniques may be employed when conducting wireless communications to and between vehicles (e.g., moving vehicles), such as land-based or aerial vehicles, to as part of an established communications link. According to some example embodiments, secure and reliable communications systems may be established that, for example, employ threshold levels of reliability using power-limited link budget devices.

Multi-chirp and/or multi-band communications may realize increased reliability and the chances of a signal not being received can be reduced. According to some example embodiments, the increased reliability of multi-chirp and/or multi-band-based communication systems may also operate to decrease the instantaneous power fluctuation at the transmitter through configured properties of the sequence signals that are being transmitted and DFT (discrete Fourier transform)-based waveforms that are defined and utilized. High instantaneous power fluctuation may reduce the power efficiency of a communication system, which leads to increased power demands and thus, in some instances, shortened battery life and smaller communication range for many power-limited devices, e.g., IoT devices, drones in aeronautical networks, or the like. As such, by exploiting time-frequency resources efficiently through orthogonal chirp division multiplexing with low-complexity discrete Fourier transform (DFT)-based operations, a robust communications system may be implemented that also supports increased communication link distance and battery life.

According to some example embodiments, chirp signals may be implemented in a manner where the signals sweep over a large spectrum while still being constant-envelope signals, thereby providing a significant robustness against non-linear distortions. As such, chirp signals may be applied in the context of, for example, 3GPP Fifth Generation (5G) New Radio (NR) and IEEE 802.11 Wi-Fi, to realize a number of advantages as described herein relating to applications involving short-range wireless sensing, simultaneous radar & communications, and Internet-of-Things (IoT). However, according to some example embodiments, the physical layer of some communication systems may be based on orthogonal frequency division multiplexing (OFDM). According to some example embodiments, techniques for configuring communications devices to synthesize chirp signals within an OFDM framework is provided.

Chirp signals may, according to some example embodiments, involve the encoding bits as negative or positive slopes in the time-frequency (TF) plane. Chirp modulation can be implemented in the context of long-range air/ground communications in the high-frequency (HF) band. Further, according to some example embodiments, an orthogonal amplitude-variant linear chirp set may be defined where each chirp signal has a different chirp rate. Additionally, orthogonal chirps may be synthesized by introducing a term to the exponent of discrete Fourier transform (DFT) kernels. In this regard, chirp signals may be translated into the frequency domain and the signal bandwidth may increase with the number of chirps. To limit the bandwidth, additional up-sampling and filtering at baseband may be performed, which may fold the chirps in the frequency domain. A Fresnel transform and a fractional Fourier transform (FrFT) may be adopted to generate orthogonal chirp sets. Further, binary chirp spread spectrum (BCSS) signaling may be implemented. In this regard, non-linear chirps may be implemented to improve the bit-error ratio (BER) performance. Furthermore, the BER performance of quartic and linear chirps may be utilized in, for example, an empirical aeronautical channel model. Further, an iterative receiver may be used to improve the BER performance under frequency-selective fading channels and space-time coding schemes for orthogonal chirps. According to some example embodiments, a chirp spread spectrum (CSS) modulation, referred to as Long Range (LoRa), may be used in accordance with some example embodiments.

As described herein, chirp signals, according to some example embodiments, may be synthesized and employed within an OFDM framework. In this regard, for example, methods and associated apparatuses to generate chirp signals based on discrete Fourier transform-spread orthogonal frequency division multiplexing (DFT-s-OFDM) adopted in 3GPP 5G NR and 3GPP Long-Term Evolution (LTE) are provided. As such, a DFT spreading scheme may be employed that is uses OFDM and a frequency-domain spectral shaping (FDSS) filter, that, as further described herein, employs Bessel functions and Fresnel integrals to develop a plurality of sequenced chirp signals as band-limited sinusoidal or linear chirp transmissions. In this regard, such methods and associated apparatuses may rely on the design of an FDSS function applied after DFT spreading to convert single-carrier pulses (e.g., Dirichlet sinc functions) to a set of chirp signals translated uniformly in time. Such methods and associated apparatuses may operate to limit the bandwidth of the chirp signals, for example, without additional up-sampling and filtering at baseband. As the chirp signals are generated within the given a number of subcarrier bins by point-to-point multiplications, existing DFT-s-OFDM transceivers may be configured to modulate and demodulate chirp signals while supporting multiple users.

A number of example methods, and associated apparatuses and systems configured to implement the example methods, for implementing multiple chirp transmissions and multiplexing to realize secure and reliable communication systems are provided herein. Such example methods, apparatuses, and systems may be applied within the context of any type of communication system, such as those that require threshold levels of reliability or systems that require low-power communications (e.g., utilizing power-limited link budget devices). In this regard, example embodiments may be implemented in the context of a structural configuration of a baseband/radio frequency chipset of a radio communication device. Further, example embodiments may be configured to operate in accordance with various prescribed communication standards, such as, for example, 4G, LTE, 5G, IEEE 802.11 WLAN, 3GPP NR, Bluetooth, and the like. According to some example embodiments, the methods, apparatuses, and systems described herein may be implemented in accordance with Wi-Fi sensing under the IEEE 802.11 Wi-Fi standard.

According to some example embodiments, example techniques for reducing instantaneous power fluctuation are provided in accordance with, for example, a multiple chirp transmission. Such a chirp transmission may have an arbitrary uniform non-linear trajectory in time and frequency. Additionally, orthogonality may be maintained between the chirp signals by using complementary sequences. In this regard, according to some example embodiments, low peak-to-average power ratio (PAPR) coded orthogonal chirp division multiplexing may therefore be implemented.

Additionally or alternatively, according to some example embodiments, the trajectories of different chirps (chirp signals) may be encoded jointly. Such encoding may be performed to keep instantaneous power fluctuations of the signal low. Accordingly, low PAPR trajectory-coded chirp division multiplexing may therefore be implemented.

Additionally or alternatively, according to some example embodiments, the instantaneous power fluctuations may be controlled when multiple signals over largely separated bands are transmitted through the same power amplifier (e.g., multi-band operation). Such a power amplifier may be a power amplifier of a radio of a transmitting device. Accordingly, in this regard, a multi-band complementary sequence-based encoder for orthogonal frequency division multiplexing may be implemented.

Additionally or alternatively, according to some example embodiments, the spectral efficiency of a chirp-based communication system may be increased by utilizing a Discrete Fourier Transform (DFT)-based scheme. In this regard, Bessel functions may be used to develop band-limited sinusoidal chirp transmissions. As such, band-limited circular-time-shift-based chirp transmissions may be implemented.

Additionally or alternatively, according to some example embodiments, an orthogonal frequency division multiplexing-based chirp transmissions may be implemented, where the trajectories in time and frequency are encoded based on the information in time and frequency. According to some example embodiments, orthogonal resources may be generated based on the implementation of multiple DFT precoding operations by using a constant-amplitude sequence in the frequency domain. As such, multi-cluster-DFT-based precoding for chirp division multiplexing may be implemented.

In view of the chirp transmissions and multiplexing techniques provided above and as further described herein, example embodiments may be implemented in the context of a communications system 10 as shown in FIG. 1. The communications system 10 may include a complex system of intermediate devices that support communications between communications device 100 and communications device 200 to form a communications link 150, or the communications device 100 and communications device 200 may have a direct communications link formed as link 150, as shown in FIG. 1. In either case, the communications devices 100 and 200 may be configured to support wireless communications.

In this regard, the system 10 may include any number of communications devices, including communications devices 100 and 200. Although not shown, the communications devices may be physically coupled to a stationary unit (e.g., a base station or the like) or a mobile unit (e.g., a mobile terminal such as a cellular phone, a vehicle such as an aerial vehicle, a smart device with IoT capabilities, or the like).

The communications device 100 may comprise, among other components, processing circuitry 101, radio 110, and an antenna 115. As further described below, the processing circuitry 101 may be configured to control the radio 110 to transmit and receive wireless communications via the antenna 115. In the regard, a communications link 150 which may include a wireless component may be established between the antenna 115 and the antenna 215 of the communications device 200. Similarly, the communications device 200 may comprise, among other components, processing circuitry 201, radio 210, and the antenna 215. The processing circuitry 201 may be configured the same or similar to the processing 101, and thus maybe configured to control the radio 210 to transmit and receive wireless communications via the antenna 215. As further described below, the configuration of the communications device 200 may be the same or similar to the configuration of the communications device 100 to support communications involving chirp transmissions and multiplexing as described herein.

Figure 2:
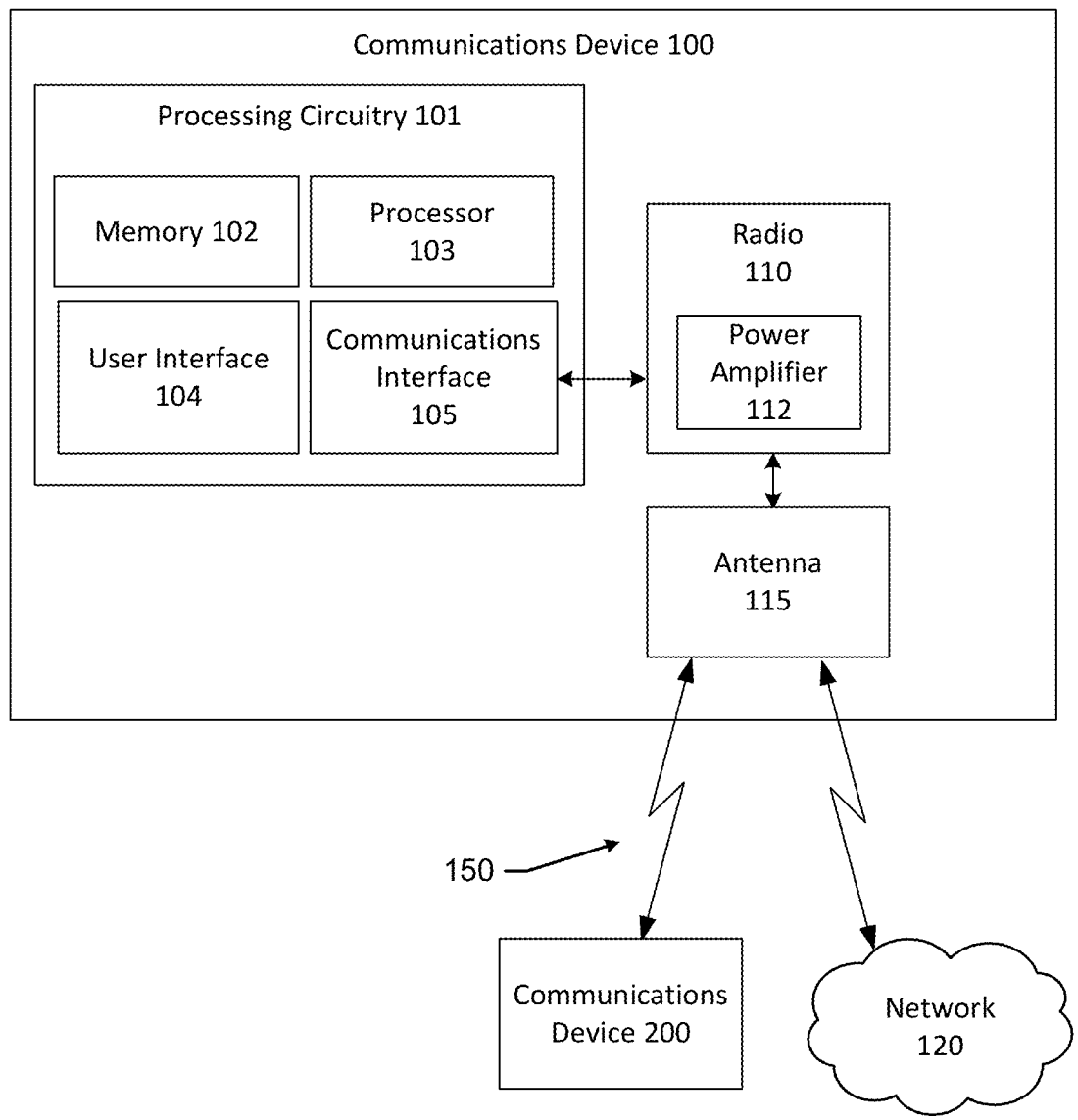
FIG. 2 illustrates an example communications device of a communications system according to some example embodiments.

In this regard, FIG. 2 shows a more detailed version of the communications device 100, and, in particular, the processing circuitry 101. Again, shown in FIG. 2, the communications device 100 may comprise the processing circuitry 101, the radio 110, and the antenna 115. However, the link 150 is shown as being a communications link to communications device 200, or as a communications link to the network 120, which may be any type of wired or wireless communications network.

The processing circuitry 101 may be configured to receive inputs and provide outputs in association with the various functionalities of the communications device 100. In this regard, the processing circuitry 101 may comprise, for example, a memory 102, a processor 103, a user interface 104, and a communications interface 105. The processing circuitry 101 may be operably coupled to other components of the communications device 100 or other components of a device that comprises the communications device 100.

Further, according to some example embodiments, processing circuitry 101 may be in operative communication with or embody, the memory 102, the processor 103, the user interface 104, and the communications interface 105. Through configuration and operation of the memory 102, the processor 103, the user interface 104, and the communications interface 105, the processing circuitry 101 may be configurable to perform various operations as described herein. In this regard, the processing circuitry 101 may be configured to perform computational processing, memory management, user interface control and monitoring, and manage remote communications, signal development and generation, according to an example embodiment. In some embodiments, the processing circuitry 101 may be embodied as a chip or chip set. In other words, the processing circuitry 101 may comprise one or more physical packages (e.g., chips) including materials, components or wires on a structural assembly (e.g., a baseboard). The processing circuitry 101 may be configured to receive inputs (e.g., via peripheral components), perform actions based on the inputs, and generate outputs (e.g., for provision to peripheral components). In an example embodiment, the processing circuitry 101 may include one or more instances of a processor 103, associated circuitry, and memory 102. As such, the processing circuitry 101 may be embodied as a circuit chip (e.g., an integrated circuit chip, such as a field programmable gate array (FPGA)) configured (e.g., with hardware, software or a combination of hardware and software) to perform operations described herein.

In an example embodiment, the memory 102 may include one or more non-transitory memory devices such as, for example, volatile or non-volatile memory that may be either fixed or removable. The memory 102 may be configured to store information, data, applications, instructions or the like for enabling, for example, the functionalities described with respect to chirp transmissions and multiplexing. The memory 102 may operate to buffer instructions and data during operation of the processing circuitry 101 to support higher-level functionalities, and may also be configured to store instructions for execution by the processing circuitry 101. The memory 102 may also store signaling schemes and techniques as described herein. According to some example embodiments, such data may be generated based on other data and stored or the data may be retrieved via the communications interface 105 and stored.

As mentioned above, the processing circuitry 101 may be embodied in a number of different ways. For example, the processing circuitry 101 may be embodied as various processing means such as one or more processors 103 that may be in the form of a microprocessor or other processing element, a coprocessor, a controller or various other computing or processing devices including integrated circuits such as, for example, an ASIC (application specific integrated circuit), an FPGA, or the like. In an example embodiment, the processing circuitry 101 may be configured to execute instructions stored in the memory 102 or otherwise accessible to the processing circuitry 101. As such, whether configured by hardware or by a combination of hardware and software, the processing circuitry 101 may represent an entity (e.g., physically embodied in circuitry—in the form of processing circuitry 101) capable of performing operations according to example embodiments while configured accordingly. Thus, for example, when the processing circuitry 101 is embodied as an ASIC, FPGA, or the like, the processing circuitry 101 may be specifically configured hardware for conducting the operations described herein. Alternatively, as another example, when the processing circuitry 101 is embodied as an executor of software instructions, the instructions may specifically configure the processing circuitry 101 to perform the operations described herein.

The communication interface 105 may include one or more interface mechanisms for enabling communication by controlling the radio 110 to generate the communications link 150. In some cases, the communication interface 105 may be any means such as a device or circuitry embodied in either hardware, or a combination of hardware and software that is configured to receive or transmit data from/to devices in communication with the processing circuitry 101. The communications interface 105 may support wireless communications via the radio 110 using various communications protocols (802.11 WIFI, Bluetooth, cellular, WLAN, 3GPP NR, 4G, LTE, 5G, and the like or the like).

The user interface 104 may be controlled by the processing circuitry 101 to interact with peripheral devices that can receive inputs from a user or provide outputs to a user. In this regard, via the user interface 104, the processing circuitry 101 may be configured to provide control and output signals to a peripheral device such as, for example, a keyboard, a display (e.g., a touch screen display), mouse, microphone, speaker, or the like. The user interface 104 may also produce outputs, for example, as visual outputs on a display, audio outputs via a speaker, or the like.

The radio 110 may be any type of physical radio comprising radio components. For example, the radio 110 may include components such as a power amplifier 112, mixer, local oscillator, modulator/demodulator, and the like. The components of the radio 110 may be configured to operate in a plurality of spectral bands to support the transmission and receipt of chirp signals. Further, the radio 110 may be configured to receive signals from the processing circuitry 101 for transmission to the antenna 115. In some example embodiments, the radio 110 may be a software-defined radio or a hybrid software/hardware-defined radio.

The antenna 115 may be any type of wireless communications antenna. The antenna 115 may be a configured to be controlled to transmit and receive at more than one frequency or band. In this regard, according to some example embodiments, the antenna 115 may be an array of antennas that may be configured by the radio 115 to support various types of wireless communications as described herein.

Having described aspects of the components of communications system 10, the following describes the implementation of communications involving chirp transmissions and multiplexing via specific configurations of the processing circuitry 101 to control the radio 110 and the antenna 115. In this regard, an example way of increasing the reliability and security of communication systems may be to establish the communication link 150 over multiple bands, e.g., L-Band (1-2 GHz) and C-Band (4-8 GHz) for aeronautical networks. However, simultaneous use of multiple bands can cause large instantaneous power fluctuations at the input of power amplifier 112 of the radio 110 due to the constructive or destructive additions of the signals on different bands. As a result of such large power fluctuations, the power efficiency of the overall communication system may be reduced, which may lead to a shortened battery life and smaller communication range for many power-limited devices, e.g., IoT devices, aerial drones, and the like. Attempts to fluctuate the instantaneous signal power by using, for example, traditional single-carrier waveforms or constant-amplitude schemes like minimum-shift keying (MSK) signals for each band have been shown to be ineffective in many cases because the superposition of these signals may not ensure low instantaneous power fluctuations.

According to some example embodiments, when multiple chirp signals are transmitted simultaneously, similar instantaneous power fluctuations can result when supporting multi-user communications or single-user designs for high data rate. While in isolation each individual chirp signal has no instantaneous power fluctuations, the superposition of the chirp signals can cause arbitrary power fluctuations. Such power fluctuations may require a reduction in the power output to the power amplifier 112 of the radio 110 to avoid saturation at the power amplifier 112. If the power is not reduced (e.g., no power back-off), the power amplifier 112 may distort the signal and cause interference to any adjacent channels due to the spectral regrowth. Hence, the need to implement such power back-offs can offset the benefits of the chirp transmission, e.g., immunity against interference and time-varying multipath channel distortions. In other words, well-known power-efficient modulation schemes, which may be optimal for single band/channel, may lose their advantages in the context of multi-band/multi-channel transmission.

However, as described herein, some example embodiments provide new multi-channel power-efficient modulation schemes, for use by communications devices such as communications device 100, that overcome these and other limitations of the prior art. According to various example embodiments, increased battery life and increased communication link distance can be realized while maintaining low-complexity operations at transmitter and receiver.

In this regard, example embodiments for implementing orthogonal chirp multiplexing in the context of, for example, low-complexity transmitters/receivers is provided. To do so, according to some example embodiments, a complementary sequence-based chirp spread spectrum approach may be implemented using coded orthogonal chirp division multiplexing, trajectory encoding with multi-DFT clusters and shift encoders. The implementation of such chirp transmissions and multiplexing as described herein may be applied in, for example power-limited communication devices such as internet-of-things (IoT) devices and permit the devices to transmit more information bits or transmit signals at further distances. Additionally, as described herein the implementation of chirp transmissions and multiplexing may also be applied in other communications contexts such as with aerial communications, including aerial drone communications, where again limitations on power usage may be considered but longer transmission distances may be required.

As such, the processing circuitry 101 of the communications device 100 may be configured to control the radio 110 and the antenna 115 to communicate via the implementation of complementary sequences for chirp transmissions as further described below. In this regard, a polynomial representation of a sequence $a=(a_0, a_1, \ldots, a_{N-1})$ is given by:

$$p_a(z) = a_{N-1}z^{N-1} + a_{N-2}z^{N-2} + \ldots a_0 \quad (1)$$

Based on the polynomial representation, the following interpretations can be made. In this regard, $$z \in \left\{ e^{\frac{j2\pi t}{T}} | 0 \le t < T \right\},$$

$p_a(z)$ may be equivalent to an OFDM signal in time where T is the OFDM symbol duration and the frequency domain coefficients are the elements of a where $a_0$ is mapped to the DC tone. Further, $$z \in \left\{ e^{\frac{j2\pi t}{T}} | 0 \le t < T \right\},$$

the instantaneous power of an OFDM symbol, can be calculated as $|p_a(z)|^2 = p_a(z)p_a \cdot (z^{-1})$ as $p_a \cdot (z^{-1}) = (p_a(z))^*$. Thus, the peak-to-average-power ratio (PAPR) of $p_a(z)$ can be obtained by using $|p_a(z)|^2$ within a period of $$z = e^{\frac{j2\pi t}{T}}$$

where t=[0, T). To represent a sequence, let $f$ be a function that maps from $\mathbb{Z}_2^m = \{(x_1, x_2, \ldots, x_m) | x_i \in \{0,1\}\}$ to $\mathbb{S}$ as $$f(x_1, x_2, \ldots, x_m): \mathbb{Z}_2^m \to \mathbb{S} \quad (2)$$

A sequence $f$ of length $2^m$ may be associated with the function $f(x_1, x_2, \ldots, x_m)$ by listing its values as $(x_1, x_2, \ldots, x_m)$ ranges over its $2^m$ values in lexicographic order. In other words, the (x+1)th element of the sequence $f$ may be equal to $f(x_1, x_2, \ldots, x_m)$ where $x = \sum_{j=1}^m x_j 2^{m-j}$ (i.e., the most significant bit is $x_1$). The sequence x and $f(x)$ may denote $(x_1, x_2, \ldots, x_m)$ and $f(x_1, x_2, \ldots, x_m)$, respectively. Note that $\mathbb{S} = \mathbb{Z}_2$, $f(x)$ may be a Boolean function, and $f \mathbb{S} = \mathbb{Z}_H$, $f(x)$ may be called a generalized Boolean function.

With respect an algebraic normal form (ANF), a generalized Boolean function can be uniquely expressed as a linear combination over $\mathbb{Z}_H$ of the monomials as $$f(x_1, x_2, \ldots, x_m) = f(x) = \quad (3)$$
$$\sum_{k=0}^{2^m-1} c_k \underbrace{\prod_{j=1}^m x_j^{k_j}}_{\text{ith monomial}} = c_0 1 + c_1(x_1)_2 + c_2(x_2)_2 + \ldots c_{m+1}(x_1 x_2)_2 + \ldots$$

where the coefficient of each monomial belongs to $\mathbb{Z}_H$ i.e., $c_k \in \mathbb{Z}_H$ and $k = \sum_{j=1}^m k_j 2^{m-j}$ and $x_j \in \mathbb{Z}_2$. Note that monomials, e.g., 1, $x_1$, $x_2$, $x_1 x_2$, ..., and $x_1 x_2 \ldots x_m$ may be linearly independent. Linear independence can be proven by using the definition of linear independence, i.e., $\Sigma_i a_i x^i = 0$ if and only if $a_i = 0$ for all x.

For example, let m=3 and H=4. Then $$f(x_1,x_2,x_3) = c_0 x_1^0 x_2^0 x_3^0 + c_1 x_1^0 x_2^0 x_3^1 + c_2 x_1^0 x_2^1 x_3^0 +$$
$$c_3 x_1^0 x_2^1 x_3^1 + c_4 x_1^1 x_2^0 x_3^0 + c_5 x_1^1 x_2^0 x_3^1 +$$
$$c_6 x_1^1 x_2^1 x_3^0 + c_7 x_1^1 x_2^1 x_3^1. \quad (4)$$

Assume that $c_0 = 3$ and $c_5 = 2$ and other $c_n = 0$ for n=1, 2, 3, 4, 6, 7. Then, $$f(x_1, x_2, x_3) = 3 + 2x_1 x_3. \quad (5)$$

As described above, a sequence $f$ of length $2^m$ may be associated with the function $f(x_1, x_2, \ldots, x_m)$ by listing its values as $(x_1, x_2, \ldots, x_m)$ ranges over its $2^m$ values in lexicographic order. In other words, the (x+1)th element of the sequence $f$ is equal to $f(x_1, x_2, \ldots, x_m)$ where $x=\Sigma_{j=1}^{m} x_j 2^{m-j}$ (i.e., the most significant bit is $x_1$)

$f(x_1=0, x_2=0, x_3=0)=3+2x_1x_3=3 \mod 4=3$ $f(x_1=0, x_2=0, x_3=1)=3+2x_1x_3=3 \mod 4=3$ $f(x_1=0, x_2=1, x_3=0)=3+2x_1x_3=3 \mod 4=3$ $f(x_1=0, x_2=1, x_3=1)=3+2x_1x_3=3 \mod 4=3$ $f(x_1=1, x_2=0, x_3=0)=3+2x_1x_3=3 \mod 4=3$ $f(x_1=1, x_2=0, x_3=1)=3+2x_1x_3=5 \mod 4=1$ $f(x_1=1, x_2=1, x_3=0)=3+2x_1x_3=3 \mod 4=3$ $f(x_1=1, x_2=1, x_3=1)=3+2x_1x_3=5 \mod 4=1$ Therefore, $f(x_1, x_2, x_3)=3+2x_1x_3$ leads to a sequence of $f=(3,3,3,3,3,1,3,1)$. All the possible monomials construct a basis for the generalized Boolean functions. Since there are $2^m$ monomials for a given m, there are $H^{2^m}$ different generalized Boolean functions, each of which is a mapping $\mathbb{Z} \to \mathbb{Z}_H$. If $f(x_1, x_2, \ldots, x_m)$ is over $\mathbb{Z}$, the coefficient of each monomial belongs to $\mathbb{Z}$, i.e., $c_k \in \mathbb{Z}$ and the monomials construct a vector space over $\mathbb{Z}$ and the dimensionality of the space is $2^m$. Therefore, different sets of $\{c_k | k=0, \ldots, 2^{m-1}\}$ lead to different sequences.

Now with respect to aperiodic auto correlation (APAC) of the sequence, $\rho_a(k)$ may be the aperiodic autocorrelation of a complex sequence a of length N and $\rho_a(k)$ is expressed as $$\rho_a(k) \triangleq \begin{cases} \rho_a^+(k), & k \geq 0 \\ \rho_a^+(-k)^*, & k < 0 \end{cases} \quad (6)$$

where $$\rho_a^+(k) \triangleq \begin{cases} \sum_{i=0}^{N-k-1} a_i^* a_{i+k}, & 0 \leq k \leq N-1 \\ 0, & \text{otherwise} \end{cases} \quad (7)$$

To generate the complementary sequences, a Golay complementary pair and a Golay sequence may be considered. In this regard, the pair of (a,b) is called a Golay complementary pair (GCP) if $$\rho_a(k)+\rho_b(k)=0, k\neq 0. \quad (8)$$

The sequence $a=(a_0, a_1, \ldots, a_{N-1})$ may be defined as a complementary sequence (CS) if there exists another sequence $b=(b_0, b_1, \ldots, b_{N-1})$ which complements a as $\rho_a(k)+\rho_b(k)=0, k\neq 0$. Additionally, the PAPR of a CS can be less than 3 dB.

With respect to a complementary sequence encoder, the following theorem for constructing complementary sequences is provided. Theorem: Let wC denote any permutation $\{1, 2, \ldots, m\}$ and (a,b) be a Golay complementary pair (GCP) of length N and calculate $$f_o(x, z) = (p_a(z)(1 - x_{\pi(1)}) + p_b(z)x_{\pi(1)}) \quad (9)$$

$$f_r(x) = e_0 + e_m x_{\pi(m)} + \sum_{l=1}^{m-1} e_l(x_{\pi(l)} + x_{\pi(l+1)}) \quad (10)$$

$$f_i(x) = k_0 + \sum_{l=1}^{m} k_l x_{\pi(l)} + \frac{H}{2}\sum_{l=1}^{m-1} x_{\pi(l)}x_{\pi(l+1)} \quad (11)$$

$$f_s(x) = \sum_{n=1}^{m} d_n x_{\pi(n)} \quad (12)$$

where $x=(x_1, x_2, \ldots x_m)$ and $x=\Sigma_j^{2^m} x_j 2^{m-j}$ for $x_j \in \mathbb{Z}_2$, $e_n \in \mathbb{Z}$, $k_n \in [0, H)$, $d_n \in \mathbb{Z}$ for $n=0, 1, \ldots, m$. Then, the sequence c where its polynomial representation is given by $$p_c(z) = \sum_{x=0}^{2^m-1} f_o(x, z) \times e^{\frac{2\pi}{H}(f_r(x)+jf_i(x))} \times z^{f_s(x)+xN} \quad (13)$$

is a complementary sequence (CS).

The polynomial $p_c(z)$ forms an OFDM symbol for $$z = e^{\frac{2\pi t}{T}}$$

and limits the peak-to-average-power ratio to be less than or equal to 2 (i.e., approximately 3 dB) as the sequence c is a CS. Additionally, the parameters, i.e., $e_n$, $k_n$, $d_n$ can be selected, for example, based on information bits and demonstrations for random bit mappings.

Now, with respect to a first example embodiment that involves the implementation of low-PAPR coded orthogonal chirp division multiplexing, M information bits may be mapped to $e_n$, $k_n$, $d_n \in \mathbb{Z}$ for $n=0, 1, 2, \ldots, m$. The calculated parameters may be processed by the amplitude, phase, and shift encoders as $$f_r(x) = e_0 + e_m x_{\pi(m)} + \sum_{l=1}^{m-1} e_l(x_{\pi(l)} + x_{\pi(l+1)}) \quad (14)$$

$$f_i(x) = k_0 + \sum_{l=1}^{m} k_l x_{\pi(l)} \quad (15)$$

$$f_s(x) = d_0 + \sum_{n=1}^{m} d_n x_{\pi(n)} \quad (16)$$

where $x=(x_1, x_2, \ldots x_m)$ and $x=\Sigma_j^{2^m} x_j 2^{m-j}$ for $x_j \in \mathbb{Z}_2$, w denotes any permutation $\{1, 2, \ldots, m\}$, and (a,b) be a GCP of length N. A multiple chirp waveform can be expressed as $$p_c(t) = \quad (17)$$

$$\sum_{x=0}^{2^m-1} f_o\left(x, e^{\frac{j2\pi t}{T}}\right) \times e^{j\pi f_{sign}(x)} \times e^{\alpha f_r(x)+j\beta f_i(x)} \times e^{\frac{j2\pi \frac{t}{T}(f_s(x)+xN)+j2\pi \psi(t)}{\phi(t)}}$$

where $f_o(x,z)=(p_a(z)(1-x_{\pi(1)})+p_b(z)x_{\pi(1)})$ and $f_{sign}(x)=\Sigma_{l=1}^{m-1} x_{\pi(l)}x_{\pi(l+1)}$, $\alpha$ and $\beta$ are non-zero values to scale the output of encoders, and $\psi(t)$ is a function that determines the trajectory of the chirps in time and frequency. Note that $p_a(z)$ and $p_b(z)$ are the polynomial representation of the sequence a and the sequence b form a GCP. Since the complex exponential term in $p_c(t)$ is a function of $\psi(t)$, for a given x, each $$f_0\left(x, e^{j\frac{2\pi t}{T}}\right) \times e^{j\pi f \text{sign}(x)} \times e^{\alpha f_r(x) + j\beta f_i(x)}$$

changes its location in time and frequency depending on $\psi(t)$. The corresponding trajectory in time-frequency for $$f_0\left(x, e^{j\frac{2\pi t}{T}}\right) \times e^{j\pi f \text{sign}(x)} \times e^{\alpha f_r(x) + j\beta f_i(x)}, \text{ i.e., } F_x(t),$$

can be obtained by calculating the instantaneous frequency as $$F_x(t) = \frac{1}{2\pi}\frac{d\phi(t)}{dt} = \frac{1}{T}(f_s(x) + xN) + \frac{d\psi(t)}{dt} \quad (18)$$

For example, if $$\psi(t) = \frac{M}{n}\left(\frac{t}{T}\right)^n,$$

with $$B \triangleq M/T$$

and T real constants representing bandwidth and symbol duration and n is a non-negative integer, respectively, the corresponding trajectory can be calculated as $$\frac{d\psi(t)}{dt} = M\frac{t^{n-1}}{T^n} \Rightarrow F_x(t) = \frac{1}{T}\left(f_s(x) + xN + M\left(\frac{t}{T}\right)^{n-1}\right). \quad (19)$$

Therefor, when t=T, the maximum deviation from the initial frequency, i.e.

$$\frac{f_s(x) + xN}{T},$$

will be $$B = \frac{M}{T}\text{Hz}.$$

Since, in some example embodiments, every time instant of the generated signal originates from a CS, the PAPR of the generated signal may, according to some example embodiments, also be less than or equal to 2 (i.e., approximately 3 dB).

Additionally several non-linear trajectories may be defined by changing $\psi(t)$ for uncoded multi-user chirp transmission while the orthogonality between the chirp signals may be lost. However, it is worth noting that the basis functions in the expression for $p_c(t)$, i.e., $$B_k(t) = e^{2\pi\frac{t}{T}k + j2\pi\psi(t)}$$

for $k \in \mathbb{Z}$ may form a complete set of orthogonal functions for any $\psi(t)$ that is not a function of k. This can be proven by using inner-product of $B_k(t)$ and $B_n(t)$ as $$\langle B_k(t) | B_n(t) \rangle \triangleq \int_0^T B_k(t) B_n^*(t) dt = \int_0^T e^{2\pi\frac{t}{T}k + j2\pi\psi(t)} e^{-2\pi\frac{t}{T}n - j2\pi\psi(t)} dt \quad (20)$$

$$= \int_0^T e^{j\frac{2\pi t}{T}(k-n)} dt = \delta_{nk}$$

where $\delta_{nk}$ is Kronecker delta function. Hence, $\psi(t)$ may be flexibly chosen depending on the application without losing the orthogonality of the basis functions in this embodiment. For example, it may a sinusoidal, linear, nth-order polynomial.

Figure 3:
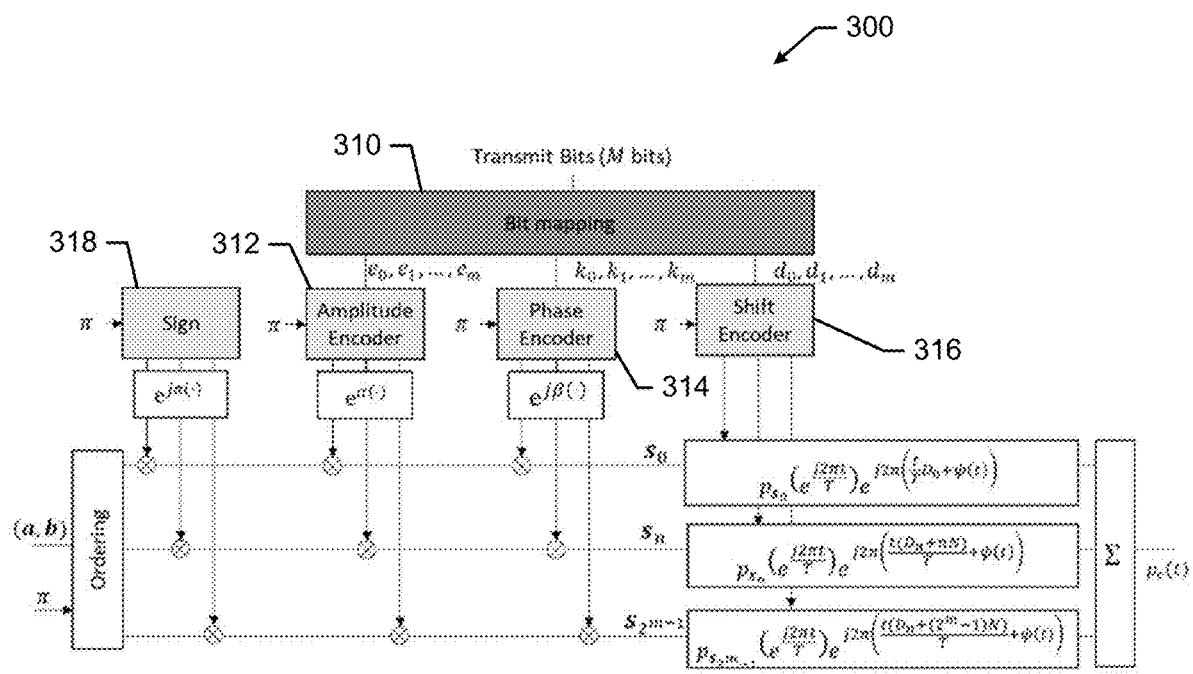
FIG. 3 illustrates block diagram of an example transmitter according to some example embodiments.

In view of this approach, a transmitter 300 may be defined as shown in FIG. 3, which may be implemented by the processing circuitry 101 of the communications device 100. In this regard, the transmitter 300 may be configured to implement low-PAPR coded orthogonal chirp division multiplexing as provided herein. The transmitter 300 may include a bit mapper 310 configured to map bits received by the bit mapper 310 to the amplitude encoder 312, the phase encoder 314, and the shift encoder 316. A sign control 318 may also operate as an input. The outputs of these various components, as shown in the FIG. 3, may be mixed and ordered to generate a polynomial representation of the complementary sequence. In this example, $s_n$ is determined by the ordering block that calculates $f_o(x,z) = (p_a(z)(1-x_{\pi(1)}) + p_b(z)x_{\pi(1)})$. Hence, the polynomial representation of the sequence $s_n$ is $p_{s_n}(z) = (p_a(z)(1-x_{\pi(1)}) + p_b(z)x_{\pi(1)})$, where $z = e^{j2\pi t/T}$.

Figure 4:
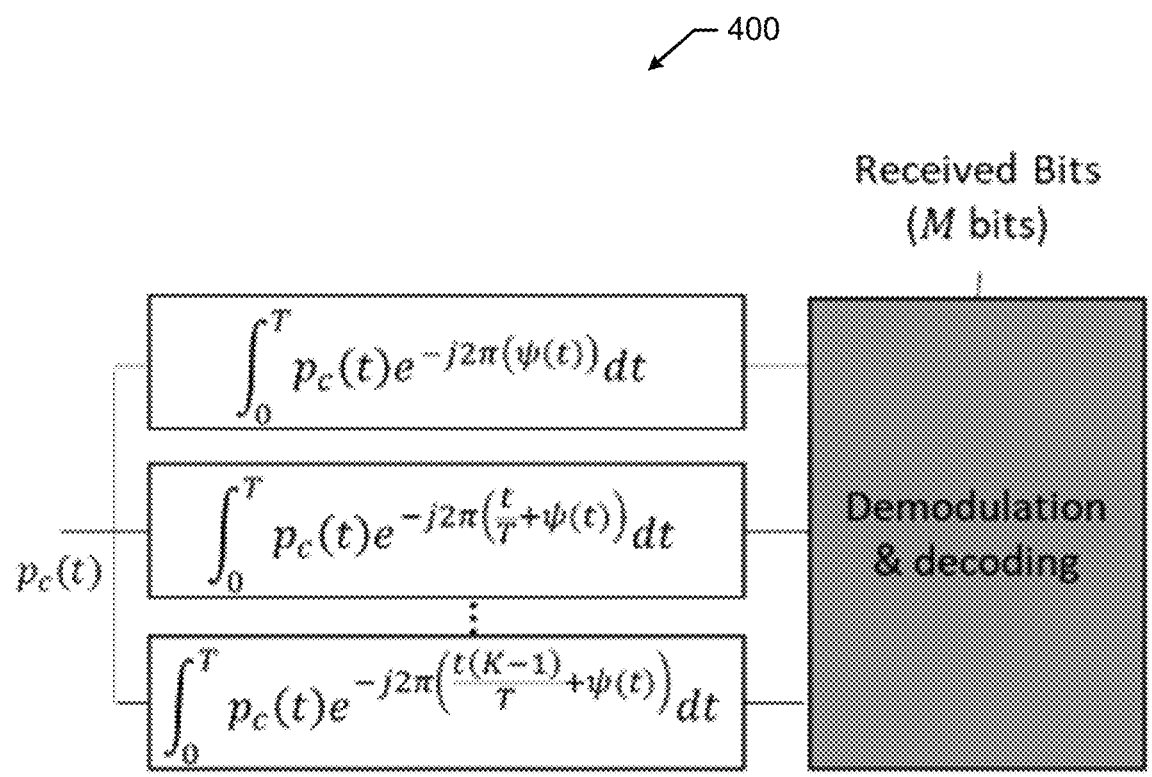
FIG. 4 illustrates block diagram of an example receiver according to some example embodiments.

Accordingly, FIG. 4 illustrates a receiver 400 that may be implemented by the processing circuitry 101 of the communications device 100. In this regard, the receiver 400 may support receipt of communications in the context of low-PAPR coded orthogonal chirp division multiplexing. In this regard, the receiver 400 may be configured to exploit the orthogonality of the basis functions. The receiver 400 may be configured to calculate K inner-product operations with the received signal and each basis function $B_n(t)$ for n=0, . . . , K−1, where K is the total number of possible chirps. Then, the receiver 400 may be configured to estimate $D_0, D_1, \ldots, D_{2^{m-1}}$ and decode $e_n, k_n, d_n \in \mathbb{Z}$ for n=0, 1, . . . , m and calculate the received bits.

For the transmitter 300, the baseband signal may be generated through the samples of the waveform $p_c(t)$ and a fast Fourier transform (FFT)-based implementation may be used.

The following provides some example implementations of sequences for chirp transmissions and multiplexing as described above and with respect to FIGS. 3 and 4. In one example embodiment, the sample rate of the system 10 may be $f_s=80$ MHz and where there are $N_s=1024$ samples in the signal. Therefore, the symbol duration $$T = \frac{N_s}{f_s} = 12.8 \mu s.$$

Let m=3, $d_0$=−300, $d_1$=50, $d_2$=200, $d_3$=300, β=2π/4, π=0 (i.e., no amplitude encoder), $k_0$=1, $k_1$=0, $k_2$=1, $k_3$=1, π=(3, 2,1), and (a,b)=(1,1). Therefore, the shift encoder leads to $(D_0, D_1, \ldots, D_7)$=(−300, −250, −100, −50, 0, 50, 200, 250). The frequency deviation may be 10 MHz, with the following functions ψ(t)

$$\psi(t) = \frac{B}{n}\left(\frac{t}{T}\right)^n \text{ where } n =$$

$$2 \to \text{Instantaneous frequency } F_x(t) = \frac{1}{T}\left(D_x + xN + M\left(\frac{t}{T}\right)^1\right)$$

$$\psi(t) = \frac{B}{n}\left(\frac{t}{T}\right)^n \text{ where } n =$$

$$4 \to \text{Instantaneous frequency } F_x(t) = \frac{1}{T}\left(D_x + xN + M\left(\frac{t}{T}\right)^3\right)$$

$$\psi(t) = \frac{B}{n}\left(\frac{t}{T}\right)^n \text{ where } n =$$

$$11 \to \text{Instantaneous frequency } F_x(t) = \frac{1}{T}\left(D_x + xN + M\left(\frac{t}{T}\right)^{10}\right)$$

Since the frequency deviation is $$B = \frac{M}{T}\text{Hz},$$

Figure 5:
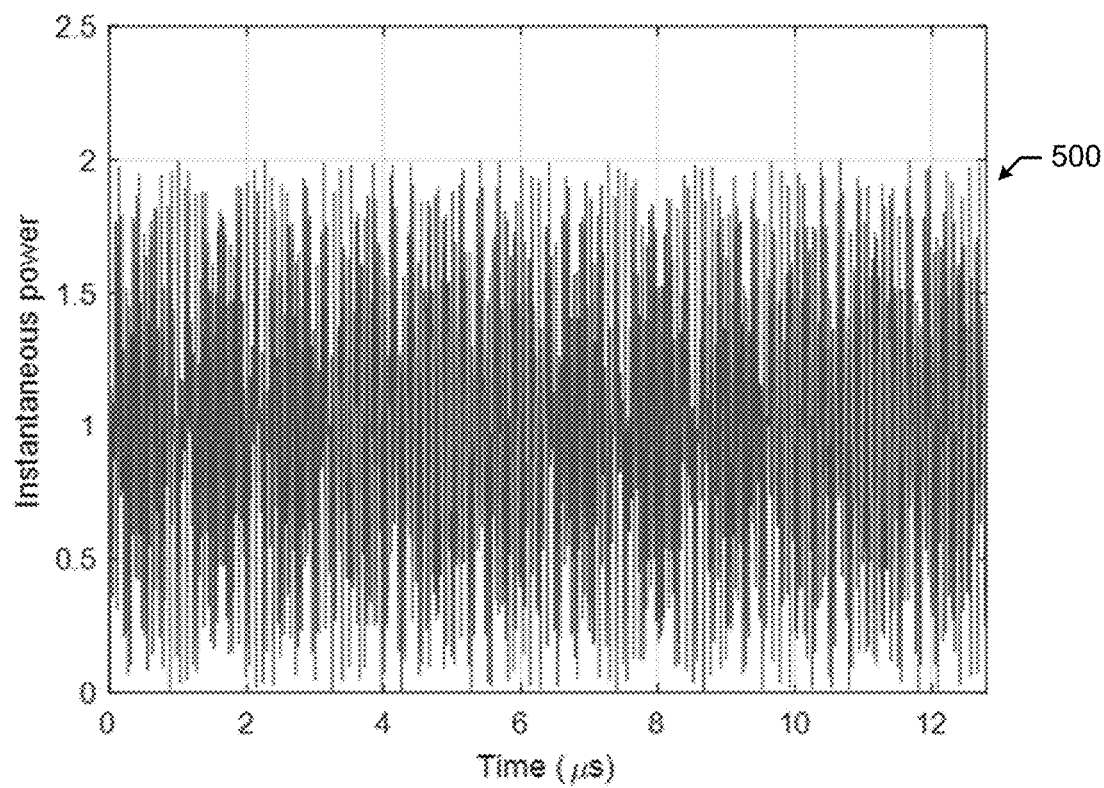
FIG. 5 is a graph of instantaneous power with respect to time for example chirp signals according to some example embodiments.
Figure 6:
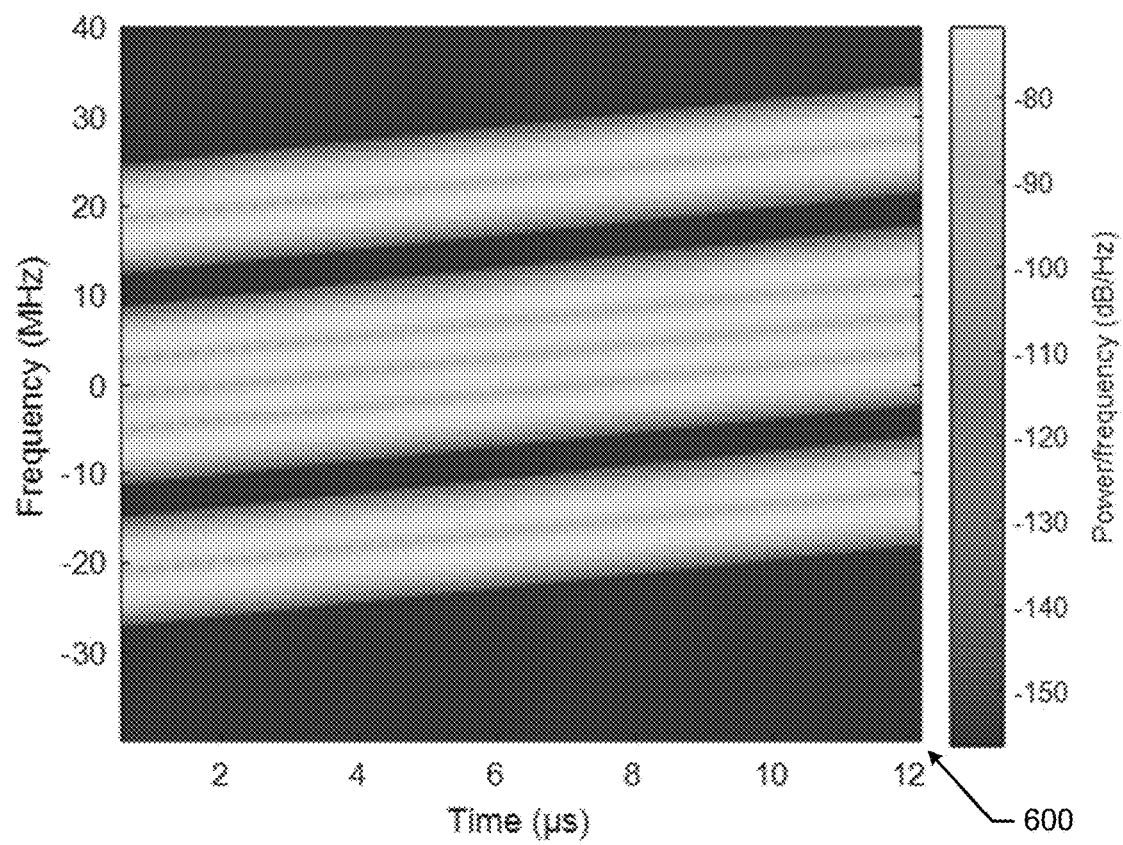
FIG. 6 is a spectrogram graph of frequency with respect to time for example chirp signals according to some example embodiments.
Figure 7:
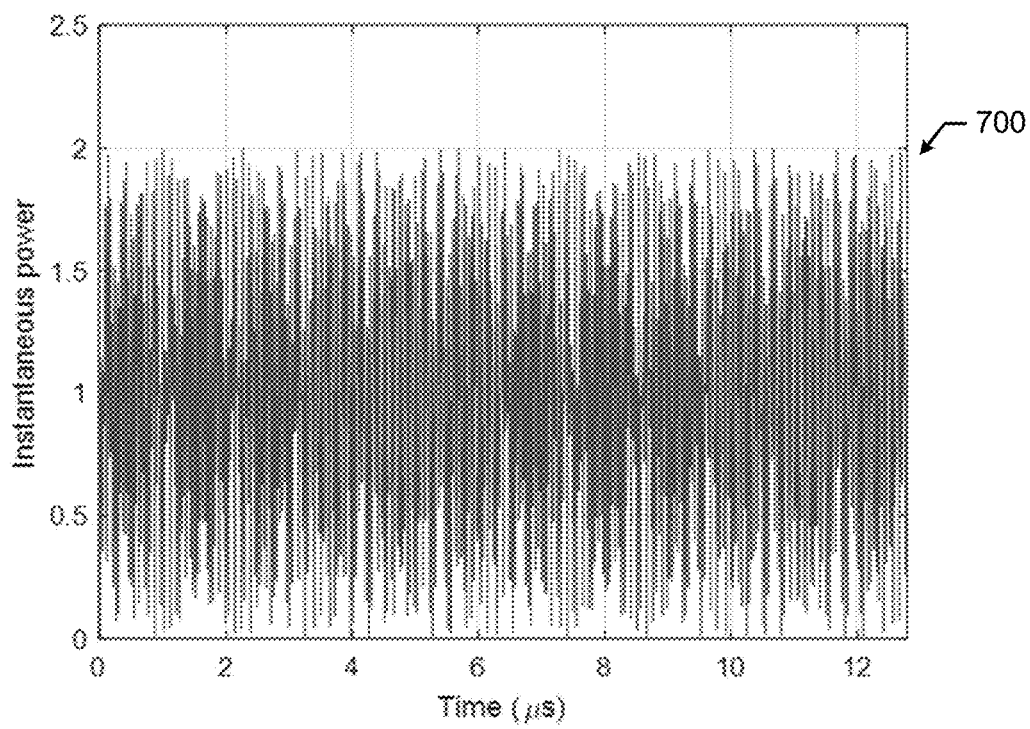
FIG. 7 is a graph of instantaneous power with respect to time for example chirp signals according to some example embodiments.
Figure 8:
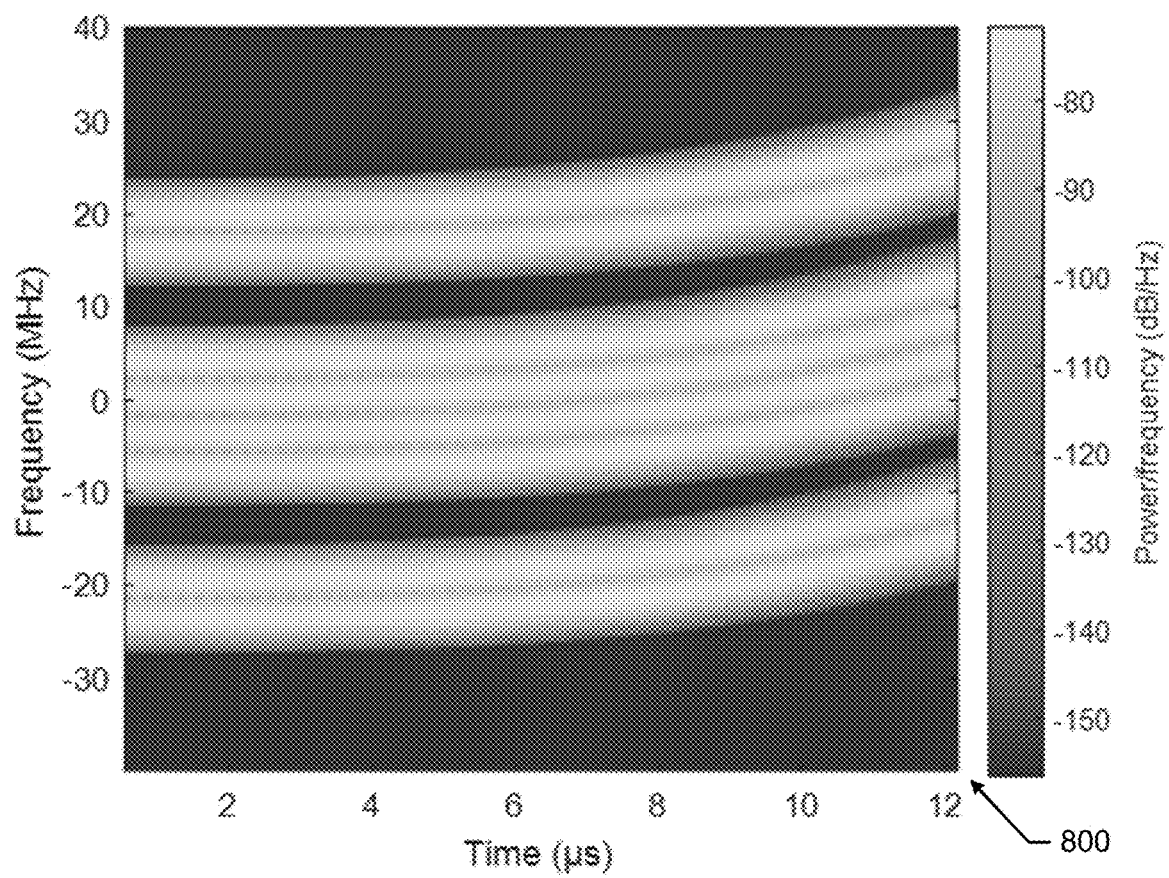
FIG. 8 is a spectrogram graph of frequency with respect to time for example chirp signals according to some example embodiments.
Figure 9:
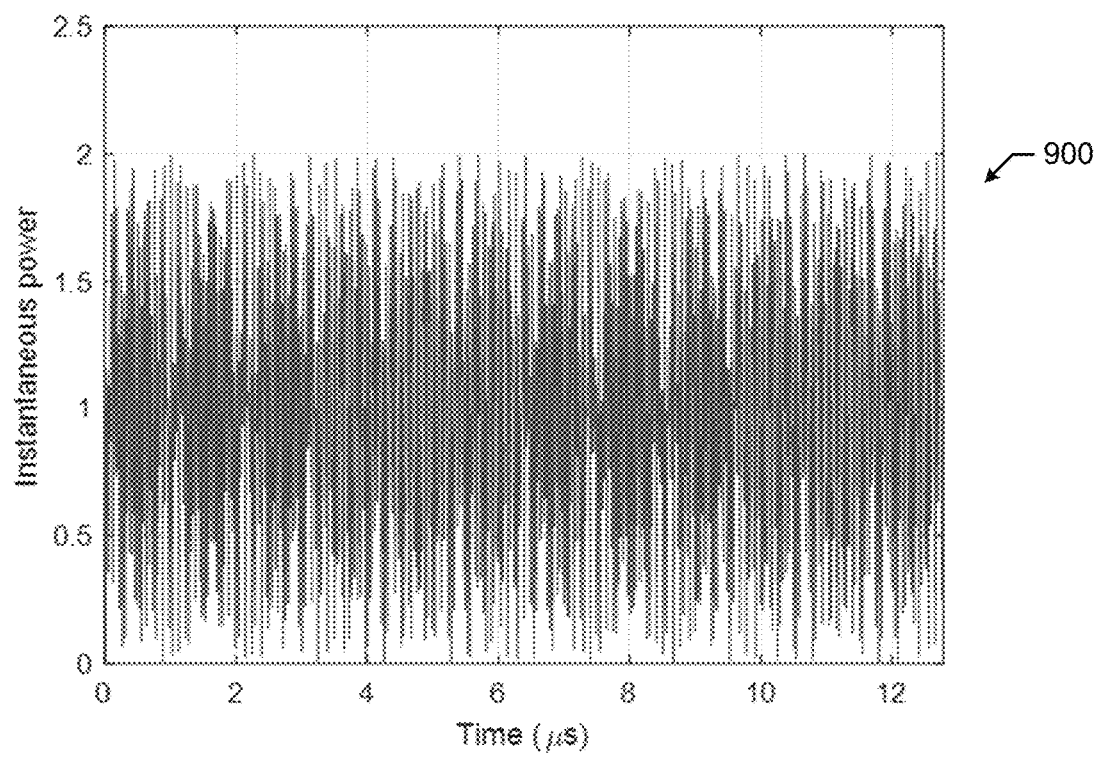
FIG. 9 is a graph of instantaneous power with respect to time for example chirp signals according to some example embodiments.
Figure 10:
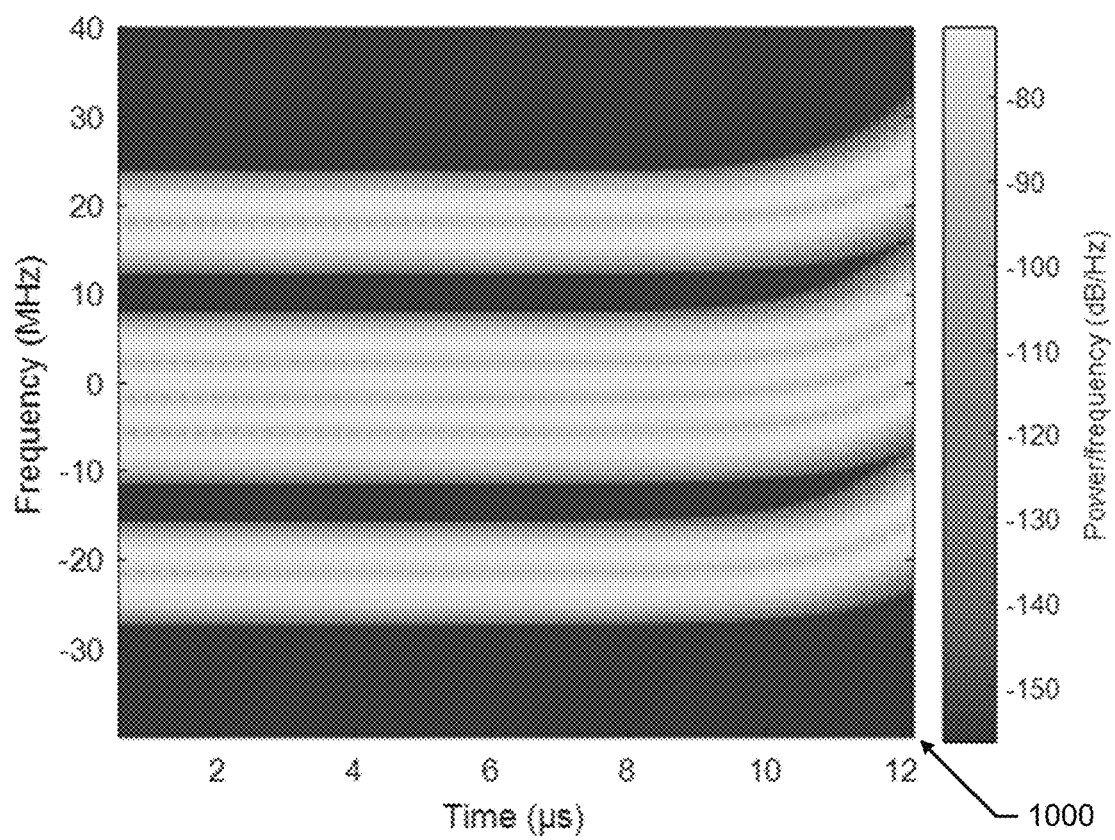
FIG. 10 is a spectrogram graph of frequency with respect to time for example chirp signals according to some example embodiments.

M is obtained as M=10 MHz×12.8 μs=128. In FIGS. 5-10, the instantaneous signal power and trajectories for polynomial ψ(t) for different orders are illustrated. In all cases, the orthogonality of the basis functions is retained and the PAPR of the signal is less than or equal to 3 dB. In this regard, the graph 500 of FIG. 5 is the instantaneous power with respect to time where n=2 and the graph 600 of FIG. 6 is the frequency with respect to time where n=2. The graph 700 of FIG. 7 is the instantaneous power with respect to time where n=4 and the graph 800 of FIG. 8 is the frequency with respect to time where n=4. Further, the graph 900 of FIG. 9 is the instantaneous power with respect to time where n=11 and the graph 1000 of FIG. 10 is the frequency with respect to time where n=11.

Further in this regard, it may be considered that $$\psi(t) = \frac{M}{4\pi}\sin\left(2\pi\frac{t}{T}\right).$$

As such, the instantaneous frequency for the xth component can be calculated as $$F_x(t) = \frac{1}{2\pi}\frac{d\phi(t)}{dt} = \frac{1}{T}\left((f_s(x) + xN) + \frac{M}{2}\cos\left(2\pi\frac{t}{T}\right)\right) \quad (21)$$

Therefore, the minimum and the maximum instantaneous signal frequency can be calculated as $$\frac{1}{T}\left((f_s(x) + xN) - \frac{M}{2}\right) \text{ and } \frac{1}{T}\left((f_s(x) + xN) + \frac{M}{2}\right).$$

Further, the occupied bandwidth may be $$\frac{M}{T}\text{Hz}.$$

As such, for 5 MHz bandwidth, M=64; for 10 MHz bandwidth, M=128; for 10 MHz bandwidth, M=128; and for 15 MHz bandwidth, M=192.

In FIGS. 11-16, the instantaneous signal power and trajectories for a sinusoidal ψ(t) for different frequency bandwidths of each chirp signal are illustrated. According to some example embodiments, in all cases, the orthogonality of the basis functions is kept and the PAPR of the signal is less than or equal to 3 dB.

Figure 11:
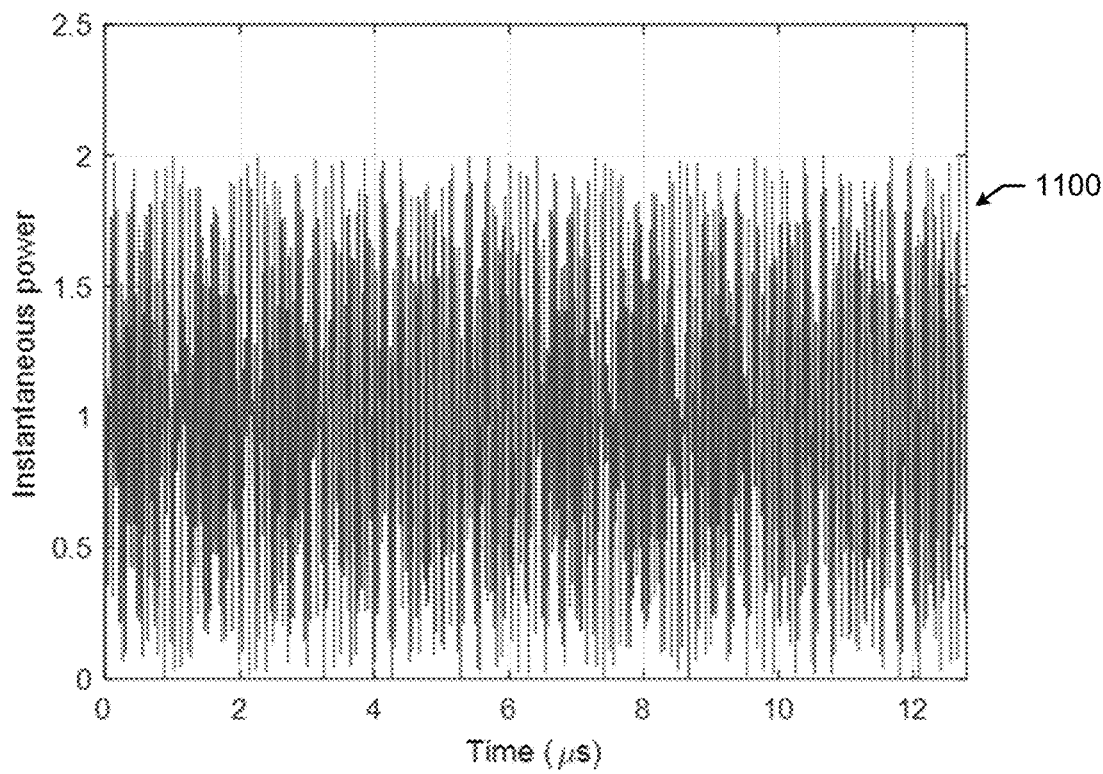
FIG. 11 is a graph of instantaneous power with respect to time for example chirp signals according to some example embodiments.
Figure 12:
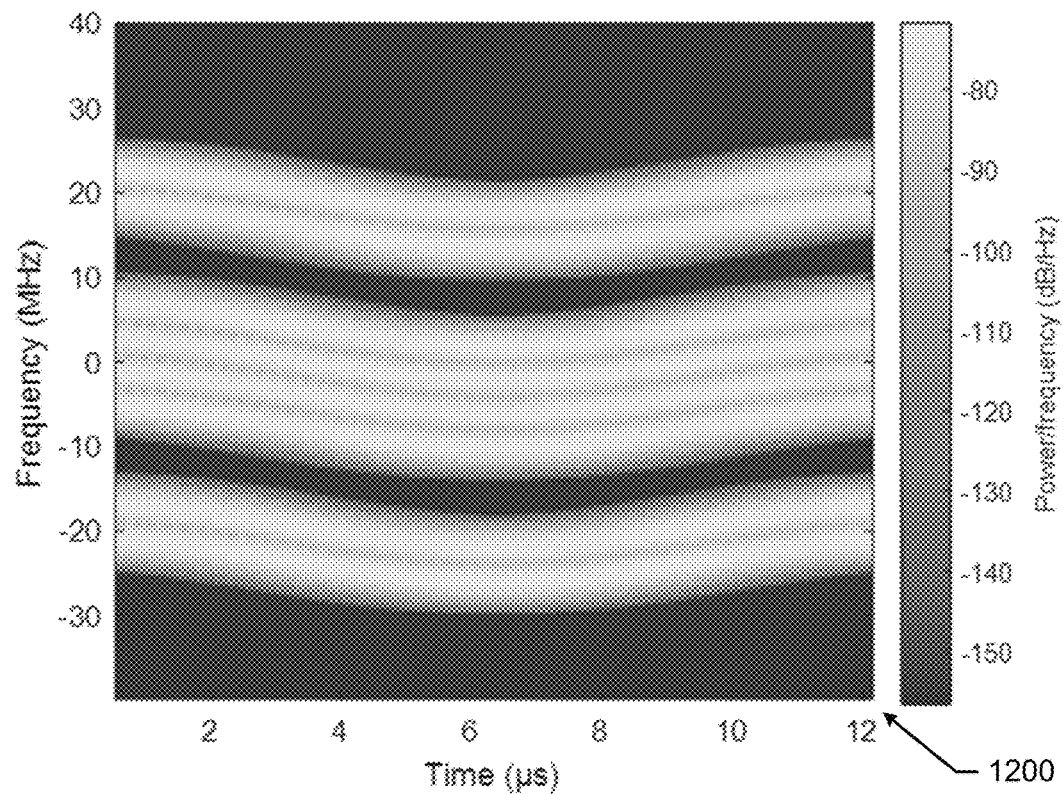
FIG. 12 is a spectrogram graph of frequency with respect to time for example chirp signals according to some example embodiments.
Figure 13:
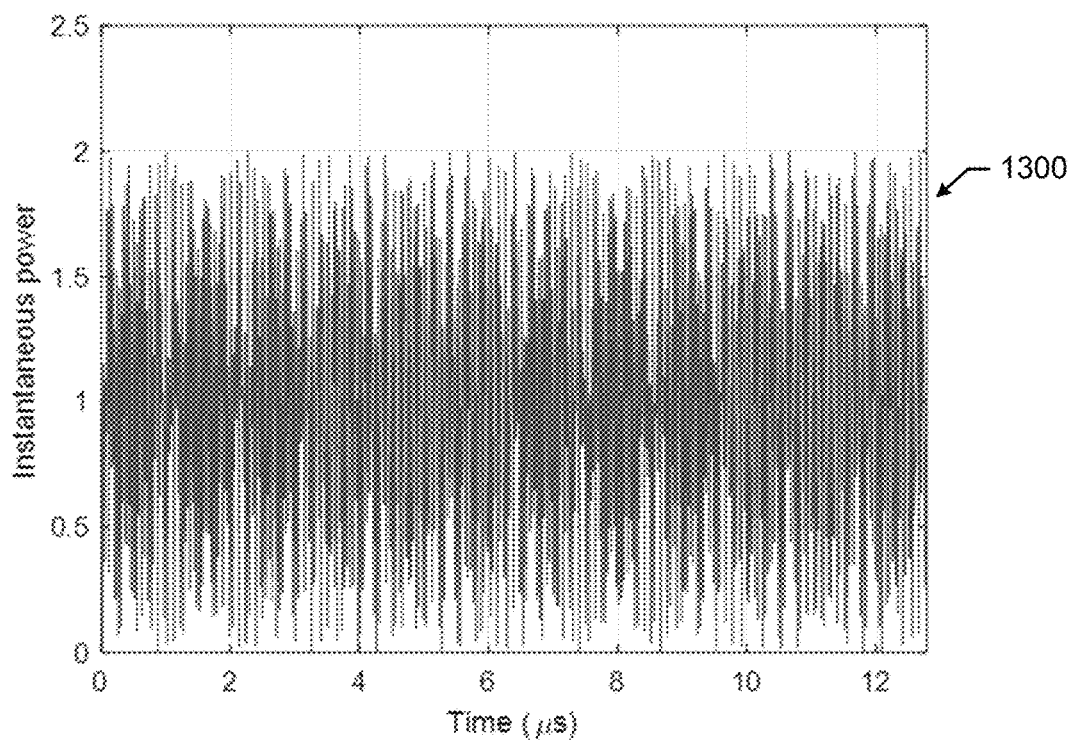
FIG. 13 is a graph of instantaneous power with respect to time for example chirp signals according to some example embodiments.
Figure 14:
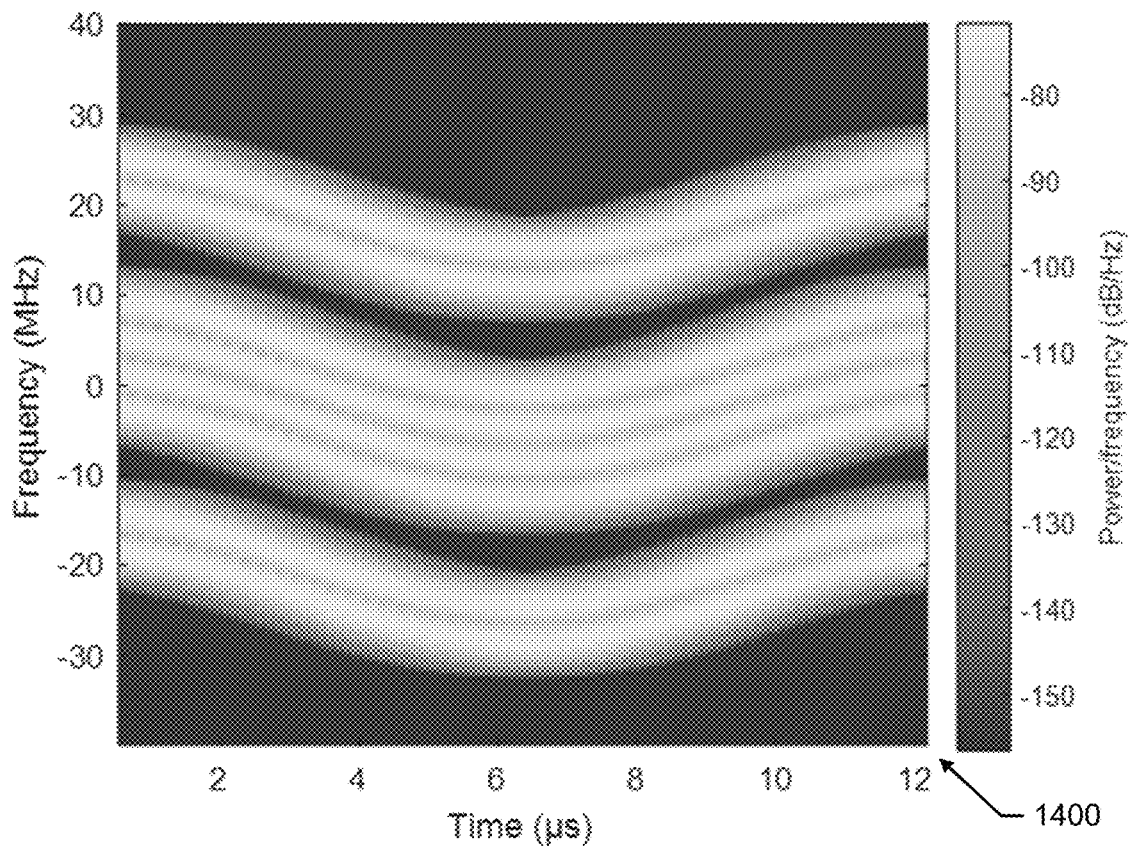
FIG. 14 is a spectrogram graph of frequency with respect to time for example chirp signals according to some example embodiments.
Figure 15:
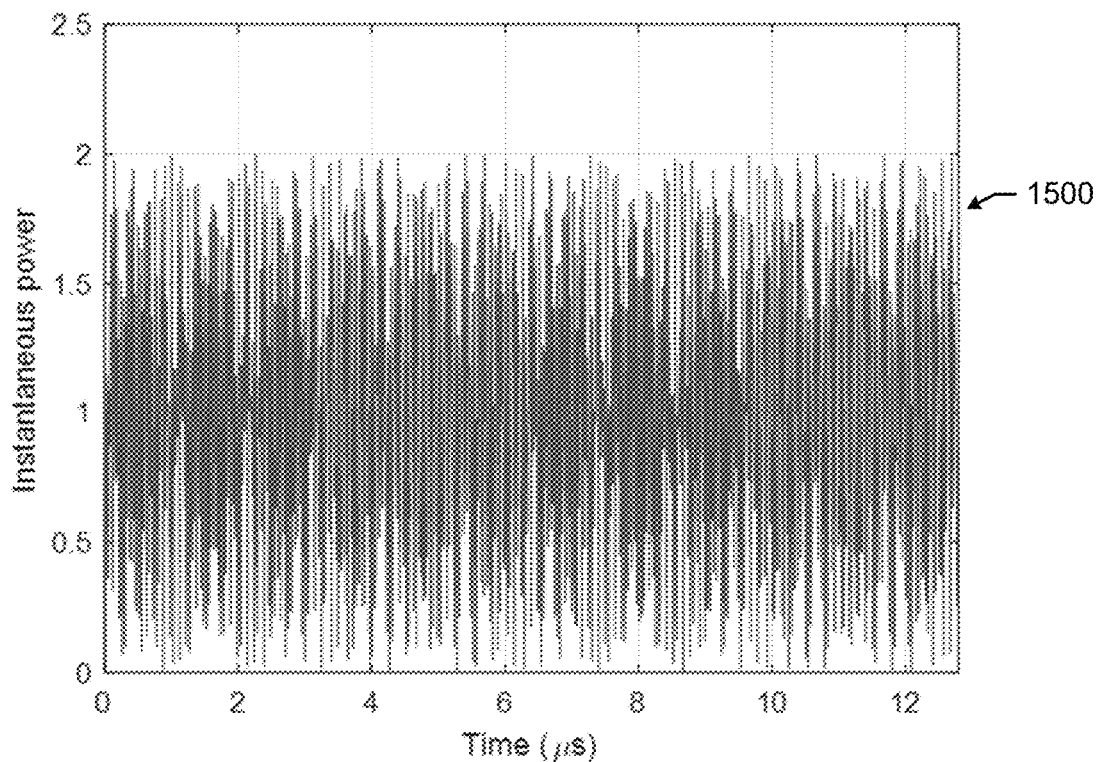
FIG. 15 is a graph of instantaneous power with respect to time for example chirp signals according to some example embodiments.
Figure 16:
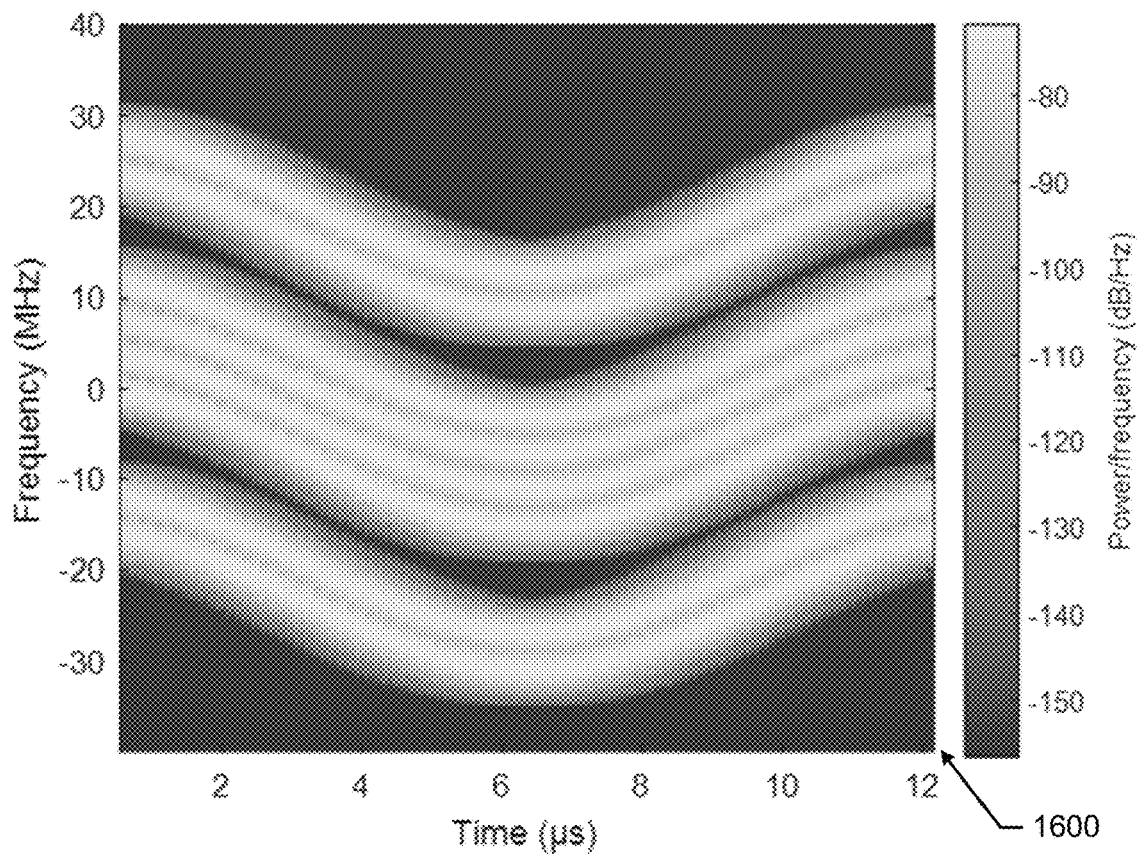
FIG. 16 is a spectrogram graph of frequency with respect to time for example chirp signals according to some example embodiments.

In this regard, the graph 1100 of FIG. 11 is the instantaneous power with respect to time where the bandwidth is 5 MHz and the graph 1200 of FIG. 12 is the frequency with respect to time where the bandwidth is 5 MHz. The graph 1300 of FIG. 13 is the instantaneous power with respect to time where the bandwidth is 10 MHz and the graph 1400 of FIG. 14 is the frequency with respect to time where the bandwidth is 10 MHz. Further, the graph 1500 of FIG. 15 is the instantaneous power with respect to time where the bandwidth is 15 MHz and the graph 1600 of FIG. 16 is the frequency with respect to time where the bandwidth is 15 MHz.

Additionally or alternatively, with respect to a second example embodiment, a low-PAPR trajectory-coded chirp division multiplexing technique may be implemented by the configured processing circuitry. Low-PAPR trajectory-coded chirp division multiplexing may be implemented by the processing circuitry 101 of the communications device 100. In this regard, according to some example embodiments, M information bits may be mapped to $e_n$, $k_n$, $d_n(t) \in \mathbb{Z}$ for n=0, 1, . . . , m. The calculated parameters may be processed by the amplitude, phase, and shift encoders as $$f_r(x) = e_0 + e_m x_{\pi(m)} + \sum_{l=1}^{m-1} e_l(x_{\pi(l)} + x_{\pi(l+1)}) \quad (22)$$

$$f_i(x) = k_0 + \sum_{l=1}^{m} k_l x_{\pi(l)} \quad (23)$$

$$f_s(x, t) = d_0(t) + \sum_{n=1}^{m} d_n(t) x_{\pi(n)} \quad (24)$$

where $x=(x_1, x_2, \ldots x_m)$ and $x=\sum_j^{2m} x_j 2^{m-j}$ for $x_j \in \mathbb{Z}_2$, π denotes any permutation {1, 2, . . . , m}, and (a,b) be a GCP of length N. A multiple chirp waveform which can be expressed as $$p_c(t) = \sum_{x=0}^{2^m-1} f_o(x) \times e^{j\pi f_{sign}(x)} \times e^{\alpha f_r(x) + j\beta f_i(x)} \times e^{j2\pi\frac{t}{T}(f_s(x,t)+xN)}{\phi(t)} \quad (25)$$

where $f_o(x,z)=(p_a(z)(1-x_{\pi(1)})+p_b(z)x_{\pi(1)})$ and $f_{sign}(x)=\sum_{l=1}^{m-1} x_{\pi(l)} x_{\pi(l+1)}$, α and β are non-zero values to scale the output of encoders and ψ(t,$f_s$(x)) is a function that determines the trajectory of the chirps in time and frequency. Note that $p_a(z)$ and $p_b(z)$ are the polynomial representation of the sequence a and the sequence b, and the sequence a and the sequence b form a GCP. The corresponding trajectory for the xth component can be calculated from the angle of the complex exponential as $$F_x(t) = \frac{1}{2\pi}\frac{d\phi(t)}{dt} = \frac{1}{T}\left(xN + \frac{df_s(x,t)}{dt}\right). \quad (26)$$

In this case, the orthogonality between basis function may not be guaranteed. However, the PAPR of the signal may still be less than or equal to 3 dB because of the structure of the encoders. As a difference as compared to the approach provided above in association with FIGS. 3 and 4, the values of $d_n(t) \in \mathbb{Z}$ may be functions of time and these values may jointly determine the final trajectory. Further, the transmit bits may encode the trajectories. According to some example embodiments, the information bits may encode the slope of the parameters $d_n(t) \in \mathbb{Z}$ for n=0, 1, . . . , m. In some example embodiments, the information bits may encode the order of the polynomials. As such, the approach described here may be used for increasing the security of the communication.

The following provides some examples of such a trajectory-encoded approach. In this regard, for example, the sample rate of the system is $f_s$=80 MHz and there may be $N_s$=1024 samples in the signal. Therefore, the symbol duration described as $$T = \frac{N_s}{f_s} = 12.8 \; \mu s.$$

Figure 17:
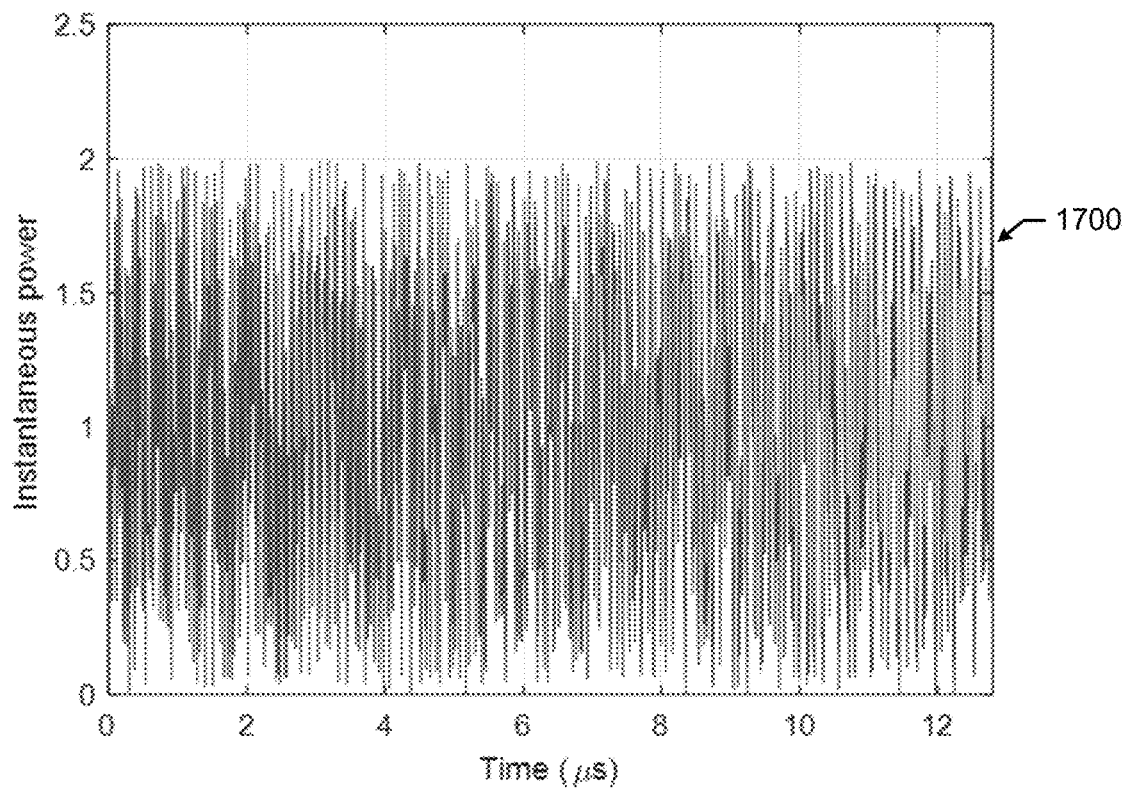
FIG. 17 is a graph of instantaneous power with respect to time for example chirp signals according to some example embodiments.
Figure 18:
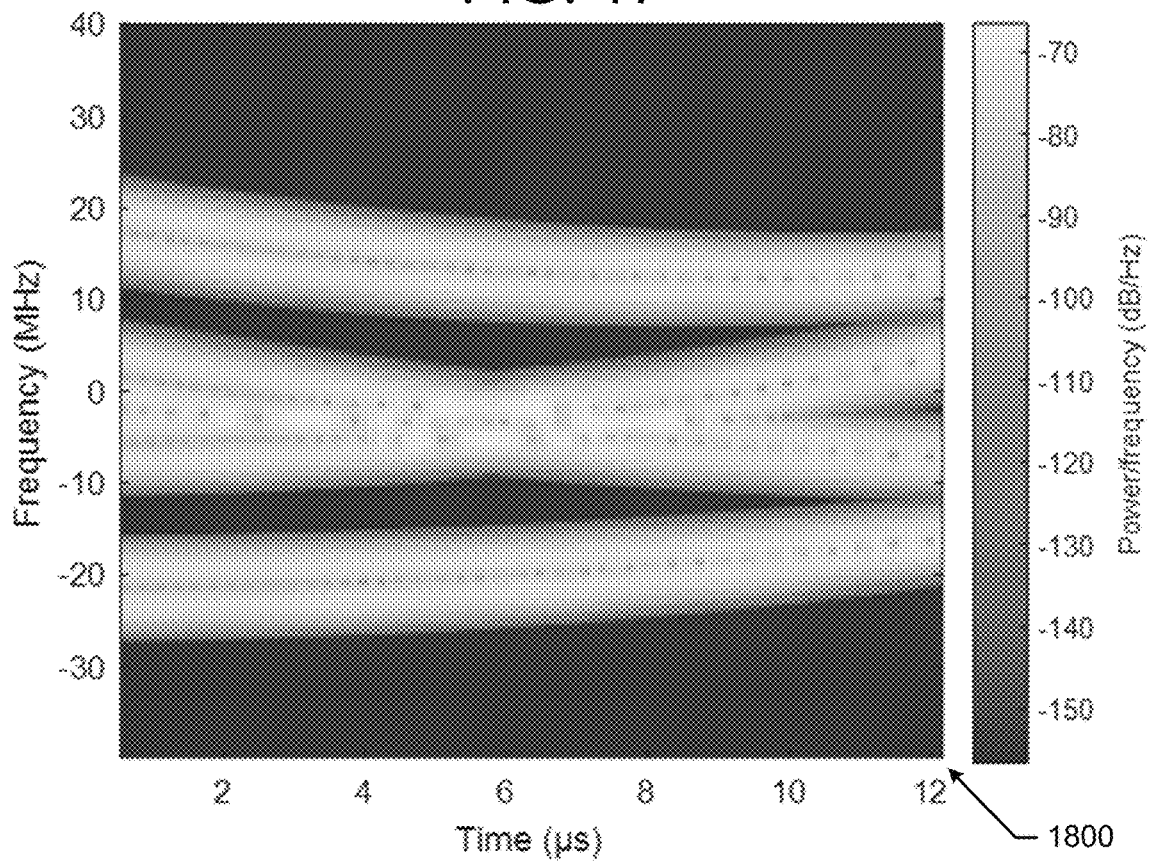
FIG. 18 is a spectrogram graph of frequency with respect to time for example chirp signals according to some example embodiments.

Let $$m = 3, d_0(t) = -300 + 30\left(\frac{t}{T}\right)^2, d_1(t) = 50 - 10\left(\frac{t}{T}\right)^2,$$

$$d_2(t) = 200 + 20\left(\frac{t}{T}\right)^2, d_3(t) = 300 - 100\frac{t}{T},$$

β=2π/4, α=0 (i.e., no amplitude encoder), $k_0$=1, $k_1$=0, $k_2$=1, $k_3$=1, π=(3,2,1), and (a,b)=(1,1). Therefore, the shift encoder leads to time-varying ($D_0(t), D_1(t), \ldots, D_7(t)$) and as shown in FIGS. 17 and 18, the PAPR of the signal is less than or equal to 3 dB while the chirp signals follow different directions. In this regard, the graph 1700 of FIG. 17 is the instantaneous power with respect to time for a signal that has been generated using trajectory-coded chirp division multiplexing and the graph 1800 of FIG. 18 is the frequency with respect to time for a signal that has been generated using trajectory-coded chirp division multiplexing.

Additionally or alternatively, in a third example embodiment, a low-PAPR multiband CS-encoded OFDM technique may be implemented. In this regard, the processing circuitry 101 and the communications device 100 may be configured to implement a low-PAPR multiband CS-encoded OFDM approach. In this regard, according to some example embodiments, the shift encoder of CS encoder may be tuned such that the part of the encoded sequence is transmitted through different bands. For example, let w denote any permutation {1, 2, . . . , m} and (a,b) be a GCP of length N and calculate $$f_o(x, z) = (p_a(z)(1 - x_{\pi(1)}) + p_b(z)x_{\pi(1)}) \quad (27)$$

-continued $$f_r(x) = e_0 + e_m x_{\pi(m)} + \sum_{l=1}^{m-1} e_l(x_{\pi(l)} + x_{\pi(l+1)}) \quad (28)$$

$$f_i(x) = k_0 + \sum_{l=1}^{m} k_l x_{\pi(l)} + \frac{H}{2}\sum_{l=1}^{m-1} x_{\pi(l)} x_{\pi(l+1)} \quad (29)$$

$$f_s(x) = d_0 + \sum_{n=1}^{m} d_n x_{\pi(n)} \quad (30)$$

where $x=(x_1, x_2, \ldots x_m)$ and $x=\sum_j^{2^m} x_j 2^{m-j}$ for $x_j \in \mathbb{Z}_2$, $e_n \in \mathbb{Z}$, $k_n \in [0, H)$, $d_n \in \mathbb{Z}$ for n=0, 1, . . . , m. Then, the sequence c where its polynomial representation is given by $$p_c(t) = \sum_{x=0}^{2^m-1} f_o\left(x, e^{\frac{j2\pi t}{T}}\right) \times e^{j\frac{2\pi}{H}(f_r(x)+jf_i(x))} \times e^{j2\pi \frac{t}{T}(f_s(x)+xN)} \quad (31)$$

Since $f_s(x)$ admits any real number, the frequency separation can be arbitrarily large. In some example embodiments, by adjusting the separation to be large enough, a radio may transmit $$f_o\left(x, e^{\frac{j2\pi t}{T}}\right) \times e^{j\frac{2\pi}{H}(f_r(x)+jf_i(x))}$$

on different bands, such as L and C bands (mentioned above), through the same power amplifier 112 by choosing large $d_n \in \mathbb{Z}$ for n=0, 1, . . . , m. The separation between the bands may be on the level of gigahertz.

Additionally or alternatively, according to a fourth example embodiment, a band-limited circular-time-shift-based chirp transmission technique may be used. In this regard, the processing circuitry 101 and the communications device 100 may be configured to implement band-limited circular-time-shift-based chirp transmission. According to some example embodiments, the information may be encoded over a set of a circularly time-shifted versions of the chirp signal, and the chirp signals may be transmitted to increase time-frequency efficiency. The amount of the shift in time may be selected such that the circularly time-shifted versions of a band-limited chirp signal are orthogonal to each other.

According to some example embodiments, the circularly time-shifted chirp signals may be sinusoidal signals. For example, the transmitted signal p(t) may be a combination of the circularly time-shifted sinusoidal chirp signals with the bandwidth of $$\frac{M}{T}$$

Hz as $$p(t) = \sum_u d_u B_{\tau_u}(t) = \sum_u d_u e^{j\frac{M}{2}\frac{\sin\left(2\pi\frac{(t-\tau_u)}{T}\right)}{\phi_u(t)}} \quad (32)$$

where $d_u \in \mathbb{C}$ is the uth modulation symbol or pilot symbols or any information encoding number (e.g., ON-OFF keying, or quadrature amplitude modulation symbols), and $\tau_u \in [0, T)$ is the amount of the circular-time shift. The instantaneous frequency of the kth basis function $B_{\tau_u}(t)$ is $$F_u(t) = \frac{1}{2\pi} \frac{d\phi_u(t)}{dt} = \frac{1}{T}\left(\frac{M}{2}\cos\left(2\pi\frac{(t-\tau_u)}{T}\right)\right) \quad (33)$$

Hence, the effective bandwidth of each basis function is $$\frac{M}{T}$$

Hz. The amount of the circular-time shifts, i.e. $\{\tau_u | u=0, 1, \ldots, U-1\}$, may be uniformly chosen between 0 and T, where U is the number chirps considered in the scheme. For example, $$\tau_u = \frac{u}{U} \times T.$$

Figure 19:
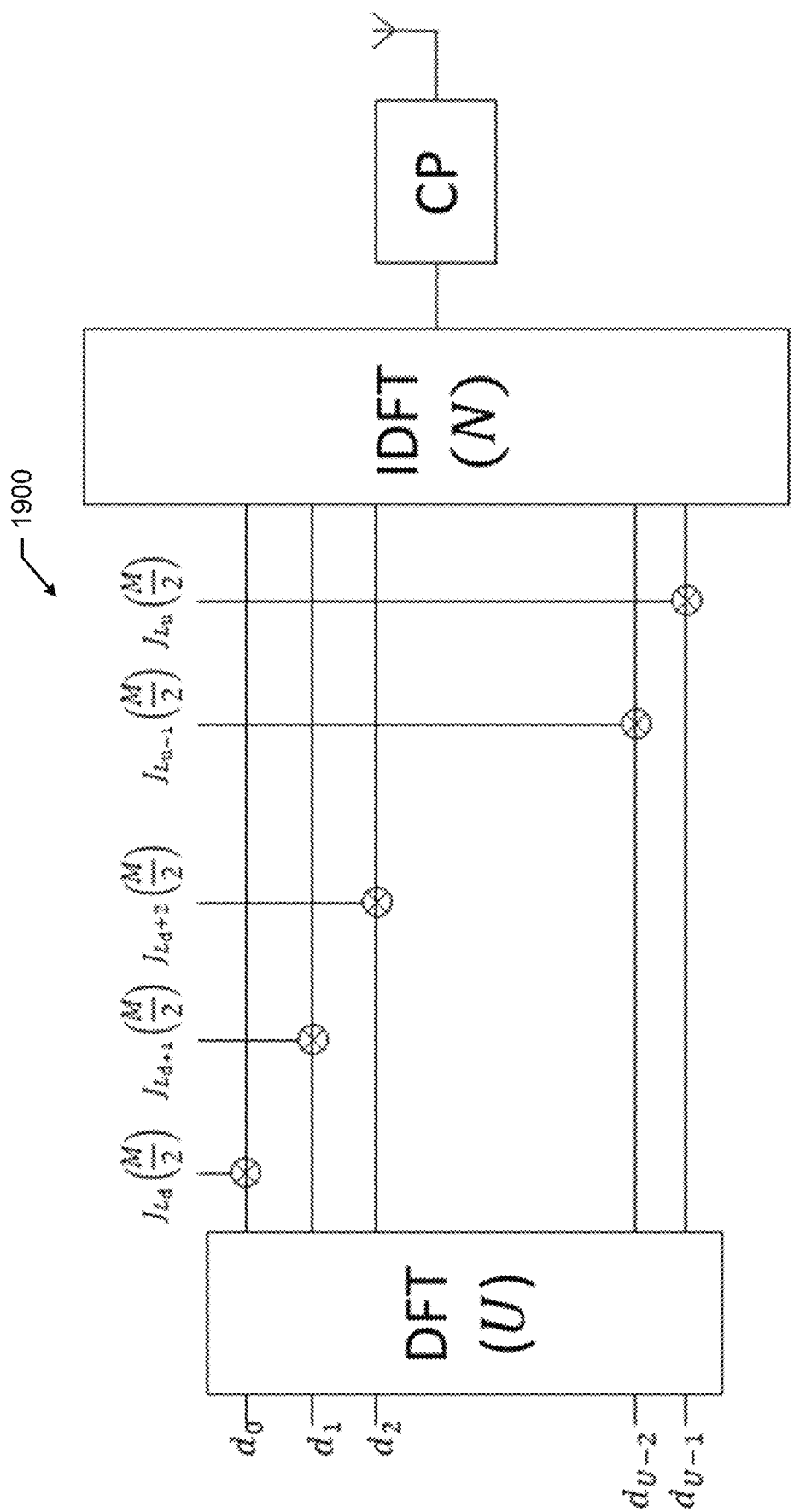
FIG. 19 illustrates an example transmitter according to some example embodiments.

According to some example embodiments, this approach may be implemented by 1) calculating the U-point DFT of a data vector, i.e., $[d_0, d_1, \ldots, d_{U-1}]$, 2) multiplying each element of the output of DFT with a Bessel function of the first kind of the order of n, denoted by $J_n(\bullet)$, and 3) calculating N-point IDFT of the multiplied sequence as shown in by the transmitter 1900 of FIG. 19. A cyclic prefix may also be appended to the beginning of the symbol (e.g., the OFDM symbol) to handle the synchronization issues. This can be proven by using $$e^{j\frac{M}{2}\sin\left(2\pi\frac{t-\tau_u}{T}\right)} = \sum_{k=-\infty}^{\infty} J_k\left(\frac{M}{2}\right) e^{j2\pi\frac{t-\tau_u}{T}k} \cong \sum_{k=L_d}^{L_u} J_k\left(\frac{M}{2}\right) e^{j2\pi\frac{-\tau_u}{T}k} e^{j2\pi\frac{t}{T}k} \quad (34)$$

as $$J_n\left(\frac{M}{2}\right)$$

is a decaying function for n goes to zero, where $L_u-L_d+1=U$. For $$\tau_u = \frac{u}{U} \times T,$$

the nth sample of the waveform p(t) may be expressed as $$p[n] = p\left(\frac{n}{N}T\right) \quad (35)$$

$$= \sum_{u=0,1,\ldots,U-1} \sum_{k=L_d}^{L_u} J_k\left(\frac{M}{2}\right) d_u e^{j2\pi\frac{-\tau_u}{T}k} e^{j2\pi\frac{t}{T}k} =$$

$$= \sum_{u=0,1,\ldots,U-1} \sum_{k=L_d}^{L_u} J_k\left(\frac{M}{2}\right) d_k e^{-j2\pi\frac{u}{U}k} e^{j2\pi\frac{n}{N}k}$$

-continued $$= \sum_{k=L_d}^{L_u} J_n\left(\frac{M}{2}\right) \underbrace{\sum_{u=0,1,\ldots,U-1} d_k e^{-j2\pi\frac{u}{U}k} e^{j2\pi\frac{n}{N}k}}_{\text{U-point DFT}}$$

$$\underbrace{\phantom{xxxxxxxxxxxxxx}}_{\text{Multiplication}}$$

$$\underbrace{\phantom{xxxxxxxxxxxxxx}}_{\text{N-point IDFT}}$$

In a general case, the circularly time-shifted the chirp signals may be any function, e.g., a linear function in time. In this case, by calculating its Fourier series, i.e., $c_k$, as $$e^{j\psi(t)} = \sum_{k=-\infty}^{\infty} c_k e^{j2\pi\frac{t}{T}k} \Rightarrow c_k = \frac{1}{T}\sum_{k=-\infty}^{\infty} e^{j\psi(t)} e^{-j2\pi\frac{t}{T}k} \quad (36)$$

and replacing $$J_k\left(\frac{M}{2}\right)$$

with $c_k$ for $k=L_d, \ldots, L_u$ as shown in the design of the transmitter 1900 of FIG. 19, the same IDFT-based diagram may be utilized.

As such, an example implementation of circularly time-shifted chirp signals is now provided. In this regard, let T=12.8 μs and M=128. Hence, the bandwidth of $$B_{\tau_u}(t) = e^{j\frac{M}{2}\sin\left(2\pi\frac{(t-\tau_u)}{T}\right)}_{\phi_u(t)}$$

is $$M \times \frac{1}{T} = 10 \text{ MHz}.$$

The basis signal $B_{\tau_u}(t)$ deviates between $$-\frac{M}{2T} = -5 \text{ MHz and } \frac{M}{2T} = 5 \text{ MHz}$$

around the center frequency. The IDFT size may be N=512 and DFT precoding size may be U=144.

Figure 20A:
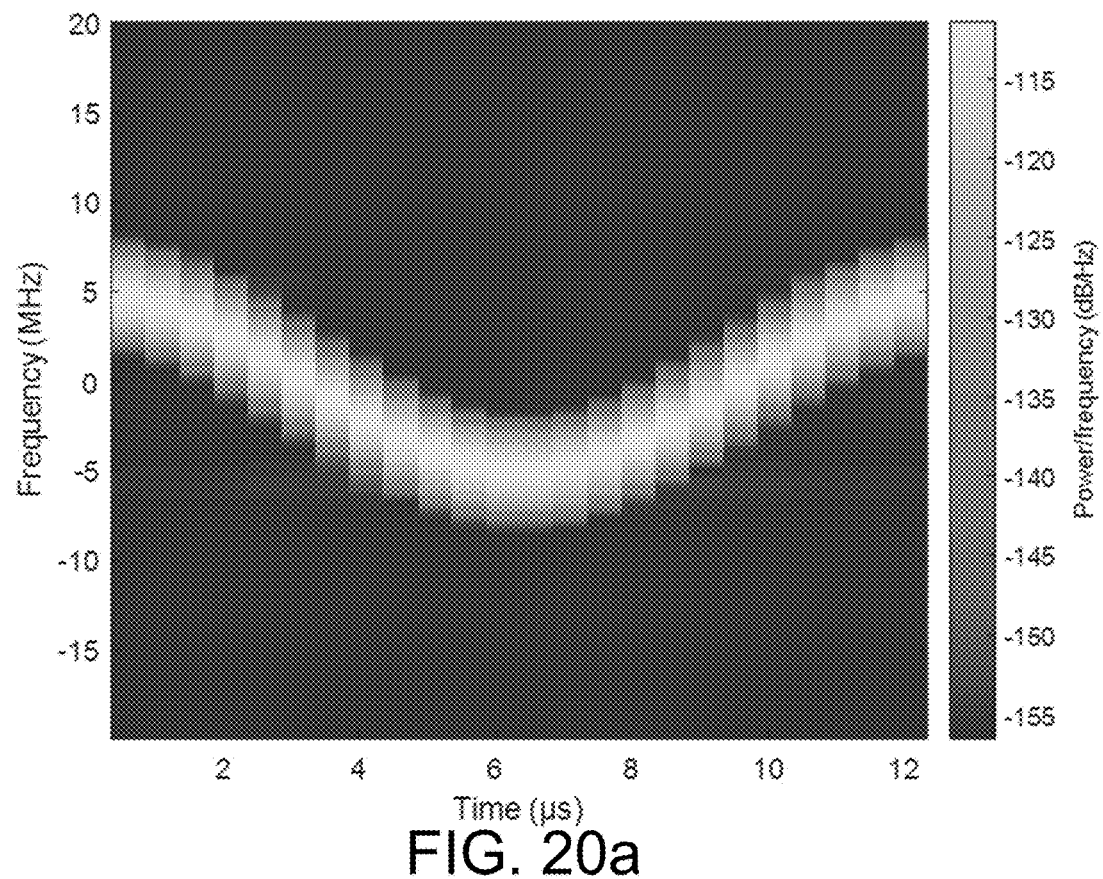
FIGS. 20a and 20b are spectrogram graphs of frequency with respect to time for example chirp signals according to some example embodiments.
Figure 20B:
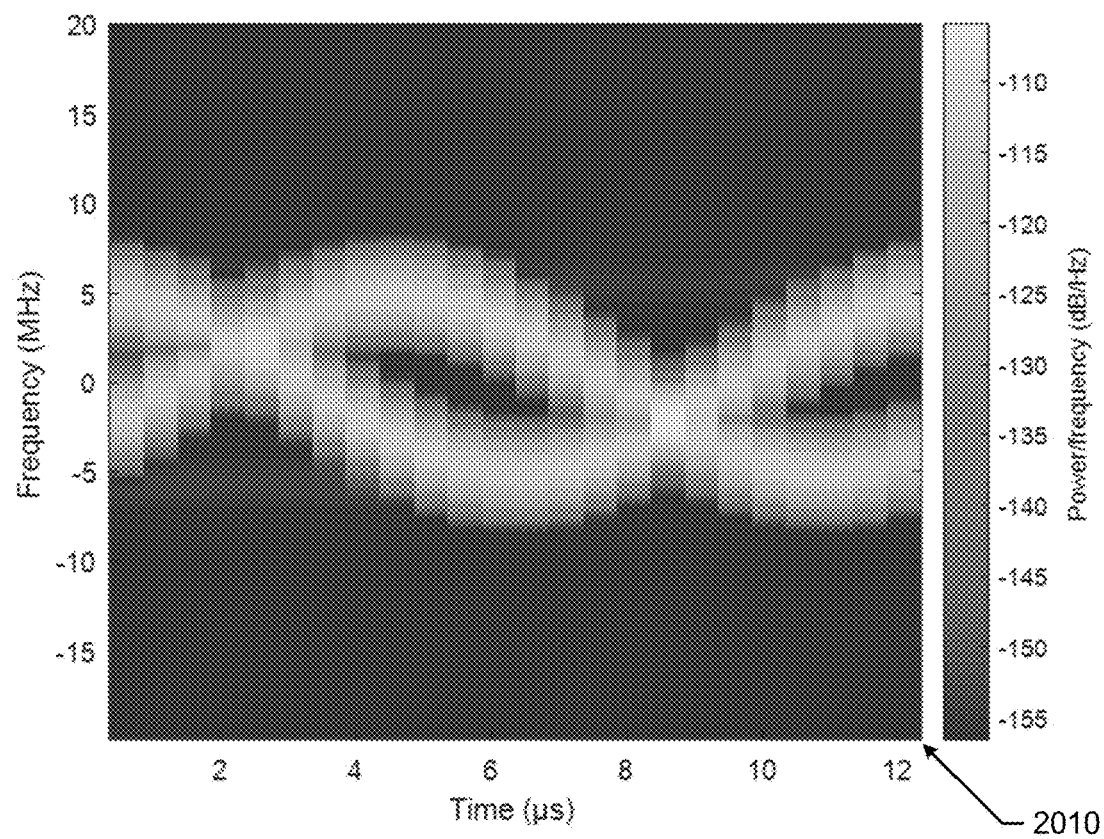

For a simulation, the following parameters were used: M=128, $L_u$=72 and $L_d$=−71. The spectrogram of the signal for $d_0$=1 and $d_{u\neq0}$=0 is given in graph 2000 of FIG. 20a, which illustrates the expected sinusoidal chirp signal as frequency with respect to time. In the graph 2010 of FIG. 20b, also rendered as frequency with respect to time, the spectrogram of the signal for $d_{0,51}$=1 and $d_{u\neq0,51}$=0 is shown. Since $d_{0,51}$=1, there are two active chirp signals, where the cyclic shift for the second chirp is $$\frac{51}{144} \times 12.8 = 4.53 \text{ μs}.$$

Further, according to some example embodiments, the processing circuitry 101 may be configured to transmit the data symbols over the basis functions $\{B_{\tau_0}(t), B_{\tau_1}(t), \ldots,$ $B_{\tau_{M-1}}(t)$} constructed by translating a chirp signal circularly in time, where $\tau_m$ is the amount of circular shift. According to some example embodiments, an assumption can be made that the shifts in time are uniformly spaced between 0 and $T_s$, i.e., $\tau_m = m/M \times T_s$, where $T_s$ is the chirp duration. The complex baseband signal p(t) can then be expressed as:

$$p(t) = \sum_{m=0}^{M-1} d_m B_{\tau_m}(t) = \sum_{m=0}^{M-1} d_m e^{j\phi_m(t)},$$

where $d_m \in \mathbb{C}$ is the mth modulation or a pilot symbol and $\psi_m(t)$ is the phase of the carrier for the mth basis function. Therefore, the instantaneous frequency of the mth chirp signal $B_{\tau_m}(t)$ around the carrier frequency $f_c$ can be obtained as $$F_m(t) = \frac{1}{2\pi} d\psi_m(t)/dt$$

Hz. The waveform p(t) may be a simple linear combination of the basis functions related to chirp signals. However, the waveform may be implicitly related to DFT-s-OFDM. This relation can be shown as follows. Let $B_{\tau_m}(t) = e^{j\psi_m(t)}$ be an arbitrary band-limited function with the period of $T_s$. Hence, the relation can be expressed as:

$$e^{j\psi_m(t)} = \sum_{k=-\infty}^{\infty} c_k e^{j2\pi k \frac{t-\tau_m}{T_s}}$$

where $c_k$ is the kth Fourier coefficient given by:

$$c_k = \frac{1}{T_s} \int_{T_s} e^{j\psi_0(t)} e^{-j2\pi k \frac{t}{T_0}} dt.$$

By using the equations above, $\tau_m = m/M \times T_s$, p(t) can be expressed as:

$$p(t) = \sum_{m=0}^{M-1} d_m \sum_{k=-\infty}^{\infty} c_k e^{j2\pi k \frac{t-\tau_m}{T_s}} \approx \sum_{k=L_s}^{L_u} c_k \sum_{m=0}^{M-1} d_m e^{-j2\pi k \frac{m}{M}} e^{j2\pi k \frac{t}{T_s}}.$$

where $L_d < 0$ and $L_u > 0$ are integer values. The approximation is due to the fact that $B_{\tau_m}(t)$ is a band-limited function, i.e., $c_k$ is a decaying Hermitian symmetric function as k goes to positive or negative infinity. Finally, by sampling p(t) with the period $T_s/N$, the discrete-time signal can be obtained as:

$$p\left(\frac{nT_s}{N}\right) \approx \sum_{k=L_d}^{L_u} \underbrace{c_k \underbrace{\sum_{m=0}^{M-1} d_m e^{-j2\pi k \frac{m}{M}}}_{\text{M-point DFT}}}_{\text{Frequency-domain spectral shaping}} e^{j2\pi k \frac{n}{N}}.$$

$$\underbrace{\phantom{xxxxxxxxxxxxxxxxxxxxxxxxxxxxxxxxx}}_{\text{N-point IDFT}}$$

In other words, p(t) may be a special DFT-s-OFDM symbol that can be implemented by 1) determining the M-point DFT of a data vector, i.e., $[d_0, d_1, \ldots, d_{M-1}]$, 2) multiplying each element of the output of DFT with the corresponding Fourier coefficient, i.e., FDSS or windowing in frequency, and 3) determining the N-point inverse DFT (IDFT) of the shaped sequence after padding it with $N-(L_u-L_d+1)$ zero symbols (i.e., guard subcarriers in OFDM). Without loss of generality, it can be assumed that $L_u-L_d+1=M$ to ensure that the FDSS occurs within the bandwidth spanned by M subcarriers. Therefore, the chirp bandwidth should be less than or equal to.

In 3GPP LTE and 3GPP 5G NR uplink, FDDS is described as an implementation-specific option to reduce peak-to-average-power ratio (PAPR) further for DFT-s-OFDM. Based on $$p\left(\frac{nT_s}{N}\right),$$

the same DFT-s-OFDM transmitter can also generate arbitrary chirp signals by selecting the shaping coefficients properly without compromising the other features of the physical layer design in these communication systems. According to some example embodiments, such an approach may not cause any bandwidth expansion as the chirps can be circularly shifted versions of each other in the time domain while eliminating additional processing to avoid aliases.

According to some example embodiments, the chirp signals may be sinusoidal chirps. In this regard, let the instantaneous frequency of $B_{\tau_0}(t)$ around the carrier frequency $\theta_c$ be a sinusoidal function given by:

$$F_0(t) = \frac{D}{2T_s} \cos\left(2\pi \frac{t}{T_s}\right)$$

Therefore, $$\psi_0(t) = \frac{D}{2} \sin\left(2\pi \frac{t}{T_s}\right).$$

Further, $e^{j\psi_0(t)}$ can be decomposed as:

$$e^{j\frac{D}{2}\sin\left(2\pi \frac{t}{T_0}\right)} = \sum_{k=-\infty}^{\infty} J_k\left(\frac{D}{2}\right) e^{j2\pi k \frac{t}{T_s}}$$

$J_k(\bullet)$ is the Bessel function of the first kind of order k. Hence, $c_k$ may be equal to $$J_k\left(\frac{D}{2}\right)$$

for sinusoidal chirps. The maximum frequency deviation of each basis function and the effective bandwidth of the transmitted signal p(t) may be equal to $\Delta f = D/2T_s$ Hz and D/T Hz, respectively. Therefore, $D \leq M$ can hold true to form the sinusoidal chirp in $$p\left(\frac{nT_s}{N}\right).$$

According to some example embodiments, the chirp signals may be linear chirps. In this regard, assume that the instantaneous frequency of $B_{\tau_0}$ around the carrier frequency $\theta_c$ changes from $$-\frac{D}{2T_s}$$

Hz to $$\frac{D}{2T_s}$$

Hz, i.e.

$$F_0(t) = \frac{D}{2T_s}\left(\frac{2t}{T_o} - 1\right)$$

which results in $$\psi_0(t) = \frac{\pi D}{T_s}\left(\frac{t^2}{T_s} - t\right).$$

The shaping coefficients $c_k$ can be obtained as $$c_k = \sqrt{\frac{\pi}{D}} e^{-j\frac{(2\pi k)^2}{2D} - j\pi k}(C(x_1)) + C(x_2) + jS(x_1) + jS(x_2)\right)$$

where $C(\bullet)$ and $S(\bullet)$ are the Fresnel integrals with cosine and sine functions, respectively, and $$x_1 = (D/2 + 2\pi k)/\sqrt{\pi D}$$

and $$x_2 (D/2 - 2\pi k)/\sqrt{\pi D}$$

Similar to the sinusoidal chirp, the condition $D \leq M$ can be satisfied to form the linear chirp.

A receiver, according to some example embodiments, for the proposed scheme may be based on a typical DFT-s-OFDM receiver. After the cyclic prefix (CP) is discarded, the DFT of the received signal may be determined. In the frequency domain, the impact of the channel may be removed with a single-tap minimum mean square error (MMSE)-frequency-domain equalization (FDE). The modulation symbols may be obtained after an M-IDFT operation on the equalized signal vector. For a practical receiver, the shaping coefficients may be considered as part of the channel frequency response and estimated through channel estimation procedure. From this aspect, the proposed scheme does not require any change from a practical DFT-s-OFDM receiver. On the other hand, if the shaping coefficients are available at the receiver a priori, the receiver may perform better as coefficients may not need to be estimated.

For simulations associated with the approach, according to some example embodiments, an OFDM framework may be considered where the symbol duration Ts=16.67 μs, i.e., the subcarrier spacing is 60 kHz. The CP duration can be set to 2.34 μs. The transmitter may be assumed to exploits M=336 subcarriers, i.e., the bandwidth is 20.16 MHz. For the linear and sinusoidal chirps, D may be equal to 318 to not distort chirp signals due to the truncation in frequency. The data symbols may be generated based on quadrature phase shift keying (QPSK) modulation and M=336 basis functions may be used simultaneously unless otherwise stated. The multi-path channel may be generated based on an Extended Vehicular A (EVA) power delay profile. For the channel coding, IEEE 802.1 lay low-density parity check (LDPC) code with the rate of 1/2 may be employed where the codeword length is 672.

Figure 21A:
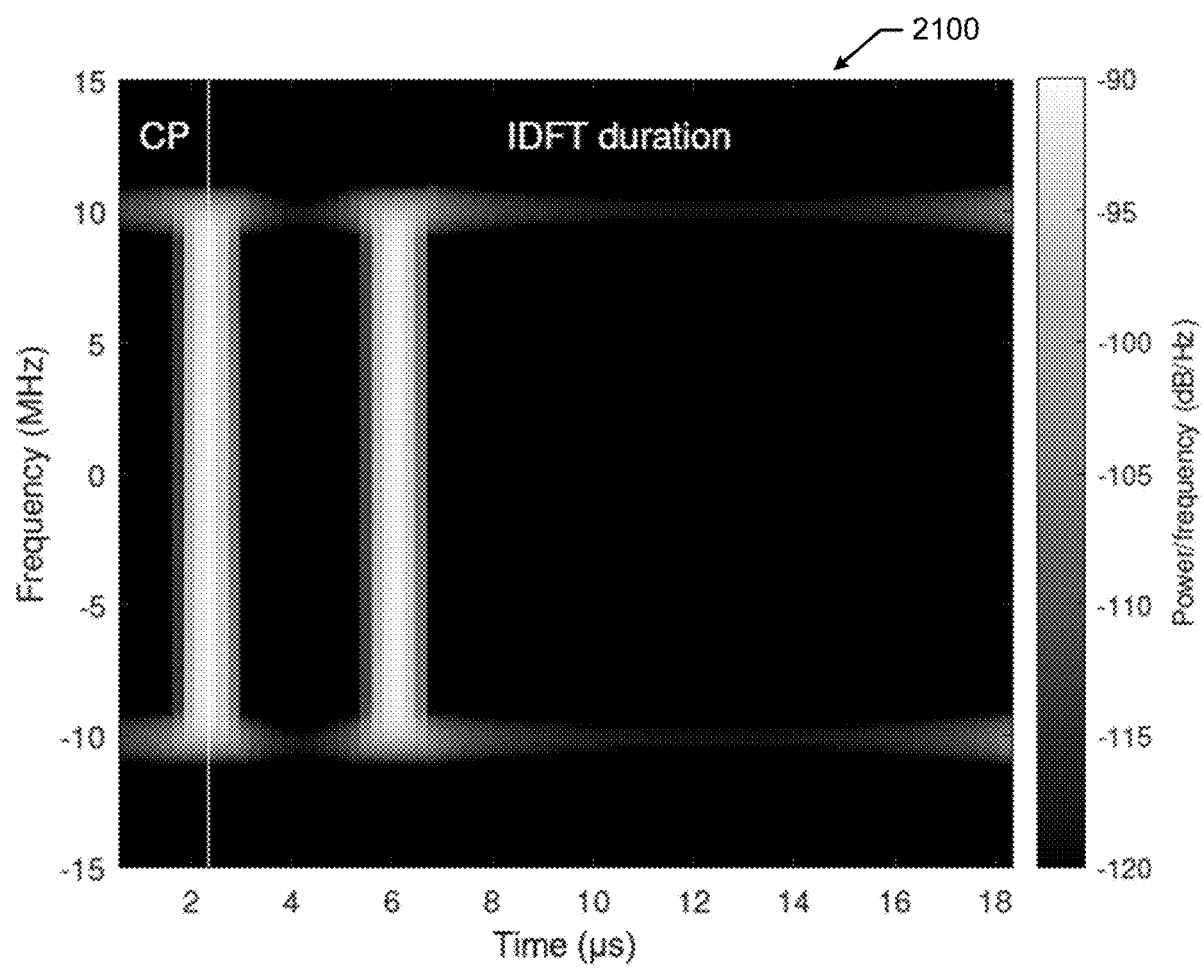
FIG. 21a is a spectrogram for plain DFT-s-OFDM pulses according to some example embodiments.
Figure 21B:
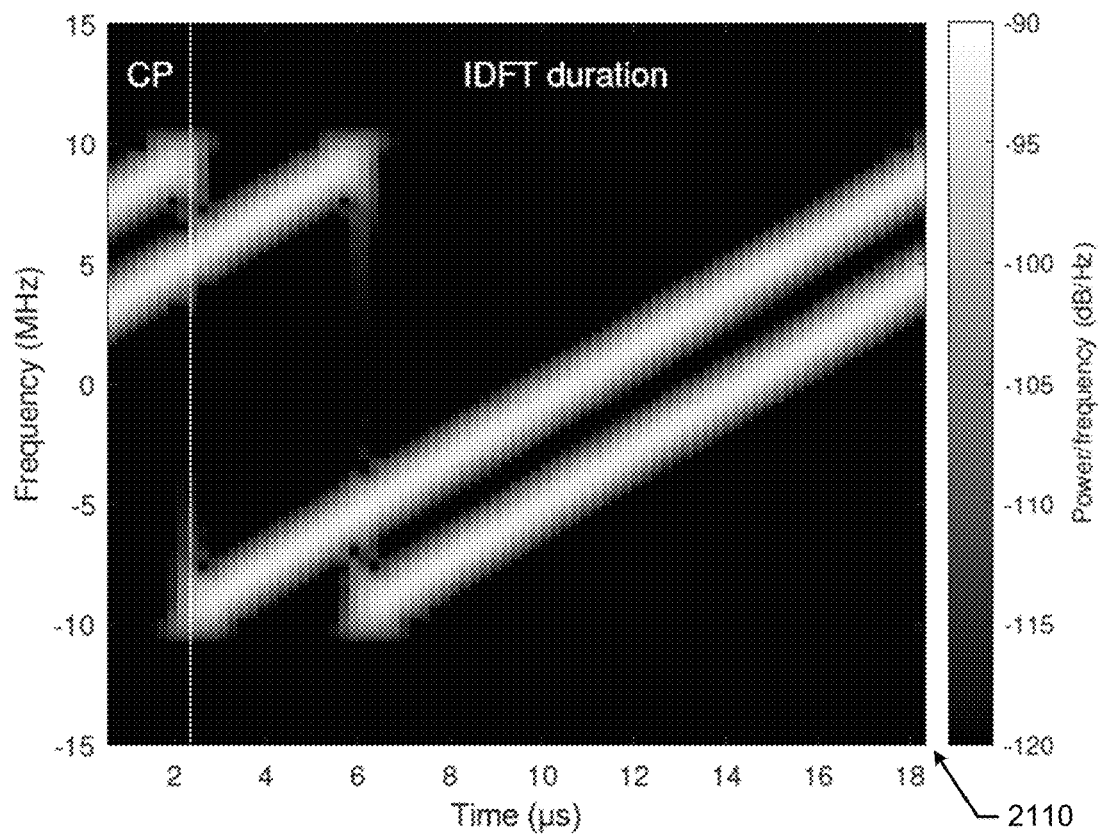
FIG. 21b is a spectrogram of linear chirps according to some example embodiments.
Figure 21C:
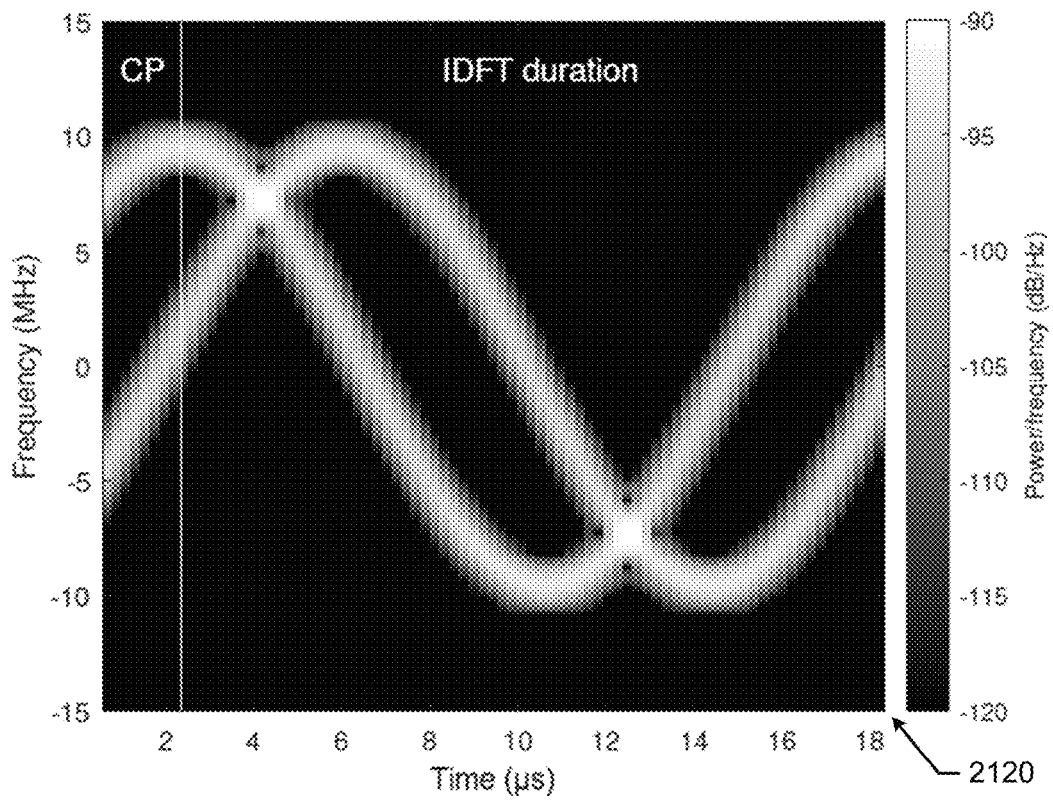
FIG. 21c is a spectrogram of sinusoidal chirps according to some example embodiments.
Figure 21D:
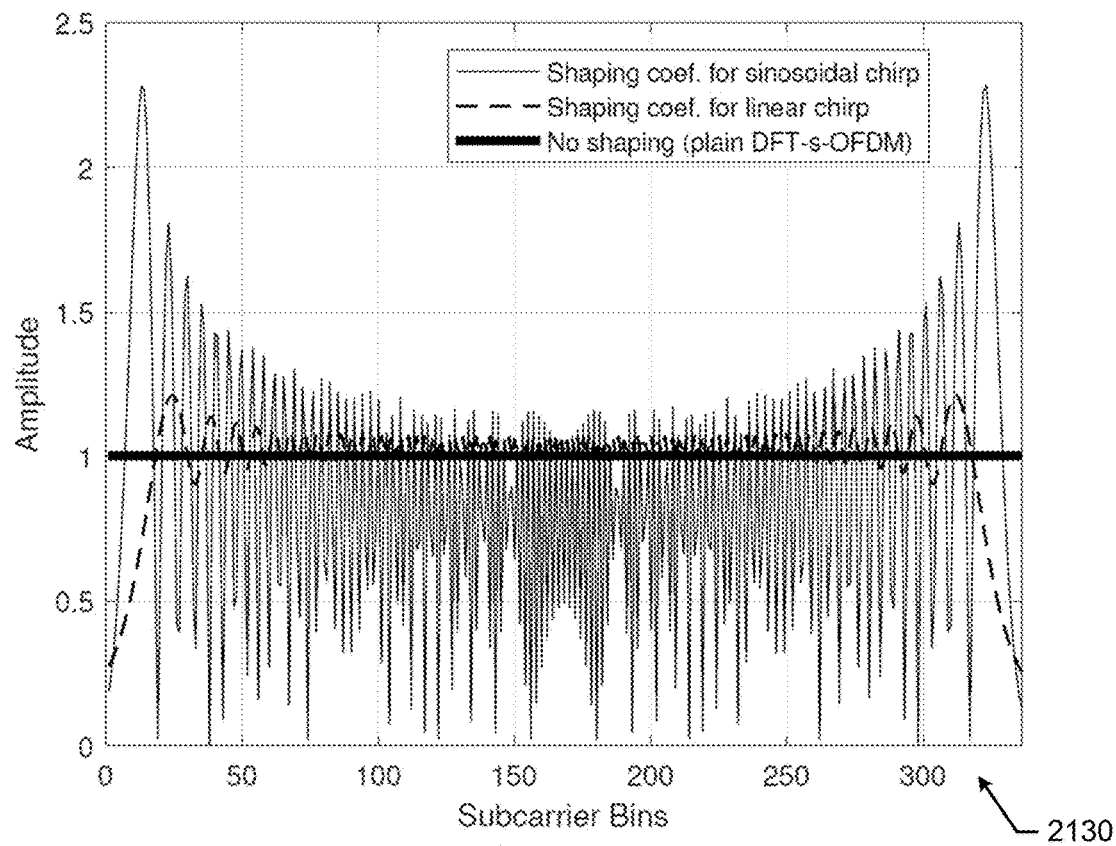
FIG. 21d is a graph of the amplitude of shaping coefficients for linear and sinusoidal chirp signals according to some example embodiments.
Figure 21E:
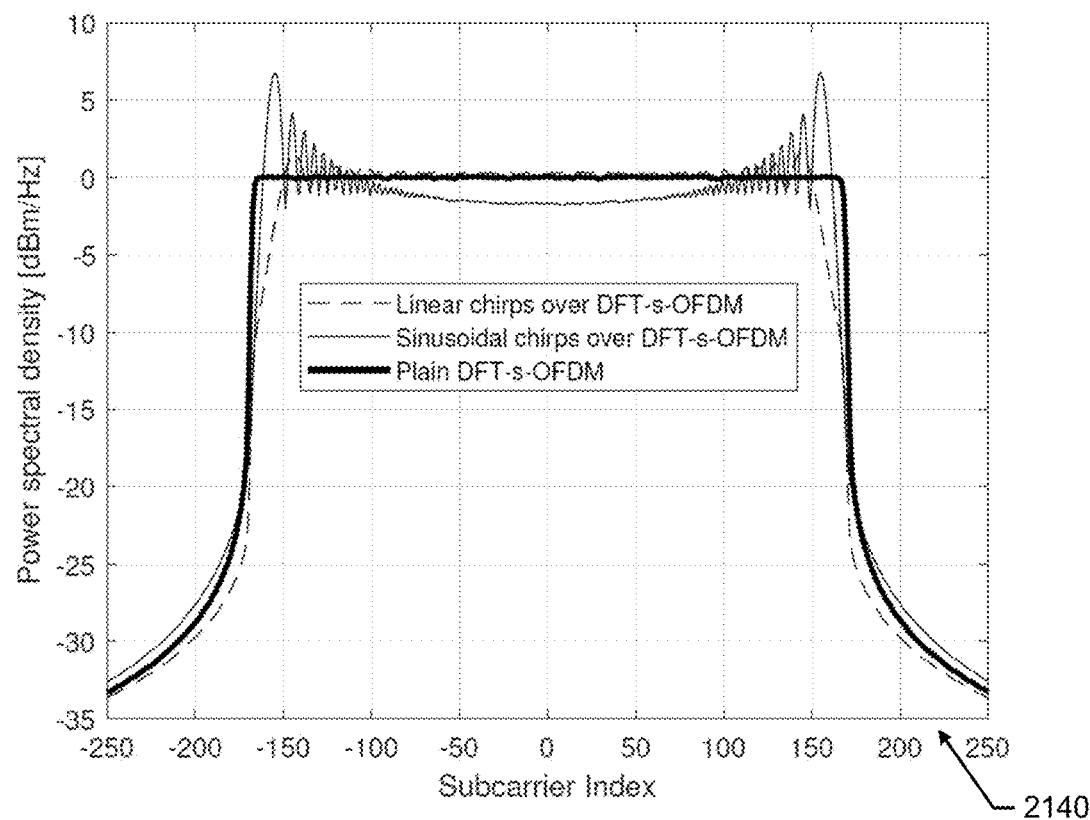
FIG. 21e is a graph of the power spectral density for linear and sinusoidal chirps according to some example embodiments.

In FIGS. 21a-21c, spectrograms are provided for plain DFT-s-OFDM (i.e., no FDSS) at 2100, linear chirps at 2110, and sinusoidal chirps 2120, when only d0 and d75 are set to 1. Since the plain DFT-s-OFDM is a form of single carrier waveform, the symbols d0 and d75 appear as two pulses in time as provided at 2100 in FIG. 21a. In contrast, the same symbols result in two linear and sinusoidal chirps transmitted simultaneously as given at 2110 in FIG. 21b and at 2120 in FIG. 21c, respectively. As shown at 2110, a sudden frequency change may occur for linear chirps. On the other hand, the abrupt instantaneous frequency changes may be avoided for the sinusoidal chirps as shown at 2120, due to the sinusoidal chirp being a continuous periodic function while the linear chirp is a discontinuous periodic function in $e^{j\psi_m(t)}$. In FIG. 21d at 2130, the amplitude of the shaping coefficients are shown for the linear and sinusoidal chirp signals. As shown at 2130, the chirp signals do not distribute symbol energy to the subcarriers evenly. While the amplitude variation for linear chirp signals are relatively mild except the edge subcarrier, the amplitude variation can be large for sinusoidal chirps. A large amplitude variation can cause ripples in the spectrum and noise enhancement. As shown in FIG. 21e at 2140, the main lobe of the spectrum is not flat for linear and sinusoidal chirps. Particularly, a majority of the symbol energy may be carried over the edge subcarrier bins for sinusoidal chirps. Secondly, large ripples can affect the BER performance. For example, the amplitude of the shaping coefficients can be very small values for sinusoidal chirps. Therefore, the corresponding bins may be more prone to noise as compared to the other bins with large shaping coefficients.

Figure 21F:
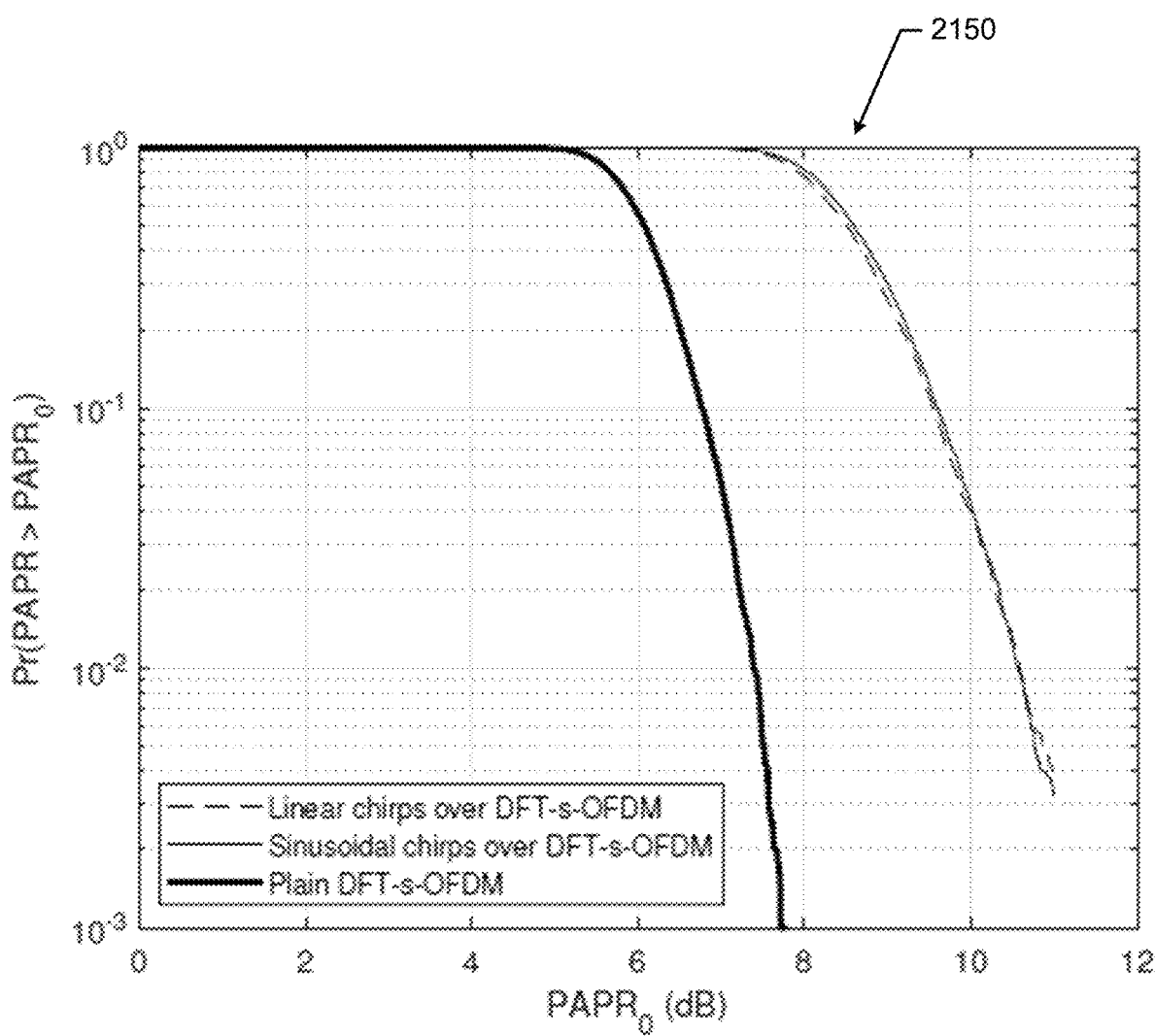
FIG. 21f is a graph of peak-to-average power ratio distribution for linear and sinusoidal chirp signals according to some example embodiments.

In FIG. 21f at 2150, PAPR distributions are compared. The introduction of FDSS for generating chirp signals does not keep the low PAPR benefit of DFT-s-OFDM. This is because the symbol energy is distributed in both time and frequency for the chirp signals. When multiple chirp signals are transmitted in parallel, the chirp signals can constructively or destructively add up, which increases the PAPR.

Figure 21G:
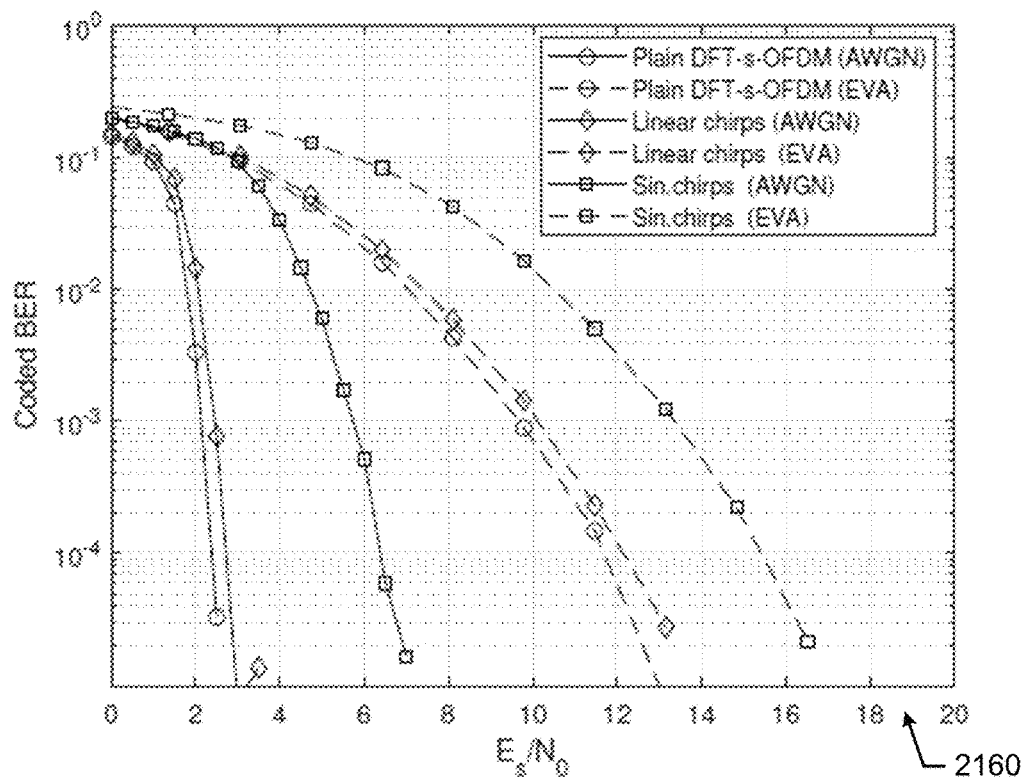
FIG. 21g is a graph of coded bit error ratio for various chirp signals according to some example embodiments.
Figure 21H:
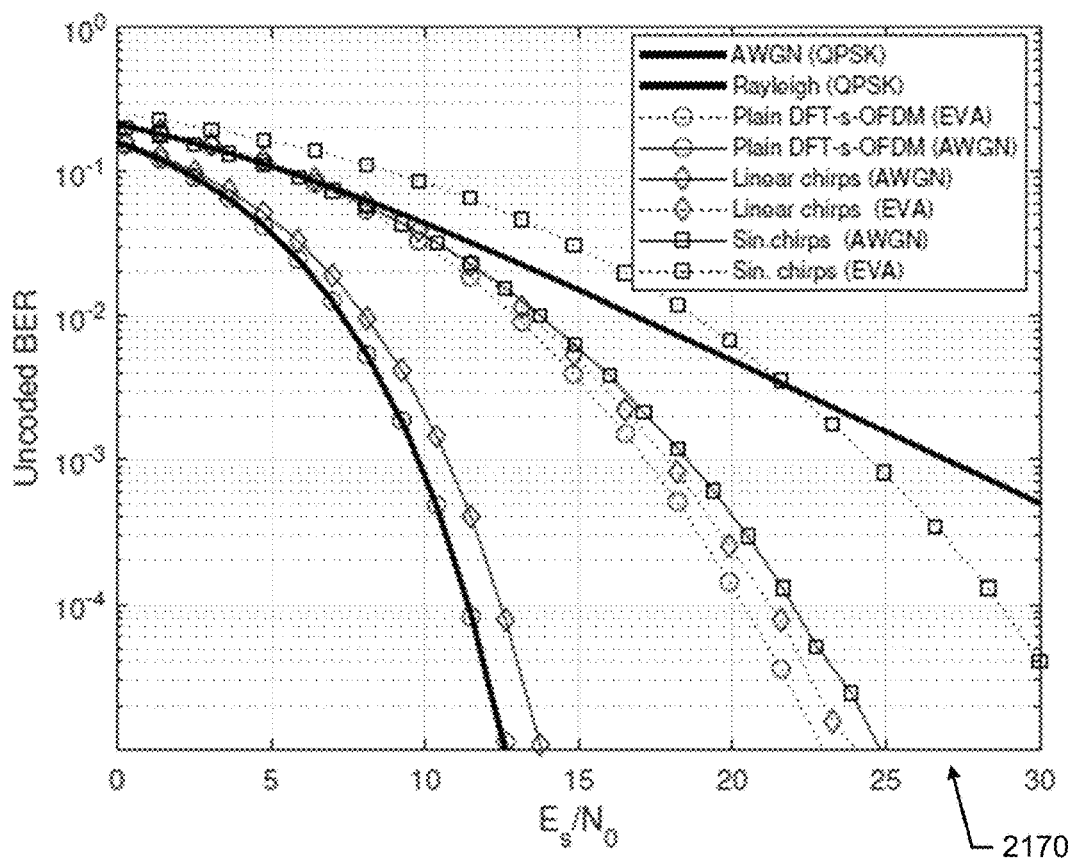
FIG. 21h is a graph of uncoded bit error ratio for various chirp signals according to some example embodiments.

In FIG. 21g at 2160 and FIG. 21h at 2170, coded BER and uncoded BER curves, respectively, are provided for additive white Gaussian noise (AWGN) and multi-path fading channels. For uncoded bits, a large degradation for the sinusoidal chirps in both AWGN and multipath channels occurs, as compared to DFT-s-OFDM. However, the difference between linear chirps and DFT-s-OFDM is approximately 1 dB for uncoded bits. When the channel encoder is introduced, the degradation reduces to approximately 0.5 dB while it is approximately 4 dB for the sinusoidal chirps in AWGN and multi-path fading channels. Thus, linear chirps provide more reliable links as compared to sinusoidal chirps for this particular design.

In accordance with the above, the processing circuitry 101 may be configured to generate chirp signals with, for example, DFT-s-OFDM via well-designed shaping coefficients. A benefit of the approach is that a typical DFT-s-OFDM receiver with a single-tap FDE-MMSE (frequency domain equalization-minimum mean square error) can decode the modulated chirp signals, according to some example embodiments. The numerical results may show that the amplitude variations in the shaping coefficients adversely affect the BER performance due to the noise enhancement during equalization. While the signal-to-noise ratio (SNR) degradation is approximately 0.5 dB for linear chirps, the degradation reaches 4 dB for the sinusoidal chirps due to the large variations, as compared to DFT-s-OFDM without any FDSS. As such, via the approach, waveforms for radar and communications and IoT applications can be synthesized, for example, without introducing major modifications to the physical layer of wireless communication standards.

Figure 22:
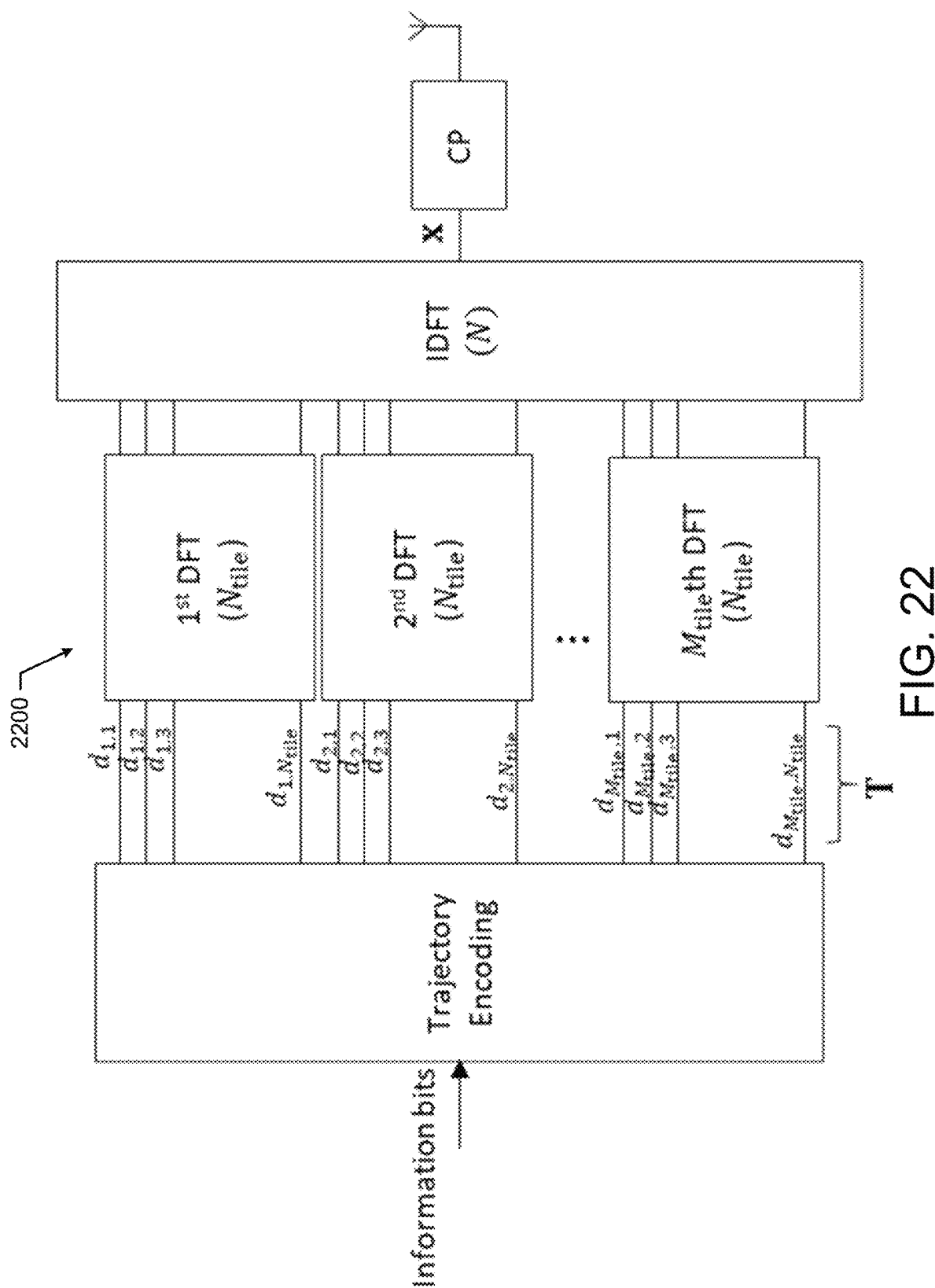
FIG. 22 illustrates an example transmitter according to some example embodiments.

Additionally or alternatively, according to a fifth example embodiment, multi-cluster-DFT-based precoding for chirp division multiplexing may be implemented. In this regard, according to some example embodiments, the processing circuitry 101 of the communications device 100 may be configured to implement multi-cluster-DFT-based precoding for chirp division multiplexing. In this regard, according to some example embodiments, the information bits may be mapped to a trajectory in time-frequency plane divided into $M_{tile} \times N_{tile}$ grids, i.e., $T \in \mathbb{C}^{M_{tile} \times N_{tile}}$ where the ith row and jth column of T is $d_{i,j}$, and the signal $x \in \mathbb{C}^{N \times 1}$ given by $$x = F^H M \text{vec}\{DT^H\} \quad (37)$$

where $F^H$ is the inverse N-point DFT matrix, $M \in \mathbb{Z}^{N \times M_{tile} N_{tile}}$ is the subcarrier mapping matrix, $D \in \mathbb{C}^{M \times M}$ is the M-point DFT matrix, and vec{•} is the vectorization operation. A block diagram of a transmitter 2200 for chirp signal transmission is provided in FIG. 22, along with an illustration of an example multi-cluster DFT precoding technique. The information bits are first mapped to the trajectory matrix T. For example, for a linear chirp, $d_{i,i}$ may be a non-zero value and $d_{i,j|i \neq j} = 0$ if $M_{tile} = N_{tile}$. The information bits may be mapped to orthogonal trajectories. For example, a circular shift of the matrix T may be used for orthogonal chirps. Trajectory matrix may encode multiple information bits through orthogonal/non-orthogonal chirps. The values of $d_{i,j}$ may be a modulation symbol, or simply indicate an on/off keying. After trajectory matrix is generated, vec{$DT^H$} may be calculated through $M_{tile}$ simultaneous $N_{tile}$-point DFT precoding operations. The calculated vector may be mapped a set of subcarriers based on the resource allocation. After the mapping, the inverse DFT of the sequence may be calculated. A cyclic prefix may be appended to the generated signal in association with a symbol. The calculated signal may be transmitted through a transmitter.

Figure 23:
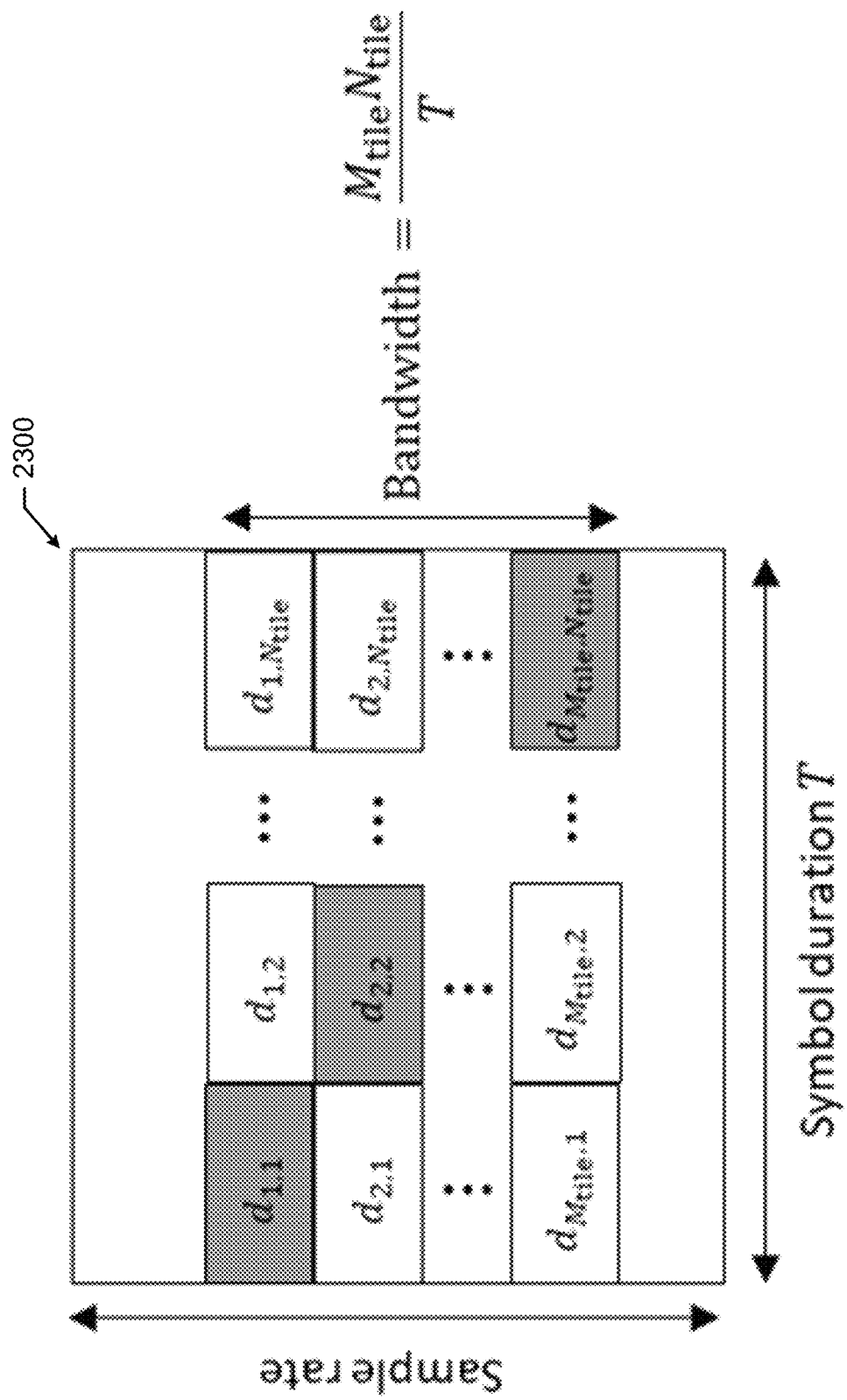
FIG. 23 illustrates a precoding matrix according to some example embodiments.
Figure 24:
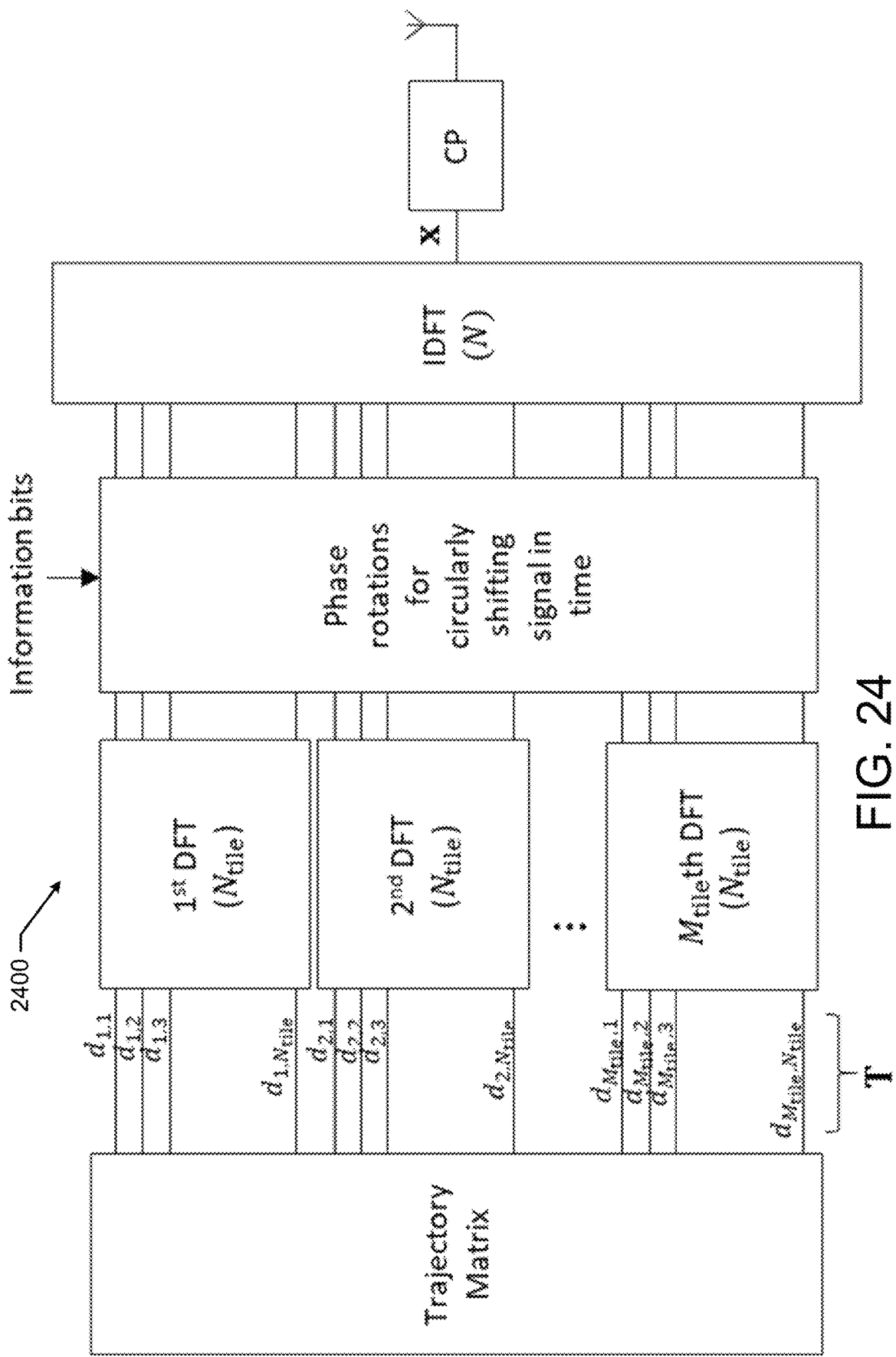
FIG. 24 illustrates an example transmitter according to some example embodiments.

According to some example embodiments, the trajectory matrix may be chosen such that only one of the inputs of each DFT in the precoding matrix 2300 of FIG. 23 is non-zero. In other words, $d_{i,j=l_i}=1$ and $d_{i,j \neq l_i}=0$ for a given ith row of $T_0$. In this case, vec{$DT_0^H$} may yield to a constant-amplitude sequence in frequency domain. Hence, orthogonal chirp signals may be generated by circularly shifting the signal. According to some example embodiments, the circular time shift may be implemented by introducing phase rotations in frequency domain. For a given trajectory matrix $T_0$ under this condition, the transmitted signal may be expressed as $$x = F^H M \sum_k b_k P_k \text{vec}\{DT_0^H\} \quad (38)$$

where $$P_k = \text{diag}\left\{e^{-j2\pi \frac{k}{M_{tile} N_{tile}}[0,1,\ldots,M_{tile} N_{tile}-1]}\right\}$$

and $b_k$ may be a modulation symbol or a fixed symbol. As such, a block diagram of a transmitter 2400 based on this approach is shown in FIG. 24. The processing circuitry 101 may be configured to implement the transmitter 2400 which is capable of generating the chirp signals with multi-cluster DFT pre-coding and orthogonal chirps with circular shifts.

As such, an example of an approach comprising multi-cluster-DFT-based precoding for chirp division multiplexing can be provided. In this regard, T=12.8 μs and $M_{tile}=N_{tile}=24$. IDFT size may be set to N=2048. In this example case, the maximum bandwidth is $$\frac{M_{tile} \times N_{tile}}{T} = 45 \text{ MHz}.$$

Figures 25, 26:
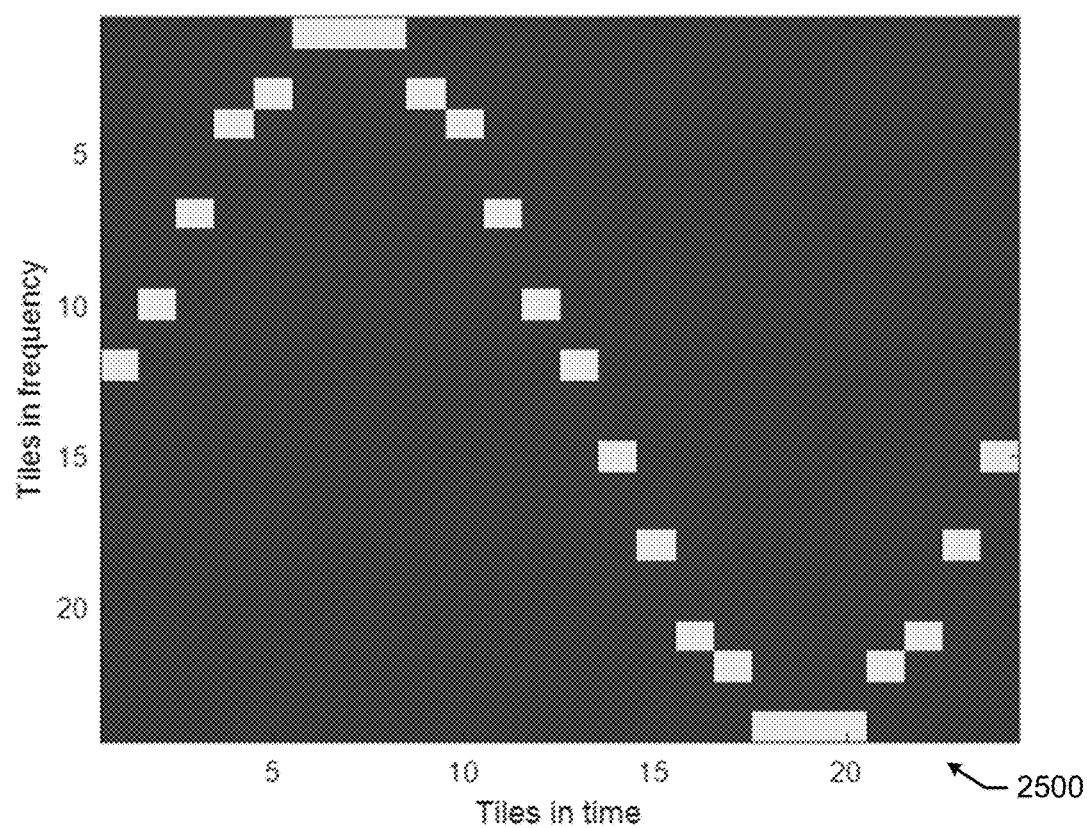
FIG. 25 is a graph of tiles in frequency relative to tiles in time for a sinusoidal trajectory matrix according to some example embodiments.
FIG. 26 is a spectrogram graph of frequency relative to time for chirp signals according to some example embodiments.
Figure 27:
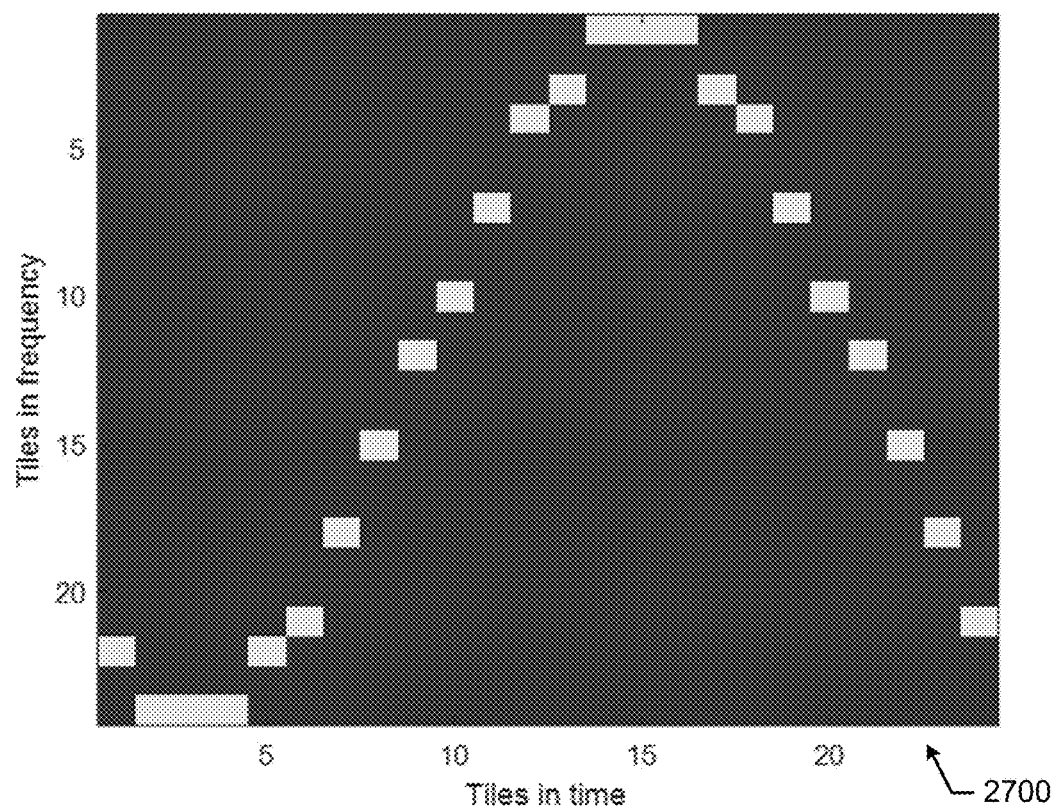
FIG. 27 is a graph of tiles in frequency relative to tiles in time for another sinusoidal trajectory matrix according to some example embodiments.
Figure 28:
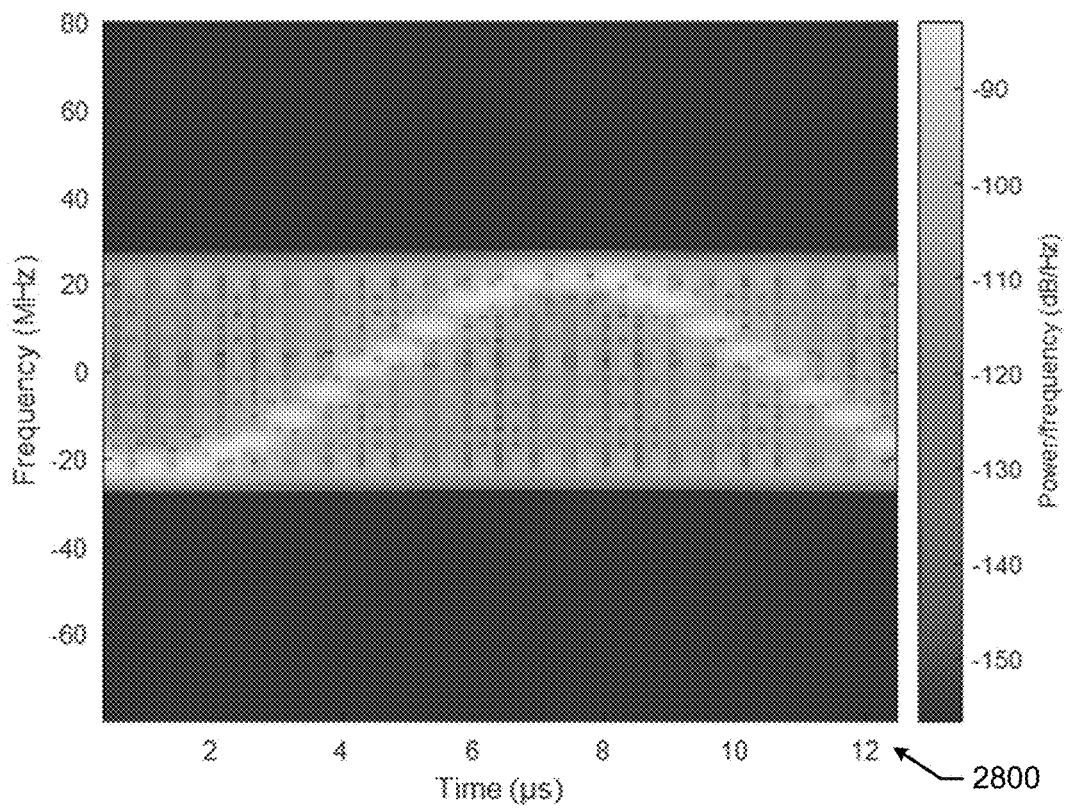
FIG. 28 is a spectrogram graph of frequency relative to time for example chirp signals according to some example embodiments.

The sinusoidal-like trajectories for the trajectory matrix T and the corresponding spectrograms are given in FIGS. 25-28. In this regard, the graph 2500 of FIG. 25 shows tiles in frequency with respect to tile in time as the sinusoidal T. The graph 2600 of FIG. 26 shows a spectrogram output of frequency with respect to time associated with the sinusoidal T as provided in graph 2500. Similarly, the graph 2700 of FIG. 27 shows tiles in frequency with respect to tile in time as a different sinusoidal T. The graph 2800 of FIG. 28 shows a spectrogram output of frequency with respect to time associated with the different sinusoidal T as provided in graph 2700.

Figure 29:
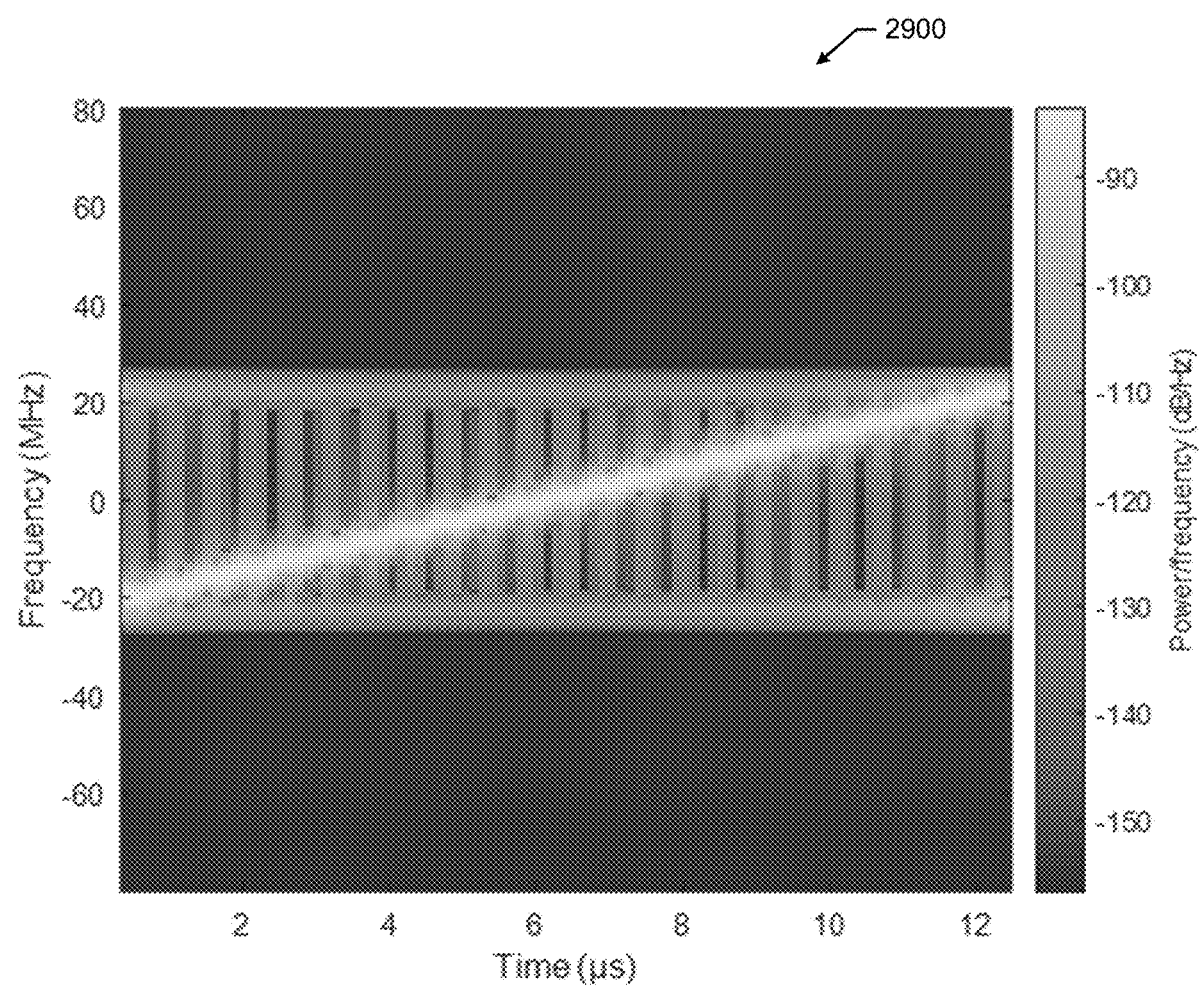
FIGS. 29-31 are spectrogram graphs of frequency relative to time for example chirp signals according to some example embodiments.
Figure 30:
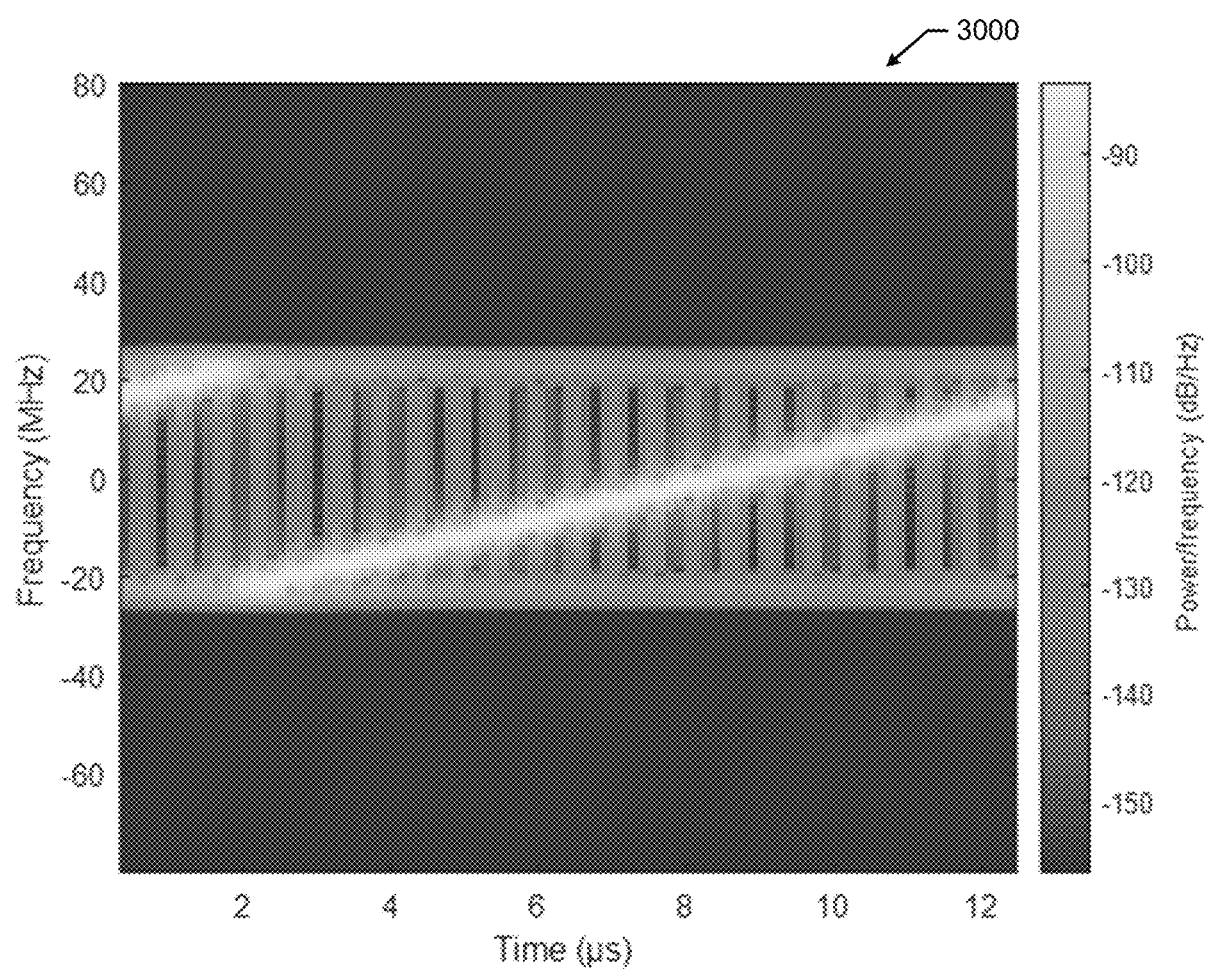
Figure 31:
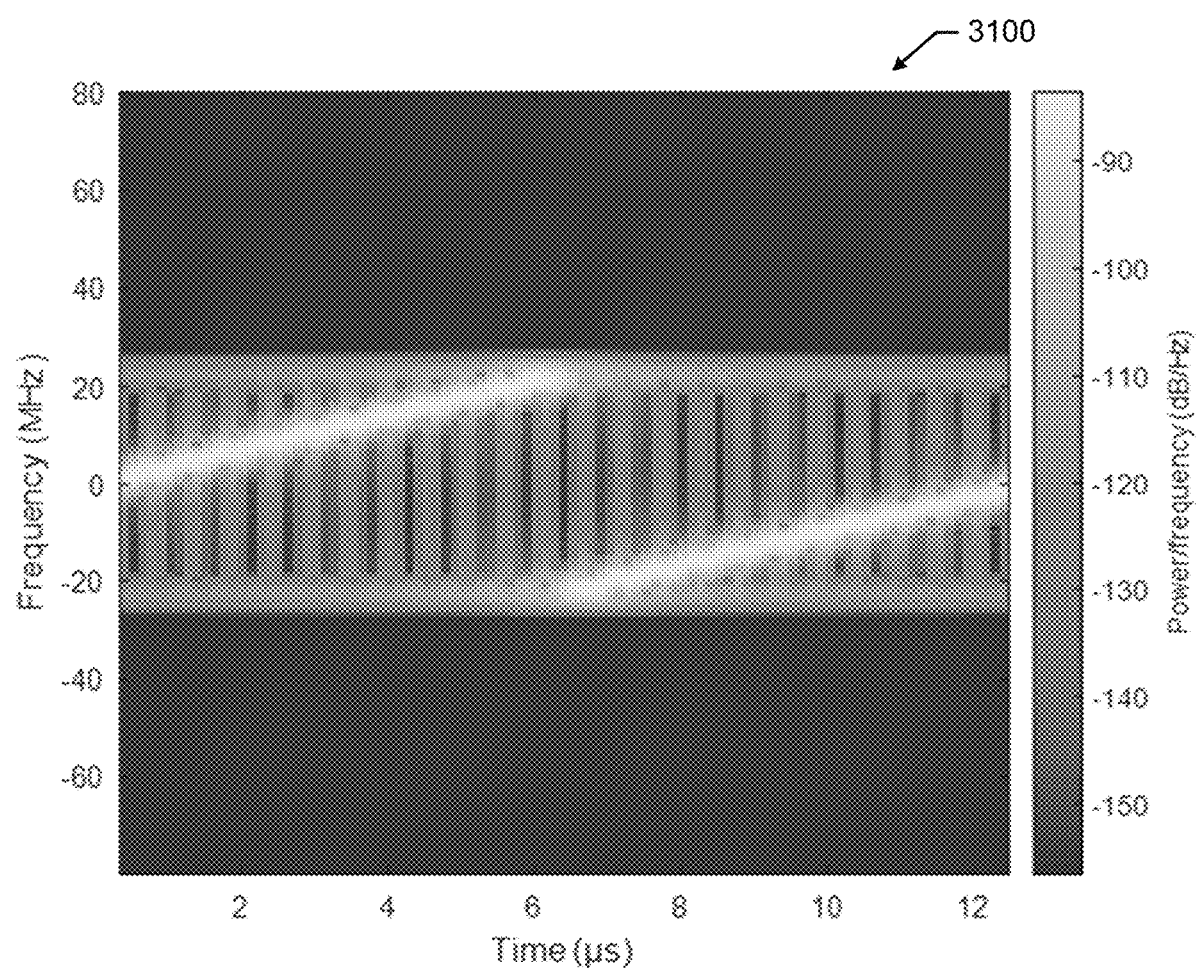
Figure 32:
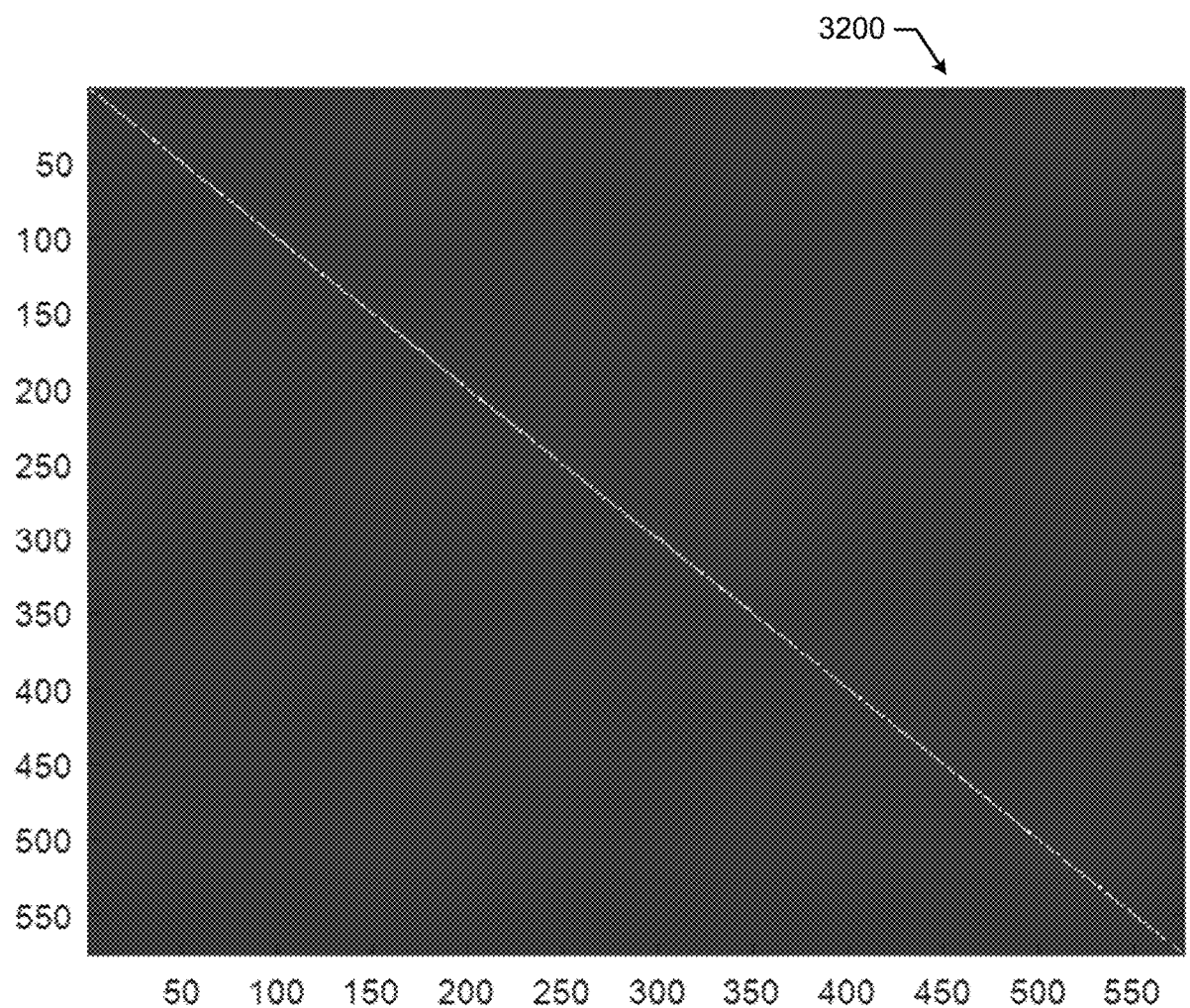
FIG. 32 is a graph of cross-correlations of example linear chirp signals according to some example embodiments.

Further, FIGS. 29-31 show additional spectrograms for different values of k for $x_k = F^H M P_k \text{vec}\{DT_0^H\}$. In this regard, the graph 2900 of FIG. 29 shows a spectrogram where k=0, graph 3000 of FIG. 30 shows a spectrogram where k=100, and graph 3100 of FIG. 31 shows a spectrogram where k=300. In the graph 3200 of FIG. 32, the linear chirp signals are illustrated for $d_{i,i}=1$ and $d_{i,j|i \neq j}=0$ for $T_0$ by using equation (38). The cross-correlation between different linear chirps ($x_k$ and $x_l$) are given in graph 3200, which demonstrates that the generated chirp signals construct an orthogonal set, where the x and y axes show different indices of $x_k$.

Figure 33:
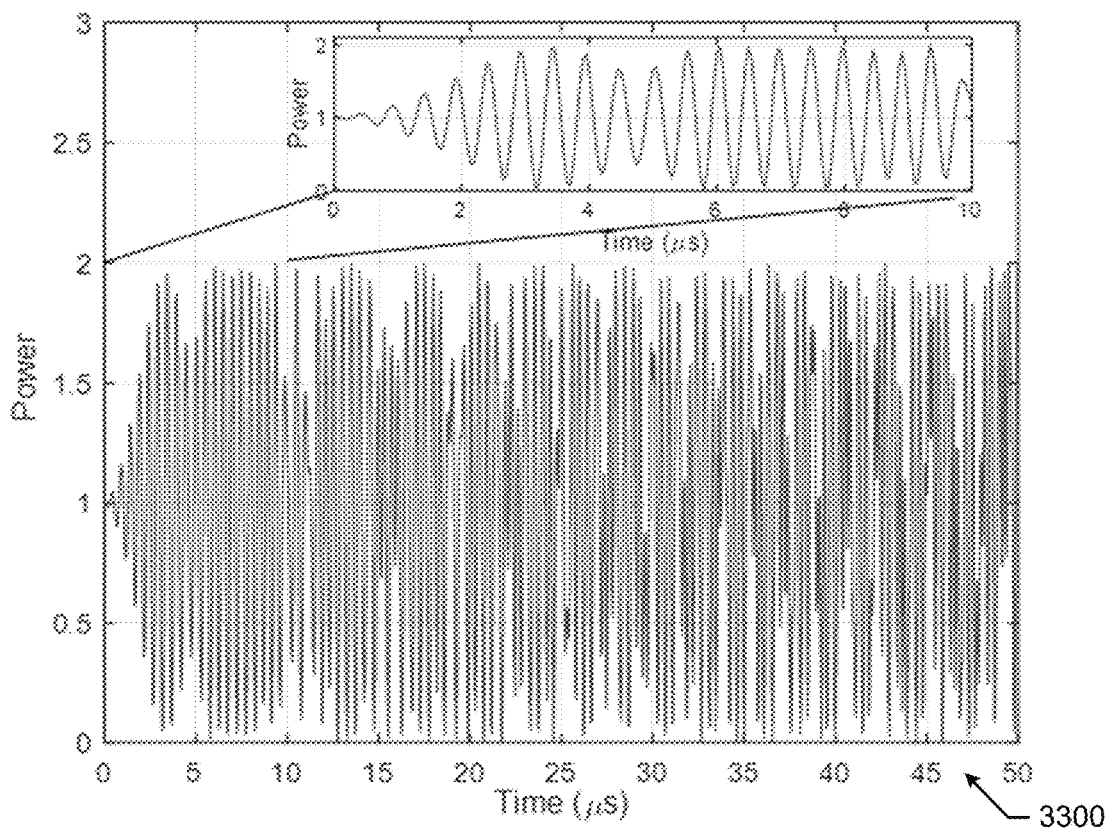
FIG. 33 is a graph of instantaneous power with respect to time for example chirp signals according to some example embodiments.
Figure 34:
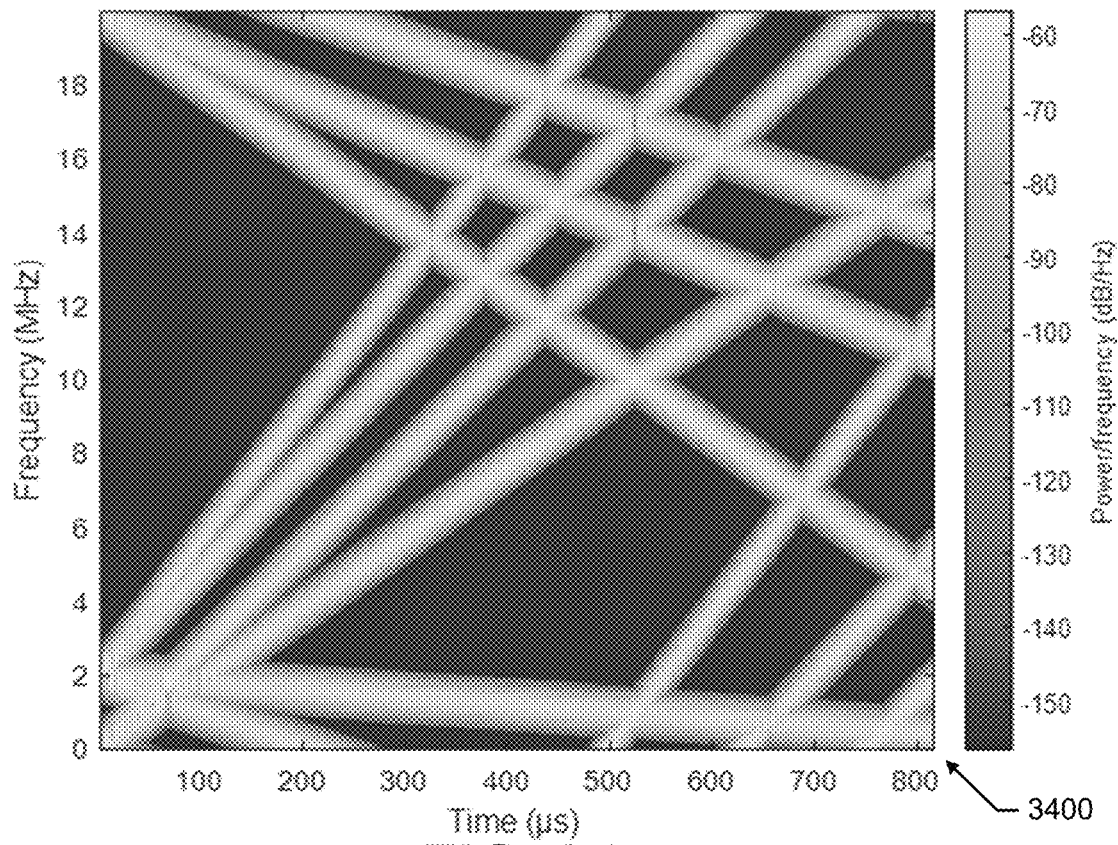
FIG. 34 is a spectrogram graph of frequency with respect to time for example chirp signals according to some example embodiments.

Additionally, as shown in FIGS. 33 and 34, a complementary-sequence encoded signal consisting of the sum of 8 chirp signals with linear time-frequency trajectories is provided. In this regard, the instantaneous signal power never exceeds 2, as shown in the graph 3300 of FIG. 33, although the chirps follow different directions in time-frequency with different rates, as shown in the spectrogram of graph 3400 of FIG. 34. In this regard, graph 3300 shows instantaneous power vs. time for the sum of 8 chirp signals, and graph 3400 shows a spectrogram of the 8 chirp signals.

Figure 35:
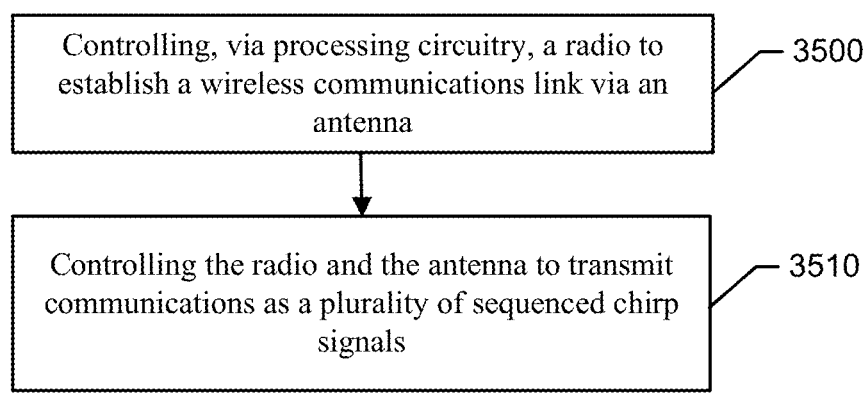
FIG. 35 is a flowchart of an example method for controlling a radio and antenna to conduct wireless communications involving chirp signals according to some example embodiments.

Having described various example embodiments that implement communications techniques involving chirp signals, an example method is described with respect to FIG. 35. In this regard, the example method may comprise controlling, via processing circuitry, a radio to establish a wireless communications link via an antenna at 3500. Further, the example method may comprise controlling the radio and the antenna to transmit communications as a plurality of sequenced chirp signals within an orthogonal frequency division multiplexing (OFDM) framework at 3510.

According to some example embodiments, the example method may also include controlling the radio to transmit the plurality of sequenced chirp signals, wherein a chirp signal of the plurality of sequenced chirp signals comprises an up-chirp signal within OFDM symbols or a down-chirp signal within OFDM symbols. In this regard, the up-chirp signal may comprise a signal with an increasing frequency with respect to time and the down-chirp signal may comprise a signal with a decreasing frequency with respect to time. Additionally or alternatively, according to some example embodiments, the example method may include controlling the radio to transmit the plurality of sequenced chirp signals within OFDM symbols, wherein a chirp signal of the plurality of chirp signals comprises an up-chirp signal or a down-chirp signal. In this regard, the up-chirp signal may sweep across a range of frequencies with respect to time by increasing a frequency of the up-chirp signal, and the down-chirp signal sweeps across a range of frequencies with respect to time by decreasing a frequency of the down-chirp signal.

Additionally or alternatively, according to some example embodiments, the example method may include controlling the radio to transmit the plurality of sequenced chirp signals including a cyclic prefix via orthogonal chirp division multiplexing. Additionally or alternatively, according to some example embodiments, the example method may include controlling the radio to maintain orthogonality by transmitting complementary sequences of chirp signals. Additionally or alternatively, according to some example embodiments, the example method may also include controlling the radio to transmit the plurality of sequenced chirp signals, the sequenced chirp signals having a uniform, non-linear trajectory in time and frequency. Additionally or alternatively, according to some example embodiments, the example method may also include providing amplification via a power amplifier for transmission of the plurality of sequenced chirp signals and controlling instantaneous power fluctuations due to transmission of chirp signals associated with different frequencies within a band.

Additionally or alternatively, according to some example embodiments, the example method may include controlling the radio to transmit the plurality of sequenced chirp signals via implementation of a Discrete Fourier Transform (DFT)-spreading scheme with OFDM and a frequency-domain spectral shaping (FDSS) filter that employs Bessel functions and Fresnel integrals used to develop the plurality of sequenced chirp signals as band-limited sinusoidal or linear chirp transmissions. Additionally or alternatively, according to some example embodiments, the example method may include controlling the radio to transmit the plurality of sequenced chirp signals, the plurality of sequenced chip signals being generated via orthogonal frequency division multiplexing to encode trajectories of the chirp signals in frequency and time.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements or functions, it should be appreciated that different combinations of elements or functions may be provided by alternative embodiments without departing from the scope of the appended claims. In this regard, for example, different combinations of elements or functions than those explicitly described above are also contemplated as may be set forth in some of the appended claims. In cases where advantages, benefits or solutions to problems are described herein, it should be appreciated that such advantages, benefits or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. An apparatus comprising:
an antenna;
a radio configured to transmit and receive wireless communications via the antenna; and
processing circuitry configured to control the radio to establish a wireless communications link with a receiving communications device, wherein the processing circuitry also uses an encoded sequence to generate a plurality of chirp signals within an orthogonal frequency division multiplexing (OFDM) transmission to be transmitted as a signal by the antenna via the radio.

2. The apparatus of claim 1, wherein the processing circuitry is further configured to control the radio to transmit the signal comprising the plurality of chirp signals;
wherein a chirp signal of the plurality of chirp signals comprises an up-chirp signal or a down-chirp signal within OFDM symbols;
wherein the up-chirp signal comprises a signal with an increasing frequency with respect to time and wherein the down-chirp signal comprises a signal with a decreasing frequency with respect to time.

3. The apparatus of claim 1, wherein the processing circuitry is further configured to control the radio to transmit the signal comprising the plurality of chirp signals, wherein a chirp signal of the plurality of chirp signals sweeps across a frequency range from a first frequency to a second frequency within OFDM symbols, the first frequency being lower than the second frequency or the first frequency being higher than the second frequency.

4. The apparatus of claim 1, wherein the processing circuitry is further configured to control the radio to transmit the signal comprising the plurality of chirp signals wherein a chirp signal of the plurality of chirp signals comprises an up-chirp signal or a down-chirp signal, wherein the up-chirp signal sweeps across a range of frequencies with respect to time by increasing a frequency of the up-chirp signal, and the down-chirp signal sweeps across a range of frequencies with respect to time by decreasing a frequency of the down-chirp signal.

5. The apparatus of claim 1, wherein the processing circuitry is further configured to control the radio to transmit the signal comprising the plurality of chirp signals with a cyclic prefix.

6. The apparatus of claim 5, wherein the encoded sequence is a complementary sequence.

7. The apparatus of claim 1, wherein the processing circuitry is further configured to control the radio to transmit the signal comprising the plurality of chirp signals, the chirp signals having a uniform, non-linear trajectory in time and frequency.

8. The apparatus of claim 1, wherein the radio comprises a power amplifier configured to provide amplification for transmission of the plurality of chirp signals and to control instantaneous power fluctuations due to transmission of chirp signals associated with different frequencies within a band.

9. The apparatus of claim 1, wherein the processing circuitry is further configured to generate the plurality of chirp signals via a Discrete Fourier Transform (DFT)-spreading scheme with OFDM and a frequency-domain spectral shaping (FDSS) filter that employs Bessel functions and Fresnel integrals used to develop the plurality of chirp signals as band-limited sinusoidal and linear chirp transmissions.

10. The apparatus of claim 1, wherein the processing circuitry is further configured to control the radio to transmit the signal comprising the plurality of chirp signals, the plurality of chirp signals being generated via chirp division multiplexing to encode trajectories of the chirp signals in frequency and time.

11. The apparatus of claim 1, wherein the processing circuitry is further configured to generate the signal comprising the plurality of chirp signals within the OFDM transmission via a frequency-domain spectral shaping (FDSS) filter.

12. A method comprising:
controlling, via processing circuitry, a radio to establish a wireless communications link via an antenna; and
controlling the radio and the antenna to transmit communications as a plurality of chirp signals within an orthogonal frequency division multiplexing (OFDM) transmission, the plurality of chirp signals having been generated via an encoded sequence.

13. The method of claim 12, further comprising controlling the radio to transmit the plurality of chirp signals, wherein a chirp signal of the plurality of chirp signals comprises an up-chirp signal within OFDM symbols or a down-chirp signal within OFDM symbols, wherein the up-chirp signal comprises a signal with an increasing frequency with respect to time and the down-chirp signal comprises a signal with a decreasing frequency with respect to time.

14. The method of claim 12, further comprising controlling the radio to transmit the plurality of chirp signals within OFDM symbols, wherein a chirp signal of the plurality of chirp signals comprises an up-chirp signal or a down-chirp signal, wherein the up-chirp signal sweeps across a range of frequencies with respect to time by increasing a frequency of the up-chirp signal, and the down-chirp signal sweeps across a range of frequencies with respect to time by decreasing a frequency of the down-chirp signal.

15. The method of claim 12, further comprising controlling the radio to transmit the plurality of chirp signals with a cyclic prefix.

16. The method of claim 15, wherein the encoded sequence is a complementary sequence.

17. The method of claim 12, further comprising controlling the radio to transmit the plurality of chirp signals, the chirp signals having a uniform, non-linear trajectory in time and frequency.

18. The method of claim 12, further comprising providing amplification via a power amplifier for transmission of the plurality of chirp signals and controlling instantaneous power fluctuations due to transmission of chirp signals associated with different frequencies within a band.

19. The method of claim 12, further comprising generating the encoded sequence via implementation of a Discrete Fourier Transform (DFT)-spreading scheme with OFDM and a frequency-domain spectral shaping (FDSS) filter that employs Bessel functions and Fresnel integrals used to develop the plurality of chirp signals as band-limited sinusoidal or linear chirp transmissions.

20. The method of claim 12, further comprising controlling the radio to transmit the plurality of chirp signals, the encoded sequence being generated via chirp division multiplexing to encode trajectories of the chirp signals in frequency and time.

21. An apparatus comprising:
an antenna;
a radio configured to transmit and receive wireless communications via the antenna; and
processing circuitry configured to:
control the radio to establish a wireless communications link with a receiving communications device, wherein the processing circuitry also generates a signal for transmission by the antenna via the radio, wherein the signal comprises a plurality of modulated circularly-shifted chirp signals within an orthogonal frequency division multiplexing (OFDM) transmission;
wherein the processing circuitry is further configured to generate the signal by:
processing information symbols with a first variable point DFT (Discrete Fourier Transform) and determining a shaped sequence by shaping a result of the first variable point DFT with a Fourier coefficient based on a chirp signal of the plurality of modulated circularly-shifted chirp signals;
determining a second variable point inverse DFT (IDFT) of the shaped sequence after padding zero-valued elements; and
prepending a cyclic prefix to a result of the second variable point inverse DFT.

* * * * *